(12) United States Patent
Gorman et al.

(10) Patent No.: US 8,972,445 B2
(45) Date of Patent: Mar. 3, 2015

(54) SYSTEMS AND METHODS FOR STORAGE OF DECLARATIVE KNOWLEDGE ACCESSIBLE BY NATURAL LANGUAGE IN A COMPUTER CAPABLE OF APPROPRIATELY RESPONDING

(71) Applicant: Glace Holding LLC, Del Mar, CA (US)

(72) Inventors: John G. Gorman, Del Mar, CA (US); John W. R. Gorman, Auckland (NZ)

(73) Assignee: Deep Sky Concepts, Inc., San Diego, CA (US)

( * ) Notice: Subject to any disclaimer, the term of this patent is extended or adjusted under 35 U.S.C. 154(b) by 89 days.

(21) Appl. No.: 13/747,330

(22) Filed: Jan. 22, 2013

(65) Prior Publication Data
US 2014/0040312 A1 Feb. 6, 2014

Related U.S. Application Data

(63) Continuation-in-part of application No. 12/429,119, filed on Apr. 23, 2009, now Pat. No. 8,521,512, and a continuation-in-part of application No. 13/624,762, filed on Sep. 21, 2012, which is a continuation-in-part (Continued)

(51) Int. Cl.
*G06F 17/30* (2006.01)
*G06F 17/27* (2006.01)

(52) U.S. Cl.
CPC ...... *G06F 17/2705* (2013.01); *G06F 17/30424* (2013.01); *G06F 17/2785* (2013.01)
USPC .......................................................... 707/771

(58) Field of Classification Search
CPC .................... G06F 17/30696; G06F 17/30864; G06F 17/30734
USPC .......................... 707/770, 771, 772, 773, 774
See application file for complete search history.

(56) References Cited

U.S. PATENT DOCUMENTS

| | | | |
|---|---|---|---|
| 5,819,303 A | 10/1998 | Calhoun et al. | |
| 6,101,537 A | 8/2000 | Edelstein et al. | |

(Continued)

FOREIGN PATENT DOCUMENTS

| | | | |
|---|---|---|---|
| KR | 1019990078925 A | 11/1999 | |
| KR | 100368300 B1 | 1/2003 | |

OTHER PUBLICATIONS

International Search Report and Written Opinion for PCT/US09/42388 mailed Nov. 30, 2009, (11 pages).

(Continued)

*Primary Examiner* — Rehana Perveen
*Assistant Examiner* — Loc Tran
(74) *Attorney, Agent, or Firm* — Procopio Cory Hargreaves & Savitch LLP; Noel C. Gillespie

(57) ABSTRACT

Systems and methods for natural language communication with a computer. A builder module constructs tables in a database by generating concept symbols for each language element in an expression to form a string of ordered concept symbols, and, in a series of rounds, combining pairs of concept symbols into newly generated concept symbols to form shortened strings of concept symbols until a single concept symbol remains. Each generated concept symbol is stored in a row in the database. A parser module may then utilize the database to parse an input expression by identifying rows in the database that correspond to language elements of the input expression to generate a string of concept symbols, and, in a series of rounds, replacing pairs of concept symbols in the string of concept symbols by identifying rows in the database that comprise the pairs of concept symbols until a single concept symbol remains.

18 Claims, 29 Drawing Sheets

Related U.S. Application Data of application No. 12/789,368, filed on May 27, 2010, now Pat. No. 8,275,788, which is a continuation-in-part of application No. 12/620,513, filed on Nov. 17, 2009, now Pat. No. 8,214,366.

(60) Provisional application No. 61/589,698, filed on Jan. 23, 2012.

(56) References Cited

U.S. PATENT DOCUMENTS

| | | | |
|---|---|---|---|
| 6,411,950 | B1 | 6/2002 | Moricz et al. |
| 7,085,708 | B2 | 8/2006 | Manson |
| 7,809,714 | B1 | 10/2010 | Smith |
| 8,214,366 | B2 | 7/2012 | Gorman et al. |
| 8,271,264 | B2 | 9/2012 | Gorman et al. |
| 8,275,788 | B2 | 9/2012 | Gorman et al. |
| 8,521,512 | B2 | 8/2013 | Gorman et al. |
| 2001/0032199 | A1 | 10/2001 | Delo |
| 2002/0002575 | A1 | 1/2002 | Eisler et al. |
| 2002/0077806 | A1 | 6/2002 | Tarbouriech et al. |
| 2003/0144831 | A1 | 7/2003 | Ford |
| 2004/0181390 | A1 | 9/2004 | Manson |
| 2004/0267724 | A1 | 12/2004 | Hoffman |
| 2005/0154690 | A1* | 7/2005 | Nitta et al. ............... 706/46 |
| 2005/0240576 | A1 | 10/2005 | Piscitello et al. |
| 2006/0041424 | A1 | 2/2006 | Todhunter et al. |
| 2007/0106499 | A1 | 5/2007 | Dahlgren et al. |
| 2007/0112714 | A1 | 5/2007 | Fairweather |
| 2007/0130112 | A1 | 6/2007 | Lin |
| 2007/0132631 | A1 | 6/2007 | Henson et al. |
| 2007/0185859 | A1 | 8/2007 | Flowers et al. |
| 2007/0203693 | A1 | 8/2007 | Estes |
| 2008/0021924 | A1 | 1/2008 | Hall et al. |
| 2008/0040099 | A1 | 2/2008 | Wu et al. |
| 2009/0006389 | A1 | 1/2009 | Piscitello et al. |
| 2009/0070103 | A1* | 3/2009 | Beggelman et al. ............ 704/9 |
| 2009/0112835 | A1 | 4/2009 | Elder |
| 2009/0276396 | A1 | 11/2009 | Gorman et al. |

OTHER PUBLICATIONS

International Search Report and Written Opinion for PCT/US10/057099 mailed Aug. 2, 2011 (9 pages).
International Search Report and Written Opinion PCT/US11/38413 mailed Feb. 17, 2012 (3 pages).
Y. Wilks, ""Is There Progress on Talking Sensibly to Machines?"" Science, 318: 927-928 (2007).

* cited by examiner

| | | |
|---|---|---|
| stay ~ ed | = stayed | "stayed" |
| stayed ~ home | =-ed67 | "stayed home" |
| I ~ -ed67 | = Ied68 | "I stayed home" |
| Ied68 ~ . | = Ied68. | "I stayed home." |
| no ~ car | = no269 | "no car" |
| ha ~ -d | = had | "had" |
| I ~ had | = Ihad | "I had" |
| Ihad ~ no269 | = Ihad270 | "I had no car" |
| as ~ Ihad270 | = as270 | "As I had no car" |
| as270 ~ , | = ,as270 | "As I had no car," |
| ,as270 ~ Ied68. | = Ied69. | "As I had no car, I stayed home." |

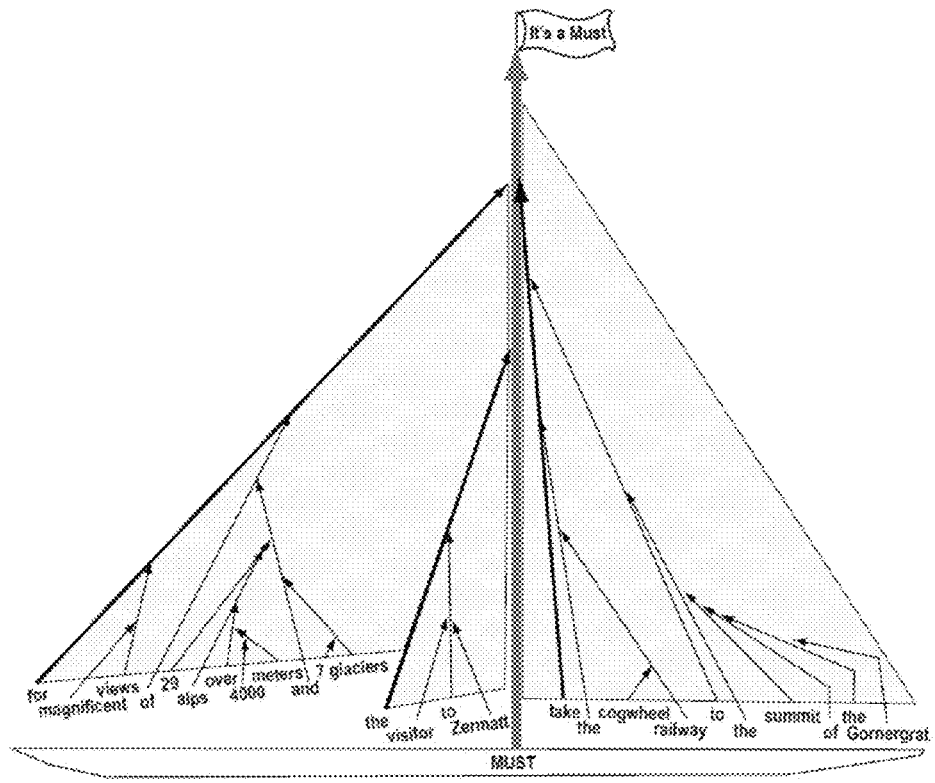
FIG. 3
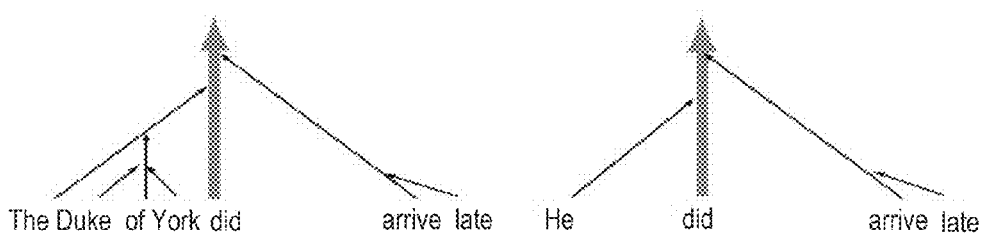
FIG. 4A
of ~ York = of356 "of York"
Duke ~ of356 = of357 "Duke of York"
The ~ of357 = the357 "The Duke of York"
The357 ~ did = did2396 "The Duke of York did"
He ~ did = did2396 "The Duke of York did"
arrive ~ late = arrive86 "arrive late"
did2396 ~ arrive86 = did2397 "The Duke of York did arrive late"
FIG. 4B

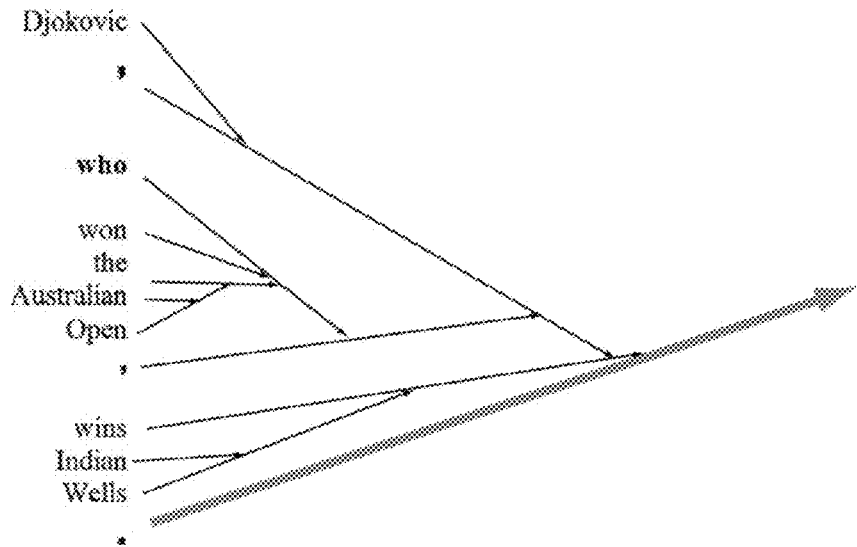

FIG. 5A

Djokovic ~ , = ND "Djokovic,"
Australian ~ open = AO "Australian open"
the ~ AO = theAO "the Australian open"
won ~ theAO = WtheAO "won the Australian open"
who ~ WtheAO = who284 "who won the Australian open"
who284 ~ , = ,who284 "who won the Australian open,"
ND ~ ,who284 = ND284 "Djokovic, who won the Australian open"
Indian ~ Wells = IW "Indian Wells"
wins ~ IW = WIW "wins Indian Wells"
ND284 ~ WIW = ND284WIW "Djokovic, who won the Australian open wins Indian Wells"
ND284WIW ~ . = ND284WIW. "Djokovic, who won the Australian open wins Indian Wells."

FIG. 5B

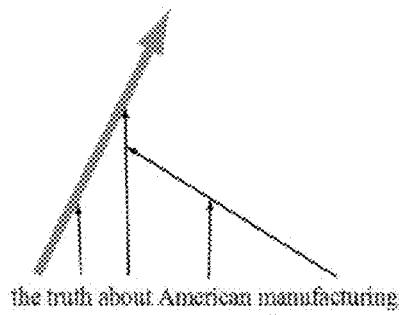
FIG. 6A
the ~ truth = the345 "the truth"
American~manufacturing = manufacturing01 "American manufacturing"
About~manufacturing01 = about438 "about American manufacturing"
the345~ about438 = the34538 "the truth about American manufacturing"
FIG. 6B
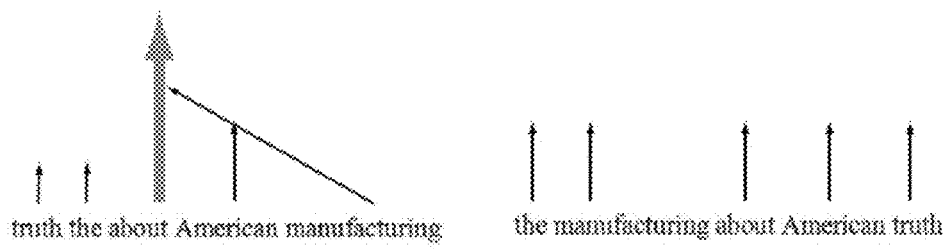
FIG. 6C

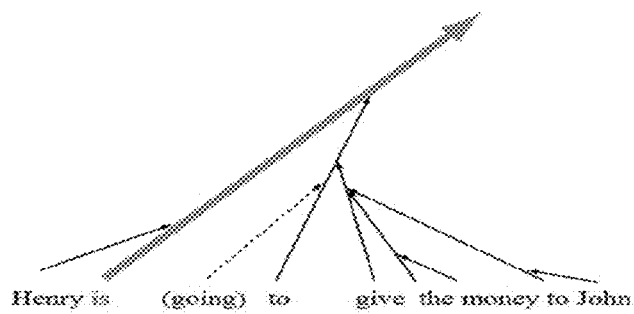
FIG. 17A
Henry ~ is = is1 "Henry is"
going ~ to = to1 "going to"
the ~ money = the1 "the money"
to ~ John =to2 "to John"
give ~ the1 = give1 "give the money"
give1 ~ to1 = give2 "give the money to John"
to1 ~ give2 = to2 "going to give the money to John"
is1 ~ to2 = is2 "Henry is going to give the money to John"
FIG. 17B
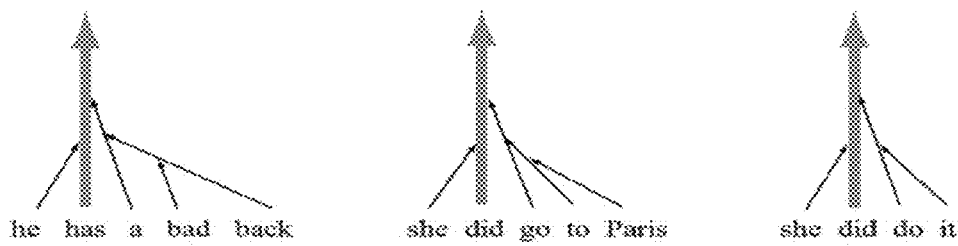
FIG. 18
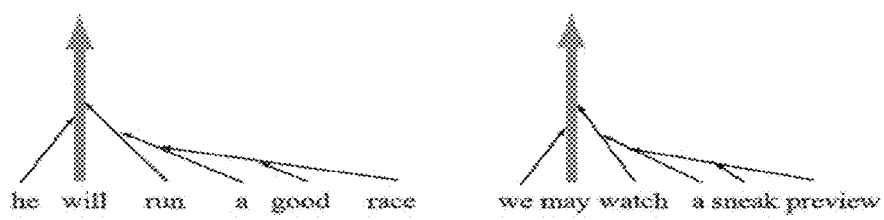
FIG. 19

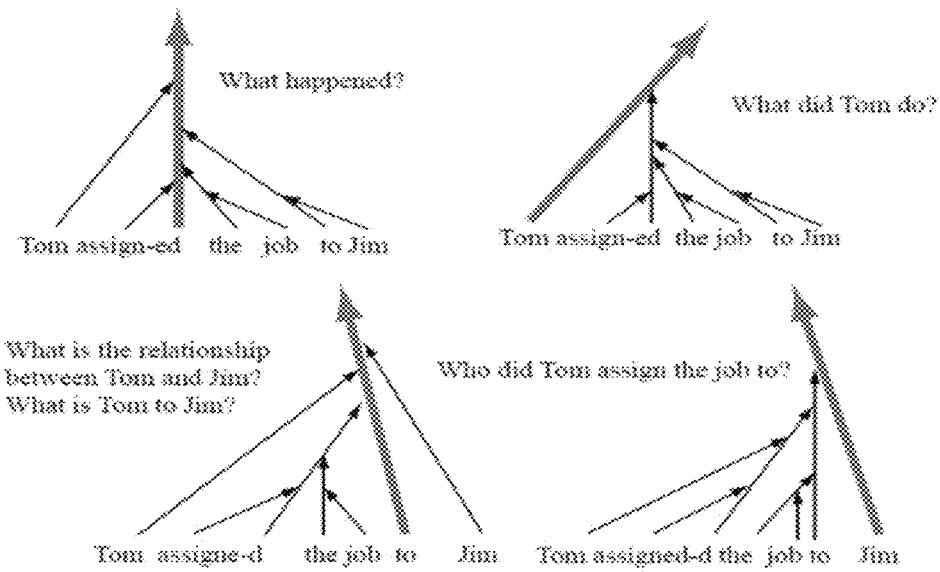
FIG. 24
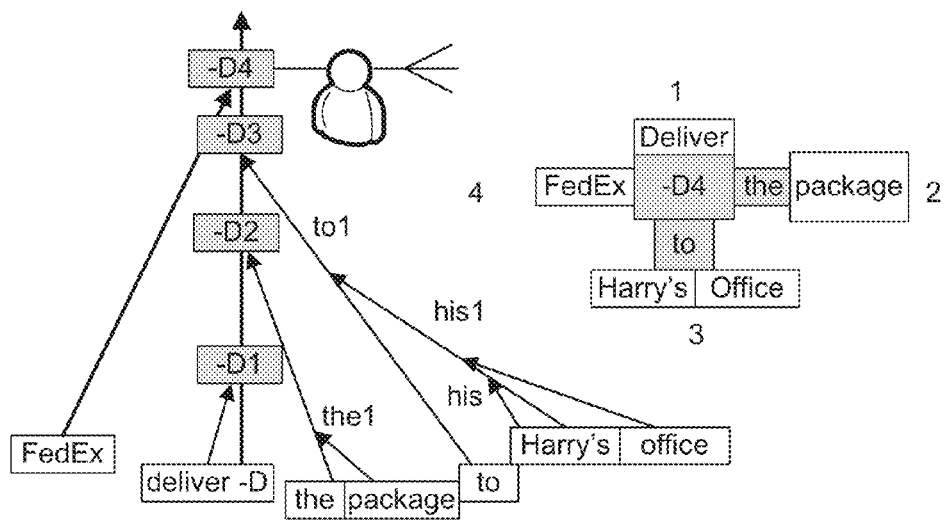
FIG. 25A
Harry ~ -s = his "Harry's"
his ~ offi ce = his1 "Harry's office"
to ~ his1 = to1 "to Harry's office"
the ~ package = the1 "the package"
deliver ~ D = D1 "delivered"
D1 ~the1 = D2 "delivered the package"
D2 ~to1 = D3 "delivered the package to Harry's office"
Fedex ~D3 = D4 "Fedex delivered the package to Harry's office"
FIG. 25B

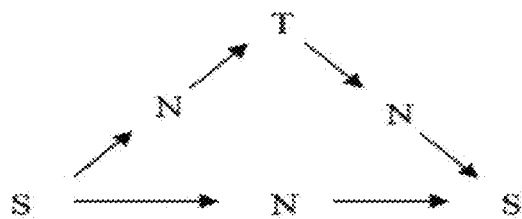

FIG. 26

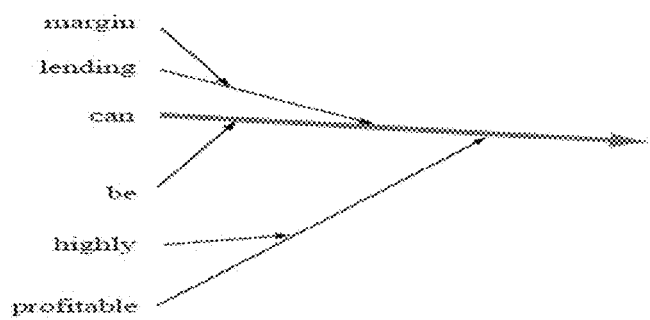

FIG. 27A margin ~ lending = ML "margin lending"
can ~ be = canbe "can be"
ML~ canbe = MLcanbe "margin lending can be"
highly ~profitable = HP "highly profitable"
MLcanbe ~ HP = MLcanbeHP "margin lending can be highly profitable"

FIG. 27B

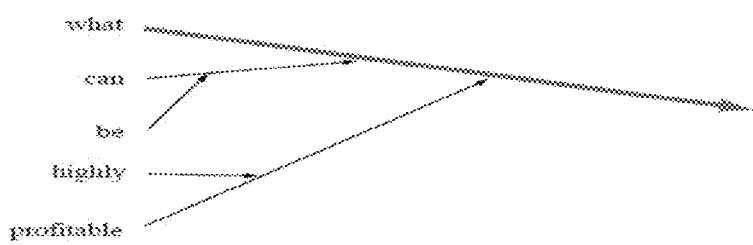

FIG. 28A can ~ be = canbe "can be"
what~ canbe = WCb "what can be"
highly ~profitable = HP "highly profitable"
WCb ~ HP = WCbeHP "what can be highly profitable"

FIG. 28B

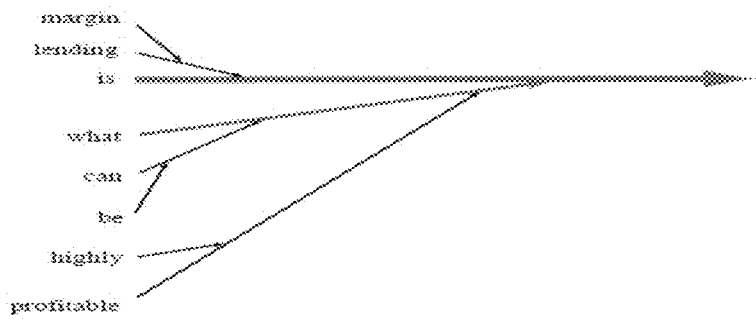

FIG. 29A margin ~ lending = ML "margin lending"
ML ~ is = MLis "margin lending is"
can ~ be = canbe "can be"
what~ canbe = WCb "what can be"
highly ~profitable = HP "highly ~profitable"
WCb ~ HP = WCbeHP "what can be highly profitable"
MLis ~ WCbeHP = MLisWCbeHP "margin lending is what can be highly profitable"

FIG. 29B

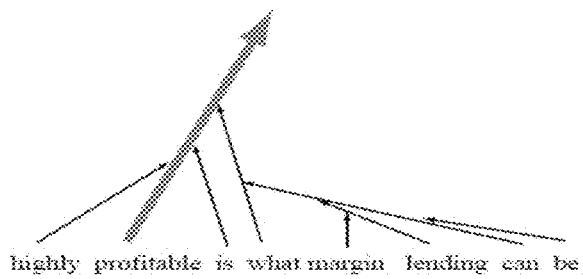

FIG. 30A highly ~profitable = HP "highly profitable"
HP ~ is = HPis "highly profitable is"
margin ~ lending = ML "margin lending"
can ~ be = canbe "can be"
ML ~ canbe = MLCb "margin lending can"
what ~ MLCb = WMLCb "what margin lending can be"
HPis ~ WMLCb = HPisWMLCb " highly profitable is what margin lending can be"

FIG. 30B

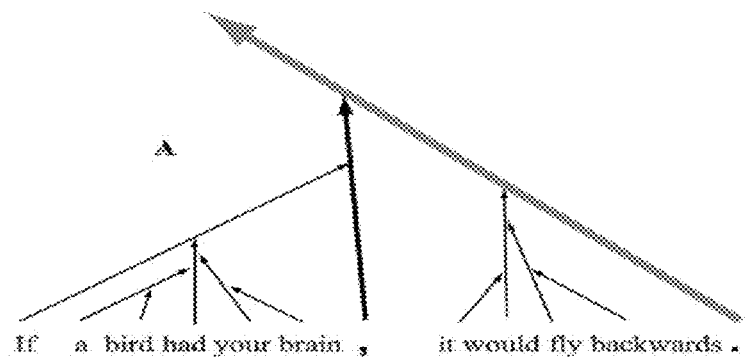

FIG. 31A a ~ bird = a452 "a bird"
your ~ brain = your238 "your brain"
a452 ~ had = had452 "a bird had"
a452 ~ your238 = had453 "a bird had your brain"
if ~ had453 = if453 "if a bird had your brain"
if453 ~ , = ,if453 "if a bird had your brain,"
it ~ would = itwould "it would"
fly ~ backwards = fly26 "fly backwards"
itwould ~ fly26 = itwdfly26 "it would fly backwards"
itwdfly26 ~ . = .itwdfly26 "it would fly backwards."
,if453 ~ .itwdfly26 = .if45326 "if a bird had your brain, it would fly backwards."

FIG. 31B

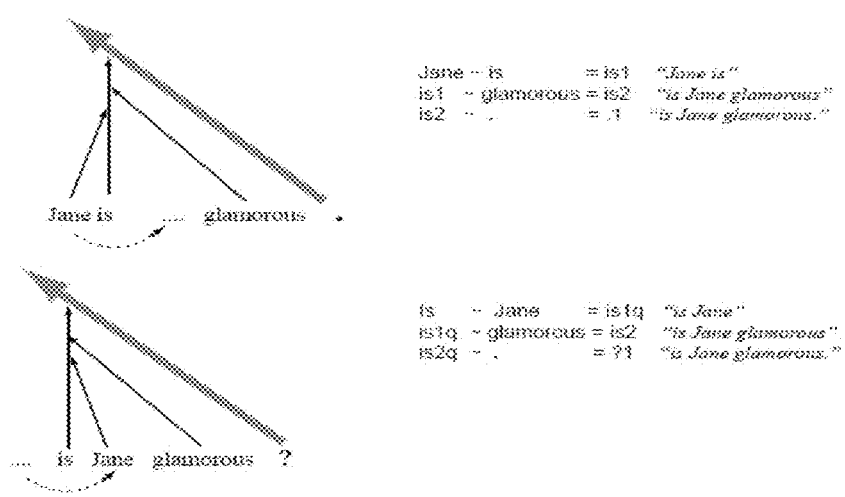

FIG. 32

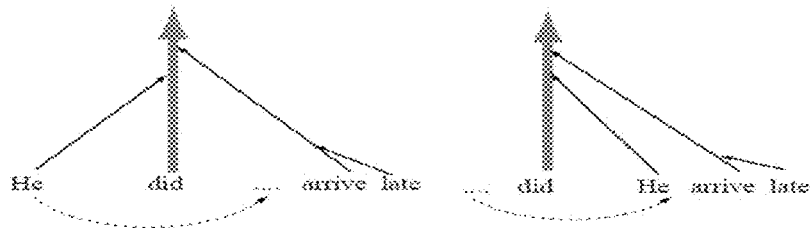

FIG. 33A of ~York = of1 "of York"
Duke ~ of1 = Duke1 "Duke of York"
the ~ Duke1 = the1 "the Duke of York"
the1 ~ did = did1 "the Duke of York did"
he ~ did = did1 "the Duke of York did"
arrive ~ late = arrive1 "arrive late"
did1 ~ arrive1 = did2 "Yes, the Duke of York did arrive late"

FIG. 33B

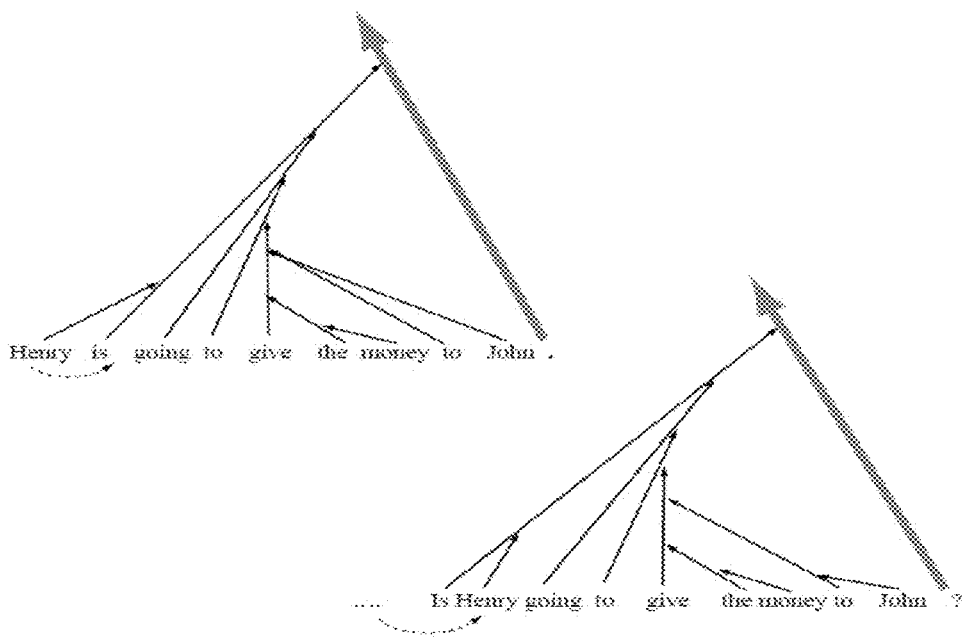

FIG. 34A is ~ Henry = isq1 "is Henry"
isq1 ~ going1 = isq2 "is Henry going to give the money to John
isq2 ~ ? = ?33 "is Henry going to give the money to John?"

FIG. 34B

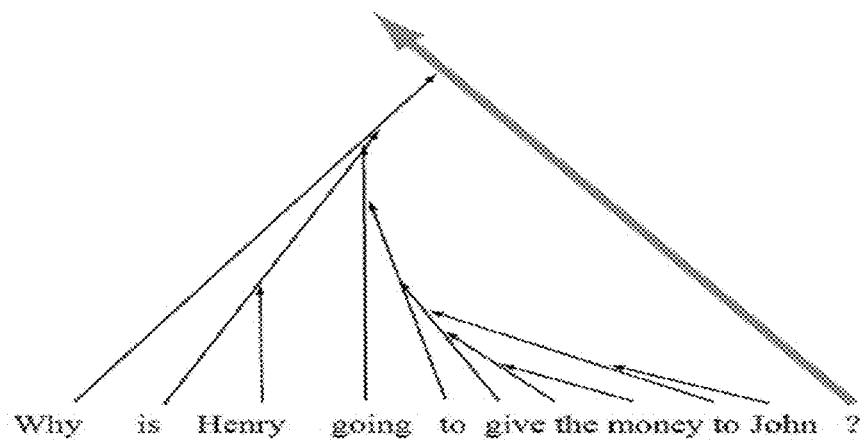
FIG. 35A
Why~isq2  = Whyisq2   "Why is Henry going to give the money to John"
Whyisq2~? = Whyisq2?  "Why is Henry going to give the money to John?"
FIG. 35B
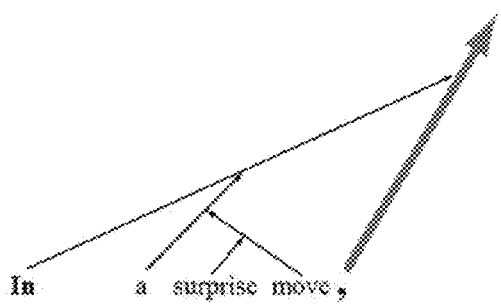
FIG. 36A
surprise ~ move = surprisemove    "surprise move"
a ~ surprisemove = a1              "a surprise move"
in ~ a1          = in1             "in a surprise move"
in1 ~ ,          = ,1472           "in a surprise move,"
FIG. 36B

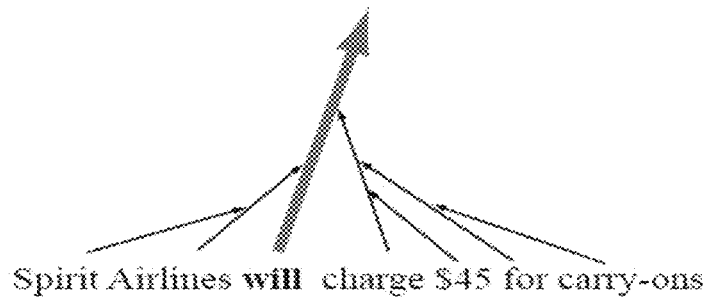
FIG. 36C
Spirit ~Airlines = SpritAirlines "Spirit Airlines"
SpiritAirlines ~ will = will1 "Spirit Airlines will"
charge ~ 45$ = charge1 "charge 45$"
for ~ carry-ons = for1 "for carry-ons"
charge1 ~ for1 = charge2 "charge 45$ for carry-ons"
will1 ~ charge2 = will2 "Spirit Airlines will charge 45$ for carry-ons"
FIG. 36D
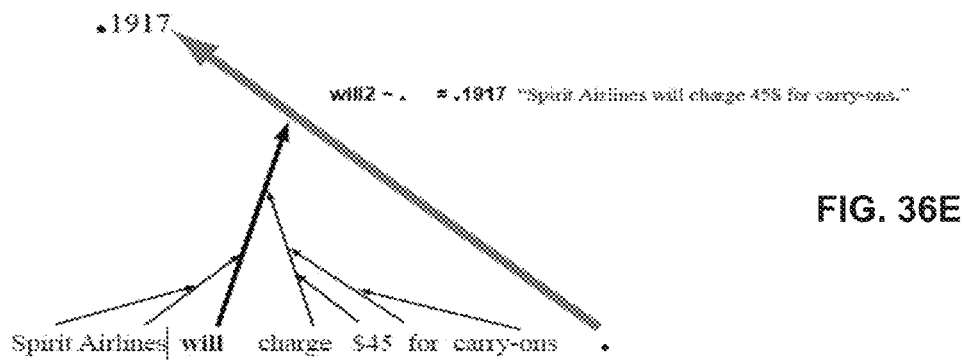
FIG. 36E
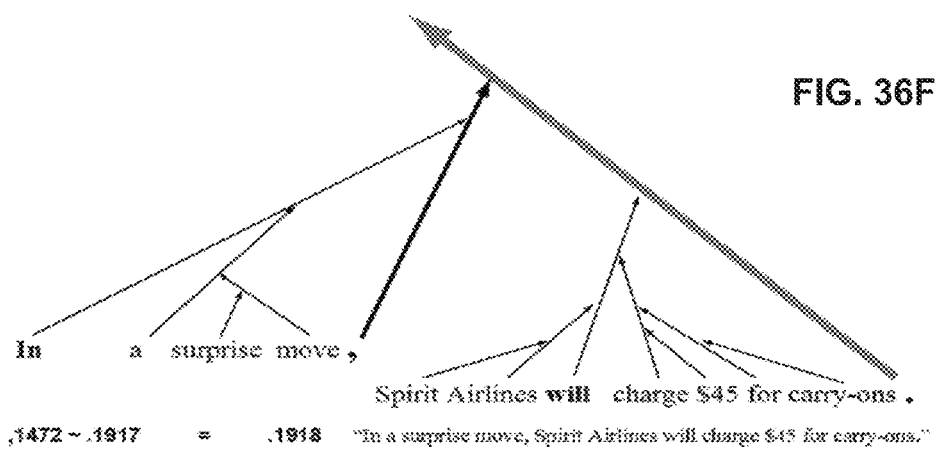
FIG. 36F

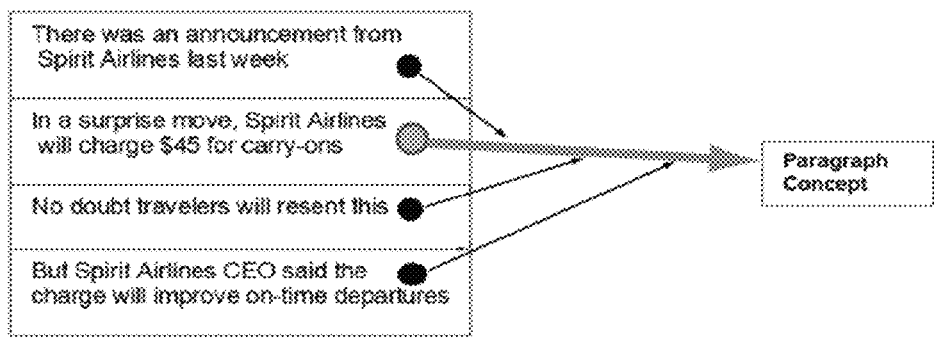
FIG. 38
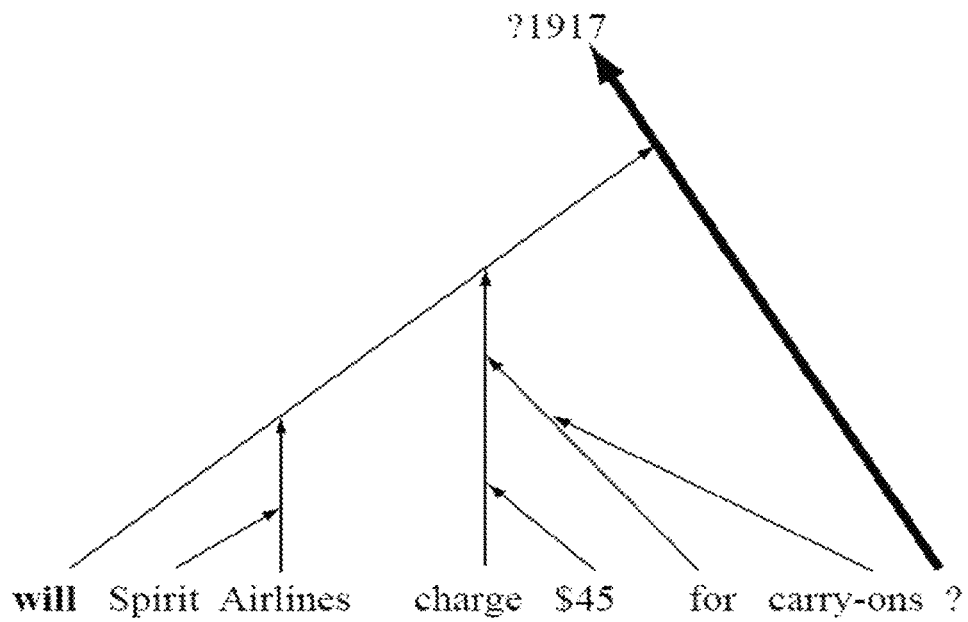
FIG. 39A
will ~ SpiritAirlines = willQ1    "will Spirit Airlines"
willQ1 ~ charge2   = willQ2    "will Spirit Airlines charge 45$ for carry-ons"
willQ2 ~ ?         = ?1917     "will Spirit Airlines charge 45$ for carry-ons"
FIG. 39B

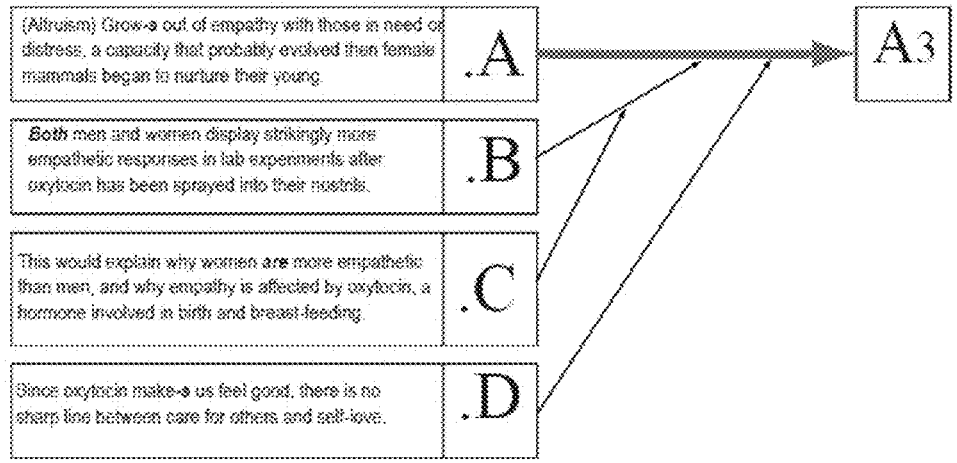

FIG. 45

| Set # | Phrase | Alternate Phrases Feasible at Each Point |
|---|---|---|
| 1. | 5* a child | he/ she/ he or she/ a toddler |
| 2. | 4* must be | has to be/ must be/ needs to be/ is required to be/ and negatives/ blank |
| 3. | 10* buckled | strapped/ secured/ held/ seated/ restrained/ seated / placed/ ride/ blank |
| 4. | 2* in | into |
| 5. | 4* a safety seat | a child's safety seat/ an approved safety seat/ an approved child safety seat |
| 6. | 3* if | when/ unless |
| 7. | 4* he or she | a child/ he/ she/ he or she |
| 8. | 4* is | is not/ isn't/ weighs |
| 9. | 7* under | less than/ younger than/ over/ more than/ older than/ bi |
| 10. | 9* 6 years old | six years old/ 6 years of age/ six years of age/ 6/ six/ age 6/ age six/ 60 pounds |
| 11. | 4* and | or/ blank |
| 12. | 5* he or she | he/ she/a child/ blank |
| 13. | 5* is | is not/weighs/does not weigh\blank |
| 14. | 5* under | over/ more than/ less than/ blank |
| 15 | 4* 60 pounds | 60 pounds in weight /sixty pounds or more/60 pounds i weight/ |

Cartesian Product of tuple sets: 4*4*10*2*4*3*4*4*7*9*4*5*5*5*4 = 9,676,800,000

FIG. 46

| Yes | a | b |
|---|---|---|
| No | a | B |
|  | A | b |
|  | A | B | a ~ b = Yes
a ~ B = No
A ~ b = No
A ~ B = No

FIG. 47

SYSTEMS AND METHODS FOR STORAGE OF DECLARATIVE KNOWLEDGE ACCESSIBLE BY NATURAL LANGUAGE IN A COMPUTER CAPABLE OF APPROPRIATELY RESPONDING

PRIORITY

This application claims priority to U.S. Provisional Patent App. No. 61/589,698, filed on Jan. 23, 2012, and titled "An Essay Concerning Computer Understanding in Four Books," and further claims priority as a continuation-in-part to U.S. Non-Provisional patent application Ser. No. 12/429,119, filed on Apr. 23, 2009, and titled "Systems and Methods for Natural Language Communication with a Computer," and as a continuation-in-part to U.S. Non-Provisional patent application Ser. No. 13/624,762, filed on Sep. 21, 2012, and titled "Systems and Methods for Accessing Web Pages Using Natural Language," which is a continuation of U.S. Non-Provisional patent application Ser. No. 12/789,368, filed May 27, 2010, titled "System and Methods for Accessing Web Pages Using Natural Language," and issued as U.S. Pat. No. 8,275,788 on Sep. 25, 2012, which is a continuation-in-part of U.S. Non-Provisional patent Ser. No. 12/620,513, filed Nov. 17, 2009, entitled "Systems and Methods for Generating a Language Database that Can Be Used for Natural Language Communication with a Computer," and issued as U.S. Pat. No. 8,214,366 on Jul. 3, 2012, the entireties of all of which are hereby incorporated herein by reference.

BACKGROUND

I. Field of the Invention

The invention is generally directed to natural-language interactions with a computer, and, more particularly, to methods and systems for effectively representing human thought in all its subtlety in stored data and processing the stored data in a manner on level with the human mind.

II. Description of the Related Art

For over forty years the goal of language understanding has been to work towards modeling the human mind in a computer. Developing a machine capable of understanding human thought and natural language has been a leading-edge objective of computer science since Alan Turing first proposed the Turing Test in 1950. Much has been written about HAL, the iconic character in "2001: A Space Odyssey," a 1968 science fiction film directed by Stanley Kubrick. Achieving this echelon is recognized as the holy grail of computer and cognitive science today.

Enormous investments of time and money have been committed to computer understanding. Intense efforts have resulted in schemes like Resource Description Framework (RDF), Web Ontology Language (OWL), Cyc and IBM's current Watson project, which are still works in progress. After sixty years, this enterprise is well funded and ongoing, but it has proven to be a very difficult task. There is still is no clear roadmap. Language understanding is made difficult because the literal meaning of an utterance is very often not the intended meaning of that utterance. Any utterance has to be interpreted with many considerations in mind. Workers in the field generally acknowledge that there are still three breakthroughs required: breakthroughs in Knowledge Representation, breakthroughs in Natural Language Theory, and breakthroughs in Language Understanding Software.

SUMMARY

Accordingly, systems and methods are disclosed that address these deficiencies in the present art. For instance, a software and hardware system is disclosed for storing declarative knowledge in a computer database, at a complexity level matching the human mind. Declarative knowledge is the kind of "unstructured" knowledge rendered by natural language and human thought. The system may enable intelligent dialog with the database in sophisticated natural language to invoke appropriate textual or machine responses to language inputs. More particularly, the system may comprise a database of certain structures, a parser module, and a software and/or hardware response system that makes appropriate responses to text or voiced inputs. Such a system may be a useful tool for any application dealing with the storage of and access to declarative knowledge. It can service a variety of business and scientific applications, such as storage of unstructured information, electronic medical records, publishing, distance education, national security avatars, computer games, human-machine interfaces, Internet access and search, frequently asked questions (FAQs), customer relationship management (CRM), writing courses, research in linguistics and cognitive science, etc.

Thus, in an embodiment, a system for parsing text in a natural language communication with a computer is disclosed. The system comprises: at least one hardware processor; a database; a builder module, interfaced with the database, that, when executed by the at least one hardware processor, constructs at least one table that represents knowledge defined by one or more model expressions, wherein each of the one or more model expressions comprises a string of language elements, wherein each of the language elements comprises a word or punctuation mark, and wherein constructing the at least one tables comprises, for each of the one or more model expressions, for each language element in the string of language elements of the model expression, including at least one punctuation mark, generating a concept symbol that represents a meaning of the language element, to form a string of concept symbols in a same order as the string of language elements, in a series of one or more rounds, combining one or more pairs of concept symbols in the string of concept symbols into a newly generated concept symbol that represents a meaning of the combined pair of concept symbols, to form one or more shortened strings of concept symbols until a single concept symbol remains that represents a meaning of the entire model expression, and, for each generated concept symbol, storing the concept symbol in its own row in the database; and a parser module, interfaced with the database, that, when executed by the at least one hardware processor, parses one or more input expressions, wherein each of the one or more input expressions comprises a string of language elements, wherein each of the language elements comprises a word or punctuation mark, and wherein parsing each of the one or more input expressions comprises identifying rows in the database that corresponds to each language element in the string of language elements of the input expression, including at least one punctuation mark, wherein each row comprises a concept symbol that represents a meaning of the language element, generating a string of concept symbols from the identified rows, in a series of one or more rounds, identifying rows in the database that comprise pairs of concept symbols in the generated string of concept symbols, and replacing the pairs of concept symbols with the concept symbols in the identified rows, to form one or more shortened strings of concept symbols until a single concept symbol remains that represents a meaning of the entire input expression, and providing a response based on the identified row in the database that comprises the single concept symbol.

In an additional embodiment, a method for parsing text in a natural language communication with a computer is disclosed. The method comprises, by at least one hardware processor: constructing at least one table that represents knowledge defined by one or more model expressions, wherein each of the one or more model expressions comprises a string of language elements, wherein each of the language elements comprises a word or punctuation mark, and wherein constructing the at least one tables comprises, for each of the one or more model expressions, for each language element in the string of language elements of the model expression, including at least one punctuation mark, generating a concept symbol that represents a meaning of the language element, to form a string of concept symbols in a same order as the string of language elements, in a series of one or more rounds, combining one or more pairs of concept symbols in the string of concept symbols into a newly generated concept symbol that represents a meaning of the combined pair of concept symbols, to form one or more shortened strings of concept symbols until a single concept symbol remains that represents a meaning of the entire model expression, and, for each generated concept symbol, storing the concept symbol in its own row in a database; and parsing one or more input expressions, wherein each of the one or more input expressions comprises a string of language elements, wherein each of the language elements comprises a word or punctuation mark, and wherein parsing each of the one or more input expressions comprises identifying rows in the database that corresponds to each language element in the string of language elements of the input expression, including at least one punctuation mark, wherein each row comprises a concept symbol that represents a meaning of the language element, generating a string of concept symbols from the identified rows, in a series of one or more rounds, identifying rows in the database that comprise pairs of concept symbols in the generated string of concept symbols, and replacing the pairs of concept symbols with the concept symbols in the identified rows, to form one or more shortened strings of concept symbols until a single concept symbol remains that represents a meaning of the entire input expression, and providing a response based on the identified row in the database that comprises the single concept symbol.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 1-45 illustrate flow-of-meaning trees and/or Mensa tables for various example language expressions, according to an embodiment;

FIG. 46 illustrates alternate phrases for an example language expression;

FIGS. 47-49 illustrates flow-of-meaning trees and/or Mensa tables for various example language expressions, according to an embodiment;

DETAILED DESCRIPTION

Figure 1:
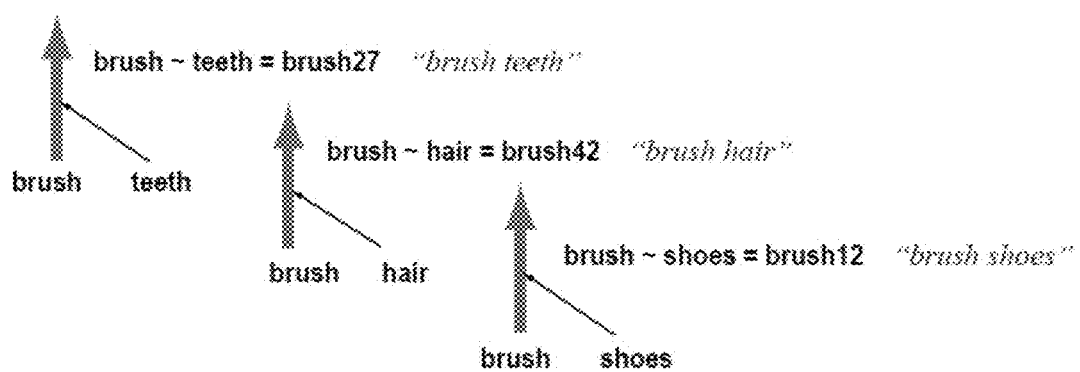

One important point of distinction between certain embodiments of the disclosed invention and current efforts in computational linguistics should be made. Science writer and novelist Richard Powers pointed out that present statistics-based Natural Language Processing (NLP)—the open-domain approach to question answering—has long been one of the holy grails of artificial intelligence. The requirement that text must be read unseen by the computer is an ambitious and difficult path not likely to be mastered for many decades. On the other hand, certain disclosed embodiments are closed-domain. In other words, only knowledge that has been pre-encoded in the database is dealt with, but with an understanding of what complex language text means. The vocabulary and concepts in all the sentences that the disclosed parser will encounter are pre-encoded. In essence, what the parser does is identify whether a sentence being parsed is expressing one of the concepts encoded in what will be referred to as a "Mensa" database, which is infinitely scalable, containing as many concepts as desired. For this reason, disclosed embodiments have no need to manually tag words for parts of speech (POS) in large text corpora to statistically develop rules for which particular POS a word may have in any instance, and no need to train the parser on large text corpora.

Language is a vast combinatorial system which can say trillions of different things, all making sense. Linguists usually express this idea by saying that an infinite number of sensible language expressions and sentences are possible. Steven Pinker in The Language Instinct perhaps best describes this remarkable property of language:

"The fact that grammar is a discrete combinatorial system has two important consequences. The first is the sheer vastness of language. Go into the Library of Congress and pick a sentence at random from any volume, and chances are you would fail to find an exact repetition no matter how long you continued to search. Estimates of the number of sentences that an ordinary person is capable of producing are breathtaking. If a speaker is interrupted at a random point in a sentence, there are on average about ten different words that could be inserted at that point to continue the sentence in a grammatical and meaningful way. (At some points in a sentence, only one word can be inserted, and at others, there is a choice from among thousands; ten is the average.) Let's assume that a person is capable of producing sentences up to twenty words long. Therefore the number of sentences that a speaker can deal with in principle is at least 10^20 (a one with twenty zeros after it, or a hundred million trillion). At a rate of five seconds a sentence, a person would need a childhood of about a hundred trillion years (with no time for eating or sleeping) to memorize them all."

But what does not appear to be widely recognized by linguists is that it is also possible to say the same thing, to express the very same concept, precisely, in billions of different ways. Pronouns, epithets, synonyms, paraphrases, synecdoche, metaphors, multiple subordinate clauses, etc., are all commonly used in expressions and sentences that can refer to the same precise concept. One can freely use active or passive voice and change the order of words and phrases, again in a virtually infinite number of ways, while preserving the same meaning. We follow Stanislas Dehaene in using the term "invariance" to describe the mind's ability to realize that a concept is the same even if expressed in many different ways. The size of the Cartesian Product of word strings that say exactly the same thing create a huge combinatorial problem for natural language processing.

John Locke's classic "Essay Concerning the Human Understanding" is informative. In 1691, John Locke argued that an observer holds clear ideas in his conscious mind, as tangible entities that can be recognized, experienced, identified, and described:

"The coldness and hardness which a man feels in a piece of ice being as distinct ideas in the mind as the smell and whiteness of a lily; or as the taste of sugar, and smell of a rose. And there is nothing can be plainer to a man than the clear and distinct perception he has of those simple ideas."

Locke goes on to claim that a complex mental concept is a construct of simple mental concepts that can be assembled into formal structures that represent complex ideas:

"Secondly, there are others compounded of simple ideas of several kinds, put together to make one complex one;—v.g. beauty, consisting of a certain composition of colour and figure, causing delight to the beholder; theft, which being the concealed change of the possession of anything, without the consent of the proprietor, contains, as is visible, a combination of several ideas of several kinds: and these I call mixed modes."

Disclosed embodiments represent, with symbols, the clear ideas that John Locke viewed as tangible entities in the mind. To model the complex ideas, into which these ideas can be compounded, the symbols can be related appropriately into the directed binary tree structures of graph theory. Such trees can be fully specified both by natural language expressions, and by arrays, for instance, in database tables, which will be referred to herein as "Mensa Tables." These tables may enable at least two functions: (1) precise storage of complex declarative knowledge in an ontology that is completely harmonious with language, and (2) the ability to direct a parser to perform precisely all the operations necessary to parse a complex language expression for its precise target meaning. Thereby, any knowledge that can be stored in natural language can be stored in a Mensa Table to an equal degree of nuance. And once concepts are stored in a Mensa memory, texts that express those concepts can be processed by a computer parsing algorithm.

A language expression comprises an ordered list of symbols, each one standing in for a mental concept. It gathers all the concepts mentioned together into a congruent structure, which itself is a unitary complex concept in Locke's sense that can be identified by a single compact symbol. Each type of expression, from decimal numbers to postal addresses, to Uniform Resource Locators (URLs), has its own idiosyncratic grammar or rules of syntax. It is necessary to understand these rules in each case to successfully parse the expression. What has been lacking in current NLP is a satisfactory theory of how the grammaticals (i.e., the stop or function words of language) work. Conventionally, there is not an all-encompassing theory of punctuation that is amenable to the computer. In certain embodiments, operations are based upon fully developed theories concerning both grammatical function and punctuation.

Other innovative insights include: language expressions function like algebraic expressions, the procedure for parsing them being identical, as shown by the same software language parser that is able to parse a language expression also being able to obtain the numerical value of an arithmetic expression; the realization that the parsing process is also the same as that of a single elimination tournament, such as the U.S. Tennis Championship or March Madness; the fact that an expression, such as a URL. or Web Address, which can define a path to a file on a particular computer somewhere in the world, can be defined by a Mensa Table; the fact that phonemes and morphemes of a word have a mnemonic value that provides strong clues as to what the word means, which likely explains why the word was adopted for its semantic purpose in the first place.

Interestingly, studies of the brain activity that occurs during thought and language processing, using electrodes, functional magnetic resonance imaging (fMRI), diffusion MRI, electroencephalography, and more, strongly suggest that concepts are mapped locally and topographically in the brain. Individual "grandmother" neurons are assigned as identifiers of individual mental concepts, even complex mental concepts. Such a grandmother neuron fires whenever its concept is sensed, words that mean it are heard or read, or the concept is simply imagined. Just as the brain maps a language expression to a particular grandmother neuron among millions in the left temporal-frontal lobes, the disclosed parser can map the same language expression to a database row among millions. In the disclosed system, neurons are modeled by database rows, and the synaptic connections between neurons by the pointers between the rows. Furthermore, with calculations most likely performed largely unconsciously in the frontal lobes, the human mind puts an importance value on each concept in context, to score what concepts mean to some individual or to society. The ability to figure out what is behind what is observed is an important survival faculty. In an embodiment, there is room in the disclosed Mensa tables to score concepts for importance in context, and thus, enable computer programs to be developed to make sensible decisions weighing all the factors, make moral judgments, and even identify or understand jokes.

I.1. Relatives, Relations, and Relationships

The mind models the world as a set of relations between concepts. According to John Locke, relations are themselves very clear concepts in our minds, fully fledged concepts in their own right that we recognize when we see them or think them. We have found that a relation concept that relates a pair of relative concepts (e.g., its subject concept and its object concept) can be represented by a unique unitary symbol like any other concept. Each relation symbol mediates an exchange of meaning between two related concepts, causing them to adapt to fit each other, to become creatures of the relationship. While molded by the relation, relatives also transform the relation.

Relations are key to modeling the world, as they form the basis for so many disparate things. Relations can be highly abstract or solid real things. For example, a screwdriver is the relation between the hand and the screw. We say that all relations are binary. A relation is a way of comparing or considering two things together, and giving one or both of them some appellation from that comparison. Relation concepts receive meaning from and relay meaning to their two relatives. Put another way, when two concepts are related, they adapt to accommodate the relationship.

The Symbols of Relationships

We have found that relation concepts, just like end concepts, can be represented by unique unitary symbols. A relationship involving concept A and concept B can be represented by a string of three symbols, A$r$B, where $r$ is the symbol standing for the relation, and A and B are symbols standing for the first and second relatives. Since symbols can have many senses, just like words, once related, the sense of each of the three symbols shifts to fit in with the other two. Concept A has its sense altered by being enriched by meaning flowing into it from its relative, concept B, via relation concept $r$. The sense of concept B adapts due to meaning flowing in the opposite direction, again via relation concept $r$. The relation itself, concept $r$, becomes individualized by being the relation concept between sense-adjusted concepts A and B. Relation concepts (e.g., $r$ in this example) process meaning received from the object concept. They process this meaning and then relay it on to the subject concept, and vice versa. It is a two-way, two-step, settling process. However, in the grand scheme of things, one concept survives modified, to engage in a relationship with another survivor concept at a higher level in the next round of the "tournament."

The convention in this disclosure is that underlined words designate concepts. Most relations are non-commutative (e.g., "man bites dog"), so we refer to first relative and second relative. We also adopt the convention of calling the first relative of the relation the "subject" and the second relative the "object" of the relation.

In parsing an expression, the subject concept is most often the surviving concept. In parsing a finite sentence, the seam concept that the verb enriches is the surviving concept. A telling example of concept adaptation occurs when we hear or read the zeugma "he brushed his teeth and hair." There is a jarring effect on the reader. One immediately feels that something is wrong. The sensory patterns are hard to reconcile. What has happened is that the sense of verb concept brush has become so adapted to concept teeth that it has become highly incompatible with concept hair. Although the generic brush verb action is completely preserved, there is a marked change in the sense of verb concept brush. As one goes from brushing teeth to brushing hair to brushing shoes, there are fundamental differences to the experiences in one's mind. Similarly, when one goes from toothbrush to hairbrush to shoebrush, the physical brush also changes radically. To sum up, when two concepts are put side-by-side in the mind or in a language expression, they are related, they become relatives, and what is between them is a relation. The two concepts, joined by a single relation, are in a relationship. The set of three is a relationship. This schema allows for a formal technical definition, alluded to above, of the terms "relative," "relation," and "relationship".

FIG. 1 demonstrates flow-of-meaning trees and Mensa table rows for the three-brush concept discussed above. This example demonstrates that, in a finite sentence, the syntactical object of the verb has a major "back effect" on the nature of the verb action. The qualitative nature of the brushing is substantially changed by the words "teeth," "hair," and "shoes." However, meaning flows forward too, in a similar manner to how traditional grammarians talk about "transitive" verbs. In this example, as concept brush changes its sense, the teeth get clean, the hair gets neat, and the shoes get shiny. A transitive verb is actually a relation concept. When any two concepts are placed in juxtaposition in the mind, they become relatives. They affect each other. Both concepts and the relation itself are modified in the process.

Like words, concepts are polysemous. That is, concepts assume different meanings in different contexts. The sense of a concept shifts to fit in its new context. Relations play a huge role in the construction of complex concepts, in which words focus meaning on each other. To quote one of Dwight Bolinger's most apt observations: "In fevered competition and intervention . . . language is at war with itself." We have developed flow-of-meaning-trees, embodied in Mensa tables of relations, to illustrate how, when one concept is related to another, meaning flows from one to the other. Flow-of-meaning-trees and Mensa relation rows both indicate the direction of flow of meaning into one of the relative concepts, which then becomes the meaning-enriched "survivor" concept of the relationship.

Presently, it is impossible for computers to do the necessary mental calculations to determine a shift in sense that occurs in a concept when related to another concept in the mind, and certainly impossible for a computer to appreciate the new sense of the related concepts in some form of machine consciousness. But, fortunately, there is a way around this difficulty. In embodiments, the symbol of the surviving concept of each matched concept pair is marked to record that it has changed its sense from being in that particular relation. That modified symbol now represents the concept as it is enriched in its context. The same concept modified by a different relation in a different context would have a different sense and be assigned a different symbol. This is an example of the extraordinary power of symbols to "have an independent existence and an intelligence of their own," as Henrich Hertz famously said.

"BE," "HAVE," and "DO" relations serve to connect relatives by defining the three classes of relations that can occur between them. BE, HAVE, and DO relations are employed to mediate affirmation, negation, and modality in what we call "subject-seam" sentences, where the subject concept enriches a BE, DO, or HAVE auxiliary or modal grammatical. The function of an auxiliary or modal is to relate its "subject" concept with its "object" concept, indicate whether this relation applies or not, and indicate the degree of its existence, i.e., its modality. The symbols for modals: "can," "could," "shall," "should," "must," "might," "would," "will," and others are variants of "do" and relate a subject concept with a verb phrase concept just like "do" does. Sentences defining affirmation, negation, and modality are analytical sentences, as opposed to narrative or descriptive sentences that set a scene or move a story along.

How Language Manages Relations

Language orthographs relations, starting with elementary relations and proceeding in order to more complex relations. Grammatical symbols, particularly prepositions, stand for and specify relations. In language, the standard representation of a relation between two concepts is made by placing two symbols adjacent to each other, in order, with a relation symbol in between. The result is an expression. There is progression from simple to complex relations. When a relation is obvious, a space is employed to represent the default relation between those two concepts. For straightforward simple relations, when there may be several common alternatives, a single grammatical relation symbol is inserted between the concepts to define which relation it is in a particular case. More complex relations have to be defined by longer strings of symbols between the relatives. When there is only one possible relation between two relative concepts (e.g., a well-known default relation), the second person or addressee will know how the senses of these two particular relatives shift when they are paired. In such a case, a specific relation symbol is redundant. Thus, a space is used as the simplest grammatical relational symbol that can represent a relation between two concepts.

When meaning flows between the relatives via a space relation, the standard shift in the senses of the relatives ensues. Here are examples of default relations designated by a space: "big mouse", "big house", "old man", and "blue sky". To see how relations like these are modeled in the computer by means of Mensa tables, consider the following adjective-noun relations:

big~mouse=bigmouse ("big mouse")
big~house=bighouse ("big house")

The mouse and house concepts are modified, surviving BE-type relative concepts. In each case, the concept has a changed sense. Concept house now has sensory features of both concepts big and house. Perhaps more importantly, one's idea of concept big also adapts. Concept big in "big house" is different from concept big in "big mouse". Here, big is "relative." Context matters. Adjective concepts change their sense, just as nouns do, when related.

Preposition Grammaticals—The Basic Relations

If there is not an obvious standard default relation between two particular relatives (e.g., there may be several common relations possible), then a single relation grammatical symbol like of or to, replacing the space between the relatives, suffices to define the relation. For example, when a lamp and a table are related, the specificity of the relationship is achieved by placing a particular relational grammatical particle (in this case, a preposition grammatical) between the pair of concepts, since there are many possible relationships between any two given relatives. The concept lamp could be said to be "at," "on," "in," "above," "below," "under," "over," "with," "from," "to," "beyond," "before," or in a relation defined by some other preposition with respect to the concept table. So a need arises to specify precisely which relation applies in any given instance. It is the preposition that is chosen that determines exactly what meaning is transferred between relatives in a given context. A single preposition relation grammatical placed between the relatives suffices when there is only a need to specify which one of several possible relations between the two relatives applies in a particular instance. Here are some examples, including one that does not make sense: "glass of water", "road to Boston", "learn from experience", "response with a crime", and "(turn) a minor problem into a crisis"

BE, DO, and HAVE Type Relations

If we accept that meaning flows to and fro between a first relative and a second relative via the relation, we can further study language, and characterize the ways this meaning flow occurs. We find that there are three ways, denoted in English by use of the auxiliary forms of verbs BE, HAVE, and DO. In sentences, such as "he is old", "the house has a tin roof", and "birds do fly", there is a different type of meaning flow between relatives in each case. More than half of all sentences in English express a BE relationship.

In BE-type meaning flow—the default relation that is not required to be explicitly specified in language—the first mentioned subject relative acquires the sensory pattern of the other object relative. In BE relations, the sensory pattern from the second relative concept blends into the first relative, modifying it by adding some or all of its sensory pattern "as is," to it. The most straightforward example of BE-type meaning flow from one concept to another is where an adjective contributes its sensory pattern to a noun's sensory pattern, or an adverb adds its sensory pattern to a verb's sensory pattern. With the sentence "the roof is red", the sensory pattern red is fused, as is, into the sensory pattern roof to create surviving concept redroof, which shares both sensory patterns. To describe this mental operation of concept fusion, we use the auxiliary form of verb "be" as in "the car is fast," which is why we call it BE-type flow meaning or a BE relation. We have to say "The roof is red". We cannot say "the roof has red" or "the roof does red."

In a BE relation, two concepts are seen together at the same time in the same place, and they blend into a single concept. It is easy to see sky and blue together in the same view merging into a single concept, e.g., with a modified noun concept sky being the surviving concept. The popular "happiness is" sayings (e.g., "happiness is a warm gun") illustrate a point about the BE relation. The saying "happiness is a dry martini" blends the concepts of happiness and adrymartini, in that we see them together in the same space.

In HAVE relations, two discrete related entity concepts are placed in mental juxtaposition. The two relatives stay distinct, but influence each other. Each relative induces a change in the other. An example of a HAVE-type is expressed by the sentence "Jim has a hot temper," which relates concepts Jim and hottemper. Jim is characterized by the HAVE relation as hottempered. We cannot say "Jim is a bad temper" or "Jim does a bad temper," because "is" and "does" indicate relationships that are not BE relationships.

The phrase "container of milk" is an example of entity-type concepts in a HAVE relationship. Noun concept container is related to noun concept milk. Although the two sensory patterns are seen together, they remain distinct. Both concepts adapt: the carton will efficiently contain and dispense milk through a port and be labeled to make its contents clear to an observer, and he milk inside the carton will take the shape and volume of the carton. Note that this relationship requires the explicit relation grammatical "of" to indicate it is a HAVE relationship.

The container itself receives none of the fluid sensory pattern of milk. Meaning flow is not an as-is BE-type fusion of the milk sensory pattern into the container sensory pattern. Rather, concept milk induces change in concept container, and vice versa. The modified container concept assumes its nature because milk is an essential part of the product. We have to say "the container has milk (in it)." We cannot say "the container is milk" or "the container does milk."

In another HAVE example, when we say that "the car has five doors", concept thecar develops a sport utility vehicle (SUV) sensory pattern and concept fivedoors adapts to be the sensory pattern of SUV doors, namely in the fact that the fifth door opens backwards. We cannot say "the car is five doors" or "the car does five doors."

Note that relations expressed by the verb "have" are cognate with relations expressed by the preposition "of." The car has a fifth door expresses the same relation as "the fifth door of the car." This probably explains why "I shouldn't of done it" somehow feels right. While phonetic drift can explain why people say it, there is also an implicit HAVE relation built into this "of" expression.

DO relations lie between a first relative subject. This creates an individualized "on" with a special sense (e.g., "on a table") carrying a meaning that is perfectly clear to us. We may arbitrarily assign symbol on52 to the concept in order to distinguish it from the generic empty on concept, and the myriad of other meaning-filled on concepts.

The expression "a lamp on a table" can be parsed in two ways. It can be talking about a lamp rather than a relationship. In this case, the flow-of-meaning tree defined by these four relations is governed by a different last row, in which the-lamp entity is the surviving "end-it" concept, rather than the a-lamp-on-the-table "mean-it" relationship. Grammatical "on" accepts a particular meaning from its object concept and relays it back onto the subject concept. The meaning transferred to the lamp is a temporary location attribute. The lamp gains an accidental property: location. Once we know or assume it is a table lamp, concept table becomes an essential adjective property of the lamp.

Many expressions and sentences have this duality of meaning, i.e., being either an end-it or a mean-it concept. A diligent reader will parse them both ways, a form of mental play. Any one of the concepts mentioned in an expression can be made the "it" concept by mental play, and this can be forced by an appropriate Mensa table. This is the basis of subordinate clause formation, where one concept, chosen to receive meaning from all the others, relays this meaning into a concept in the main clause.

These examples illustrate the idea that the main function of prepositions is to define the structure of relations between concepts. The various preposition and conjunction grammatical particles are the basic relation symbols. They are nothing if not idiosyncratic in their relay functions. Prepositions like "at," "on," "in," and "with" indicate temporary relationships that change the accidence of the surviving concept (e.g., its location, not its essence). On the other hand a surviving concept's essence is modified by the preposition "of." For example, the door of a car is a different kind of door in its essence from a door of a house, whereas a door stored in the garage is just the same door, with new accidence. The relative concepts of prepositional phrase relations are entity concepts.

The next level of relational complexity needs more than one of the standard set of preposition grammaticals to specify it. For more complex relations, something more multifaceted than a single relational grammatical or a short relational phrase "to" is needed to specify which relation of the possible relations pertains in a particular instance to model our highly nuanced world. The number of possible relationships between two concepts may become enormous and diverse. The short list of preposition grammaticals may not suffice. Fortunately, language is able to define an infinite number of different relations between two relatives with relational expressions that parse to a preposition relation grammatical, which may be considerably enriched by adjacent lexical concepts.

Simple relations can be defined by a short relational phrase. More complex relations have to be defined by placing a longer string of symbols (i.e., a relational expression) between the two relatives. Although a relational expression renders its flow-of-meaning tree very articulate, it parses to a single enriched grammatical concept that defines a complex relationship.

Here are some examples of short relational phrases that enrich a relation grammatical to make a relation more complex than a simple preposition can: "well into," "in terms of," "heavier than," "not enough to," "not coextensive with," and "as well as."

Authors can control the exact meaning of a relation with a carefully composed relation expression. A Mensa table can be composed that defines an articulate flow-of-meaning tree, and thereby a complex relation. The benefit of flow-of-meaning trees is that they illustrate exactly what authors intend to say with perfect clarity.

Relations Between Clauses are Relations Between Relations

So far we have mainly considered relations between entity relative concepts. What about relations between relation concepts? The most easy to understand grammaticals that mediate relations between relations are the conjunctions "after," "although," "as," "because," "before," "if," "once," "since," "so," "so that," "though," "till," "until," "when," "where," and "while," all of which can relate two clauses to each other. An entire clause, which is itself a relation, can relay conceptual content into another clause, i.e., another relation. Meaning flows from one clause to the other via the conjunction relational grammatical. This is recursion.

Figures 2A, 2B:
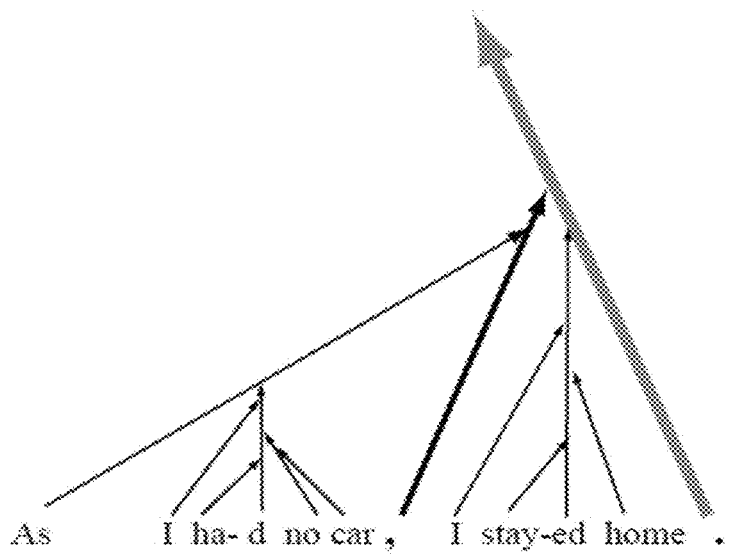

Take the sentence: "As I had no car, I stayed home.", and its variations "As/since/because I had no car, I stayed home." and "I had no car, so I stayed home." The flow-of-meaning tree for this complex sentence is shown in FIG. 2A: "As I had no car, I stay-ed home." The Mensa table for this complex sentence is shown in FIG. 2B.

The observation concept expressed by "I stayed home" is packaged in the . or "period" concept. The concept expressed by subordinate clause "I had no car." is "enclaused" in grammatical "as", which is thereby enriched to as270 and then enclaused in comma concept, as270. This comma concept is then included in the period concept. Each conjunction puts its idiosyncratic stamp on the subordinate clause concept that it enclauses and therefore contributes subtly different nuance to "staying home". For example, substitute "since" or "because" for "as", and try to sense the effect on the nuance of the main clause.

Here, grammatical "as" picks up meaning from the relation in a subordinate clause, and via the comma uses it to put a special spin on the sense of the relation in the main clause. When high-level concepts are enclaused in punctuation marks, which are then related with each other to produce a surviving punctuation mark concept, we are in the realm of logic. Note that if I say "I have no car, so I will stay home.", you might reply "That's logical."

In another example of the function of "as", compare "I don't know how I can do that." and "I don't know as how I can do that." Grammatical relation "as" expects a relation object concept. In the first case, concept howIcandothat is simply the object of verb concept know. In the second case, "as" is looking for a relation, and so concept Idontknow is questioning the "can" relation between concepts I and dothat.

Metaphors

Relations between relations can be very useful in explaining what we mean, and they are the basis of metaphor. Metaphor is a technique to enrich one relation by saying it is the same as or close to another relation that the addressee already fully understands. A metaphor piggybacks on an addressee's grasp of that other relation, which has been garnered from the addressee's experience in another context.

Relation grammatical "as" signifies a relation between two relations, usually employed in a metaphor to explain or enrich the first relation, e.g., a multiple choice question in a SAT exam of the form: A is to B as C is to D, E, F, or G? This multiple choice question aims to find out whether the individual being tested is able to discern which of the relations $C_RD$, $C_RE$, $C_RF$, or $C_RG$ is the same relation as relation $A_RB$. If the individual did not get $A_RB$ in the first place, it would be helpful to be told $A_RB$ was the same as $C_RF$ for instance. Then he would probably figure $A_RB$ out. This is why metaphors are so useful for explaining subtle meanings.

Colorful and vivid metaphors make a point. For example, a Wall Street Journal editorial on Rupert Murdoch's comeuppance over the "News of the World" hacking scandal described comments by rival publications: "the schadenfreude is so thick you can't cut it with a chainsaw." Here a relation is extracted from one context and transferred colorfully to another context with one common concept, schadenfreude.

Our theory makes clear the idiosyncratic function of grammatical "like", which admits an adjectival conceptual concept only, with a strong evaluation component by the speaker. The other use of "like," for which modern young people are widely scolded (e.g., "I'm like, how could she say that"), is entirely legitimate and conveys precise subtle meaning. Here, like is enriched with adjectival meaning from the whole juxtaposed finite sentence. Then, subject relative I in the main clause is enriched by enriched object relative like.

Relationships

As an illustration of the power of a series of relations between relatives to organize a large number of concepts into a relationship, consider that the Swiss National Tourist Office might want to get a certain complex of concepts into the heads of visitors to Zermatt. Their brochure might say, "The visitor to Zermatt must take the cogwheel railway to the summit of the Gornergrat for magnificent views of 29 alps over 4000 meters and 7 glaciers." This finite sentence parses to a complex but unitary must concept mustering twenty-seven separate mental concepts, showing all binary connections between concepts and the direction of meaning flow. FIG. 3 shows the flow-of-meaning tree for the relationship expressed by this long sentence where meaning contributed by each symbol ends up in enriched concept must.

The unmistakable pattern of a sailing ship in FIG. 3 suggests why a complex tree of n−1 paired relations is called a relationship. The tall must concept is a "mast." Or is it vice versa? This suggests that the unconscious mind literally uses the pattern of a tree figure to muster observed concepts into a gestalt. Another telling example of the validity of this idea is suggested when someone says, "Everything's gone haywire." We realize that this is a claim very likely to evoke "pushback," rejection, and even open hostility, but we cannot avoid the suspicion that the unconscious mind uses a literal tree diagram to manage understanding of what we see in the world.

Any system of interactive symbols relaying meaning back and forth is a relationship. In the case illustrated in FIG. 3, it is a must. With access to a Mensa table containing these relations, a parser can easily parse this long sentence.

When an Expression does not Make Sense

Interestingly, we have observed that the meaning flow arrows of a flow-of-meaning tree cannot cross if the expression is to make sense. What happens in the brain when a language expression or a picture does not make sense has been studied by neuroscientists looking at electroencephalographic signals that occur when research subjects read language expressions. There have been numerous scientific papers written since the discovery of N400 by Maria Kutas and Steven Hilliard in 1980. There is the N400 ERP signal when the expression does not make sense, and the P600 signal when syntax is violated. The brain seems to be busy casting about to see if there is another context where the relationship expressed would make sense.

Whether a language expression "makes sense" is determined by whether the relationship it expresses occurs in the world or not. For example, to say that the lamp is "of the table" does not make sense. This suggests that the phrase "make sense" means that the concepts match up in a way that we may well see out in the real world, and that the phrase "not make sense" means that we never see it that way out in the world. Which expressed relations do make sense are based on our knowledge of the world. Judging this is difficult for a computer because it cannot avail itself of consciousness.

The disclosed Mensa tables address this difficulty. To see if an expression makes sense, a parser, utilizing a Mensa database, may judge whether the language expression gets through to a neuron involved with the conscious experience of the relevant concepts. The relation between the two concepts that correspond to those two things, the relation between the symbols that correspond to the two real things, and the relation between the two real things, is the same relation. A relation between the real thing and the concept or symbol that corresponds to the second real thing is also the same relation.

The mind appears to mix and match real things, concepts, and symbols unreservedly in mental structures. The mind's picture of the world is a free mixture of real things and associated mental concepts. There is another way to look at relations. One can think of the object relative of a relation grammatical like in defining a particular type of mental space in which concepts, named by the subject relative, can be contained. To pass muster, so as to be fit (of-it) to be in such a space, concepts have to adapt appropriately. This idea, which is in effect the same as having one concept relay meaning into its neighbor, is useful for understanding preposition relation grammaticals "for" and "to" for their roles in defining the mind's command and control (comcon) system and for parsing how and why questions. One can look at relations another way: the object concept of a relation governs a space in which the mentioned subject concept is shaped.

I.2. Grammaticals and Lexicals

Language consists of two subsystems of symbols: lexical words and grammaticals. Lexical words are the content words: nouns, verbs, adjectives, and adverbs. Grammaticals are a framework upon which the lexical concepts are hung. Lexicals can be considered to stand for the conceptual content that grammaticals hold and relay. Grammaticals are the structure words comprising free particles: pronouns, determiners, prepositions, auxiliary verbs, conjunctions, bound grammatical affixes, and inflections of lexical words. Notably, in an embodiment, punctuation marks are included among the grammaticals.

Children obtain a full command of grammatical functions before the age of five. Achieving this skill is tantamount to learning the ropes of the English language. Evolution of the human brain endowed us with the ability to create and employ a symbol such as a sound or ordered string of sounds, a graphic shape, or a hand, head, or eye gesture to represent a mental concept, and often something in the real world or in an imaginary world.

Grammaticals are perfectly clear concepts in their own right. People often say something is a "must." Salespeople are advised to welcome a "yes," push for a "no," and avoid "maybes." People want no "ands," "ifs," or "buts." Just as algebraic unknowns like x and y can hold any one of millions of values, an empty grammatical like "yes," "no," or "that" can be filled with any one of millions of different meanings of the kind expressed by a finite sentence, depending on which sentence relays its meaning into it. Similarly, personal pronouns like "he," "you," or "me" can stand for any one of billions of people. On the other hand, it is rare to hear of a "the" or an "in" or a "from" or a "to."

There are several hundred English grammatical particles, determiners, pronouns, relative pronouns, reflexive pronouns, conjunctions, prepositions, affirmatives, negatives, modals, lexical word affixes, punctuation marks, etc. Each one is idiosyncratic and specialized in its function. Grammaticals are just as important to meaning as lexical words. Natural language processing systems that ignore grammaticals and punctuation marks may never be adequate to recover the full meaning of language. In an embodiment, the disclosed Mensa tables take into account the meaning contributed by every single grammatical in an expression, including word inflections and punctuation marks.

Determiner Grammaticals

Determiners like indefinite article symbols "a" or "an" and definite article "the" are filled with meaning from the words that follow them. These articles shape this conceptual content. Indefinite article symbol "a," when filled with meaning from the count noun phrase that follows it, represents a singular count entity, not yet identified, not yet declared to exist in the present world of the observer or in an imaginary or memory (past) world. For example, in the noun phrases "a treaty" and "a party," determiner grammatical "a" is enriched by a flow of meaning from the lexical noun following it to represent a specific but not yet instantiated something. Many linguists consider the noun to be the head word of a noun phrase, but in fact the determiner is the head.

The "-s" grammatical suffix of plural nouns as in "earthquakes" is another determiner. It functions as an indefinite article, but a plurality article. Just like "a" and "an," when filled with meaning from its noun's stem, it represents an unidentified group or plurality that does not currently exist in the world.

Definite article determiner symbol "the," when filled with meaning from the noun phrase that follows it, represents something, singular or plural, known to the speaker and assumed to be the only one to exist in the universe of, and is identifiable by the addressee. Determiner "that," filled with meaning from various sources, represents one concept that exists, and is identifiable when there is more than one concept in consideration. Capitalization incorporated in proper nouns functions as determiner "the," indicating an instantiated and identified thing, without the need for a "the" determiner.

Personal Pronouns

Another important class of grammaticals is the personal pronoun. Personal pronouns receive meaning from concepts defined in other nearby sentences by a relay of remote meaning. Pronouns refer out to concepts not identified in the present sentence, i.e., so-called "pronoun references." We prefer to think of pronouns being filled with meaning flowing in from a concept defined in another sentence, defined either before ("anaphora") or after ("cataphora"). The linguistic phenomena of exaphora, cataphora, anaphora, deixis, indexicality, demonstrative, pronoun, and relative pronoun are well understood by linguists. It is not the purpose here to teach them, but to make the point that all these linguistic processes can be precisely represented by flow-of-meaning trees, as embodied in Mensa tables, in a form that is fully manageable by a computer module, such as a parser.

Personal pronouns illustrate how grammaticals can contain only certain meanings and put their individual stamp on them. They can receive gender, number, person, identity, etc. from a remote concept. The addressee has to cast about to figure out with which meaning to fill the grammatical. Humans are good at it, but it is difficult for a computer to figure it out. However, the problem is easily solved using the disclosed Mensa tables. Personal pronoun symbols "he" and "him" can only contain the sensory pattern of a singular male human (or male anthropomorphic personality). Thus, they can contain the concept of any one of the billions of individuals on Earth or in literature. Like determiner concepts "the," "this," and "that," personal pronouns also indicate that the person is readily identifiable to the addressee. Usually, in a particular instance "he" or "him" will contain the single male human mentioned anaphorically nearby in the text. English personal pronouns do retain case markings. Concepts I, thou, he, she, we, and they can only be subject concepts. Me, thee, him, her, us, and them can only be verb object concepts. Parsing a finite sentence, personal pronouns "I," "he," "she," and "they" are subject concept grammaticals that get a bye to the final top level concept match-up of the parsing tournament.

Pronoun Reference

Mensa tables are structured so as to enable the disclosed parser to work in local sections of the Mensa database where a pronoun has a clear-cut reference. The flow-of-meaning tree and Mensa table, illustrated in FIGS. 4A and 4B, demonstrate how a parser is able to obtain the same meaning from these sentences: "The Duke of York did arrive late" and "He did arrive late". With this Mensa table, whether the speaker uses either the full subject entity phrase or the subject personal pronoun "He," both sentences will mean the same, and the parser will arrive at the same concept, i.e., did2396. The concept "Duke of York" has a built-in covert "he" grammatical inside it.

Reflexive Pronouns

Reflexive pronouns like "myself," "yourself," "himself," "ourselves," "yourselves," and "themselves" are used to refer to the first second or third person acting in their own program or interest. For example, only "I" can work with "myself." Others have to deal with "me."

Relative/Interrogative Pronouns

The relative/interrogative pronouns, "who," "which," "what," "when," "where," "how," and "why," are the six honest serving men of Kipling's poem. Relative pronouns pick up only their own type of meaning: "where" picks up location, "when" picks up time, "how" picks up a manner or way, "why" picks up a reason or cause, "who" picks up a human or humans, "what" picks up a thing, and "which" picks up a choice. Relative pronouns mediate interflow of meaning from a party concept in one clause to a party concept in another clause of the same complex sentence. Once filled with meaning by a subordinate clause, and brought to the front, they take part in the main clause, influencing other party concepts there. Each relative pronoun has its idiosyncratic function of relaying just its own kind of conceptual content, whether it be time, place, reason, manner, person, thing, or choice. They are readily managed with Mensa tables defining flow-of-meaning trees.

FIG. 5A illustrates a flow-of-meaning tree for the complex sentence "Djokovic, who won the Australian Open, wins Indian Wells.", drawn in vertical text, which is more convenient when the text is too long to fit across the page, and which allows trees to be drawn for very long texts, such as paragraphs. FIG. 5B illustrates the corresponding Mensa table required to parse the sentence, according to an embodiment.

Here, the relative pronoun "who" receives conceptual content anaphorically from "Djokovic". It is thus enriched with meaning to establish Djokovic as the subject concept of the subordinate clause, acquire meaning there, and then transfer its enriched meaning back to Djokovic in the main clause. Then, whether the input text used "He" "who", or "Djokovic" as the subject, the parser operating locally in the context of year 2011 in the database will arrive at the concept row in the Mensa database with the text: "Djokovic won the Australian Open". If the parser had been operating in a different context area of the tennis database, perhaps dealing with year 2010, the same input would be parsed to at a different concept row, say the one with text "Federer won the Australian Open".

Concept Djokovic is first bundled in the comma to form concept ,Djokovic. Relative pronoun concept who is enriched by predicate concept wontheAustralianOpen and bundled in the comma. It relays meaning back to enrich concept ,Djokovic, which is now the enriched subject concept to predicate concept winsIndianWells, forming the main clause "Djokovic (enriched) wins Indian Wells." Finally, this main clause is packaged in the end period to become an observation concept that could be included in a paragraph describing what he did. This sentence helps us consider how a Mensa table manages the problem of pronoun reference.

To enable the pronoun reference in this case, three Mensa rows may be placed in a local context, i.e. year 2011 of the Mensa tennis database, as follows:

he~wontheaustralianopen=djokovicwontheaustralianopen ("Djokovic won the Australian Open")

who~wontheaustralianopen=djokovicwontheaustralian open ("Djokovic won the Australian Open")

djokovic~wontheaustralianopen=djokovicwonthe australianopen ("Djokovic won the Australian Open")

The flow-of-meaning tree and Mensa table, illustrated in FIGS. 5A and 5B also illustrate punctuation function by showing how the who relative clause is enclaused in a comma before enriching Djokovic, also enclosed in a comma, to become the subject. Then the whole complex sentence is enclosed in a period. In an embodiment, the disclosed systems and methods utilize punctuation marks as fully fledged grammaticals.

THAT

The grammatical "that" is a very useful grammatical. However, linguists have difficulty in distinguishing exactly how "that" functions differentially from the other relative pronouns. "That" does behave like the relative pronouns in that it can pick up meaning from a concept mentioned in both other clauses and other sentences, and insert its gathered meaning into the present expression. "That" picks up its meaning from outside the present view, from knowledge that is not new information, and that is accepted to already exist by a first and second person. However, "that" is much more versatile than any relative pronoun in that "that" can carry the meaning of any one of the concept types carried by the relative pronouns. "That" can also pick up the meaning type of noun-type, verb-type, adjective-type, and adverb-type concepts, as well as meaning from whole expression sentences and paragraphs. Even if a concept has not been mentioned in previous text, it can still be loaded into "that" by an imaginative second person. Moreover, "that" can play the role of any part of speech depending on its place value in a sentence. "That" is restrictively used to identify which one a concept is. "That" phrases and clauses are readily managed with Mensa tables defining flow-of-meaning trees.

Prepositions and Conjunctions

At the core of every relation concept, there is an explicit or implicit relation grammatical. A study of grammatical "to" will bring out many of the properties of relational grammaticals. The object concept of relation grammatical "to" is the intended fixed endpoint of a process or a path. It may be a real end point, but one that has not been reached yet, so "to" is a concept that is held in the mind. It is a very useful grammatical that can help us say what we mean in several ways. In an infinitive, the verb following "to" names the end of a process. The concepts preceding "to" are the process required to get there.

However, in some contexts, the addressee can readily figure out the object concept of "to," such that it does not have to be explicitly specified. For example, "pull the door to" means pull the door to the end of its closing travel but do not latch it. The verb action of "pull" does not include latching. With "when he comes to," specification of the contents of "to" is unnecessary because an addressee aware of the context would be able to determine what concepts to bundle into "to" (i.e., in this case, that he comes (back) to the present, to consciousness).

Grammaticals can contain very complex concepts. This function is practical. Once a complex concept has been precisely expressed by a long expression, using a short proxy symbol instead of repetition in a slow speech channel is practical. It is usually the core grammatical of the expression. Grammatical "do" is exemplary:

"Do you, Jane, take Harry, to be your husband, to have and to hold, for better or for worse, for richer, for poorer, in sickness and in health, but not for lunch, to love and to cherish; from this day forward until death do you part?" "I do."

"Put your left hand on the bible and raise your right hand. Repeat after me. 'Do you swear to tell the truth the whole truth and nothing but the truth so help you God?'" "I do."

In the first example, it is clear that, in the sentence "I do," grammatical "I" contains concept Harry (the bridegroom), and "do" contains the meaning of the complex of verb phrase action expressed by: "take Jane, to be my wife, to have and to hold, for better or for worse, for richer, for poorer, in sickness and in health, but not for lunch, to love and to cherish; from this day forward until death do you part". In the next example, the meaning in "do" is expressed by "swear to tell the truth the whole truth and nothing but the truth so help me God". However, the next time "do" is used it will mean something totally different in that context. These are examples of grammaticals serving data compression needs of discourse by replacing long text strings.

The Value of Grammaticals for a Human-Machine Interface

For a human-machine interface to be effective, it is necessary to be able to both give very clear instructions and for the machine to be able to understand them perfectly. It is not possible to give a specific order of any complexity without using grammaticals. Key words cannot attain the necessary sensitivity and specificity essential to prevent mistakes. However, by parsing grammaticals for the meaning they contribute, one can give a precise instruction, an order to do something or not to do something, or never to do something, or to do it in a certain way at a certain time. Grammaticals provide flexibility to issue orders in your own words with only a responsibility to be clear and precise.

Lexical Words

If, as Leonard Talmy asserts, grammaticals are a closed class, admitting no new members, lexicals are an open class with new words being dreamed up every day. The 2006 Official Scrabble Players Dictionary (OSPD) contains 178,691 words. Lexicals are classified according to which part of speech (POS) they belong: noun, adjective, verb, or adverb. Lexicals are symbols that stand for known sensory patterns, which when heard or read will evoke the same mental concept as will the sensing of the real thing or of a graphic rendering of it.

However, most, if not all, lexical words have a grammatical within them. Modern English words of all parts of speech (POS) end in a systemic set of suffixes like -ly, -al, -ity, -ment, etc. The affixes of nouns and inflections of verbs are bound grammaticals. Meaning flows intraword from the lexical root into the grammatical suffix, the surviving concept. Thus, all lexical words are grammatacized, pre-filled with lexical content. Because the suffix grammatical puts its well known stamp on a word's concept, this allows us to instantly add ten or more new lexical words to our vocabulary for every lexical root we learn. Here, is our quibble with Talmy. He does not articulate that all lexical words are in fact grammaticals comprising an incorporated grammatical pre-filled with meaning from its lexical root.

A word is an ordered series of symbols or letters. The simplest representation of flow of meaning within a word is between the morphemes. It appears that every lexical word has a surviving grammatical in it, receiving conceptual content from all of the other morphemes. The ordered series of morphemes constitute an intra-word expression defining a binary tree. Language uses the same system from the most primitive concepts to the most complex. Within multi-syllabic words, meaning flows from left to right, from the lexical syllable symbol into the grammatical suffix symbol concept. For example, within the word "baker" there is a relation between root concept bake and bound suffix grammatical concept -er. Lexical root "bake" and suffix -er are relatives in juxtaposition within the word with no space between them. Meaning flows from concept bake into concept -er. The -er grammatical is the surviving concept and puts its stamp on the word as a doer. The verb root "bake" indicates what is done. The sensory pattern of a lexical word root flows into its suffix or inflection, and the suffix in turn has an effect on the sense of the lexical root. When meaning flows between intra-word relatives with no space between them, there is no need for explicit definition of the relation because it is the known default relation.

We will treat many other instances of meaning flow to grammatical suffixes within lexical words. Adverbs are generally marked with an -ly suffix bound grammatical that marks it as an adverb. Such adverbs are concept-enriched grammaticals. The same applies to the following words: Oddity, amuse-ment, red-ness, deriva-tive, petr-ify, relat-ion, and fluoresc-ent. In terms of flow-of-meaning trees and Mensa tables, in an embodiment, the suffix or inflection grammatical of lexical words is the surviving symbol, enriched by the meaning of its root morpheme(s). Here "amuse" flows into -ing and "relative" flows into -ity.

Within a lexical word, there is a relation between the root conceptual content and the bound grammatical suffix. Meaning flows into the suffix and vice versa. There is no space inside the word between the two relative symbols. The morpheme relatives touch each other. The default flow of meaning between root and suffix, and therefore the relation between them, is well known to the addressee and does not have to be specified with an intra-word relational symbol.

If the suffix grammatical of lexical words is the surviving symbol, receiving and shaping the flow of meaning from the lexical root, then the prefix grammatical of lexical words appears to control whether the flow of meaning occurs. For example, the un- prefix of "unamusing" prevents "amuse" from flowing into -ing. The prefix grammatical un- seems to be a control symbol that determines whether this meaning flow within the word occurs or not. In this case, the ungrammatical at the beginning of the lexical word indicates that the verb action stops or flows backwards.

Nouns and Verbs

Except for adverbs, which are marked with an -ly suffix, all lexical words have unmarked grammaticals within them, indicating which part of speech (POS) they are, e.g., noun, adjective, verb, or adverb. Personal first names like John and Julia incorporate a gender grammatical. Some English nouns, and all French nouns, carry a gender not indicated with an explicit grammatical suffix, e.g., man, girl, ship. Count nouns, such as "house" and "tree," have an unmarked grammatical within them indicating that they are bounded units. Mass nouns, such as "milk" and "water," also have an included unmarked mass grammatical that makes them unbounded. There are other lexical words where a covert plurality grammatical is incorporated, e.g., "people" and "sheep."

Another more subtle example of lexical nouns holding unmarked grammaticals occurs when they are placed in the subject position in a sentence. Third-person subject noun phrases, by virtue of their location in a finite sentence, have an unmarked "he," "she," "it," or "they" grammatical within them. Verb object noun phrases have an unmarked "him," "her," "it," or "them" grammatical within them.

Most verbal lexicals comprise lexical verb roots that enrich verb inflection grammaticals, e.g., -es, -ed, -ing, -en, -ion, -ation, and -ment. Older English irregular strong verbs, such as steal/stole, stand/stood, and take/took, lack a past tense -ed inflection. Their tense is indicated by a contained hidden grammatical.

Here we get a glimpse of the distinction between verbs and nouns that allows us to understand exactly what confers noun-hood or verb-hood on a lexical word. Nouns enrich standard noun suffixes. Verbs enrich standard verb inflections. A lexical word in noun-subject or verb-object position is a noun. The existential difference, however, is that a noun sensory pattern can be recognized in a photograph. Recognizing a verb sensory pattern requires the passage of time, as in a video or moving picture.

I.3. Algebraic and Language Expressions

Because of the power of symbols to model reality, there is a close parallel between algebraic and language expressions. Lexical words, phrases, clauses, sentences, and paragraphs can be mapped onto a directed binary tree structure, and algebraic expressions and equations encode directed binary trees in a similar manner. Thus, in an embodiment, the same software parser can parse both a language and algebraic expression.

Algebra operates effectively on symbols to model real-world systems without having to consider what the symbols mean. In other words, algebra can follow a formula mindlessly to obtain the right answer. Frank Wilczek, in his book "The Lightness of Being," quotes Heinrich Hertz, who uncovered the radio waves that Maxwell's equations had predicted: "One cannot escape the feeling that these mathematical formulae have an independent existence and an intelligence of their own, that they are wiser than we are, wiser even than their discoverers." Wilczek also quotes Paul Dirac, whose equations predicted the existence of antimatter—when asked how he discovered new laws of nature: "I play with equations." Paul Dirac liked to point out that he and his fellow discoverers of quantum mechanics did not comprehend why their equations worked. Leibniz called it "blind reasoning." Isaac Newton noted how powerful algebra was operating on symbols.

Symbols have long been used in algebraic expressions and equations by scientists and engineers to create mathematical models with extraordinary explanatory and predictive power in many fields. Equations, by operating on symbols, can completely describe "the way it is" without ever having to assign absolute values to the symbols. Equations say a lot about a system before any value is put in any variable. The history of physics illustrates how powerfully equations model the world. Newton's equation (f=ma), Ohm's Law (V=IR), Einstein's equation (e=mc2), are able to explain how the universe works with amazing fidelity. Simultaneous equations force variables to take absolute values. Equations are by far the most compact and powerful way to model the behavior of a system. Once we have the right equation, we observe that the world must obey it.

Algebraic expressions delineate an ordered series of binary mathematical operations to be performed in strict order of precedence. Language expressions delineate an ordered series of binary mental operations required to be performed in strict order of precedence. They assemble mentioned concepts into a unitary complex and define its structure in exact detail. If each symbol in an expression stands for a concept, then an expression is simply an ordered list of the members of an associated group of concepts. The order of symbols in an algebraic expression has the effect of positioning symbols into adjacent pairs, which then interact with each other. Each interaction is a mathematical or mental operation that results in one symbol of the pair surviving, but transformed by the other. And the order of the symbols in the expression and the rules of syntax control the precedence of the operations, which is critical for its correct evaluation.

The power of identifying concepts with unique concept symbols and then modeling relations between complex concepts by relating the symbols is the strength of algebra. Simple symbols can stand for enormously complex concepts. Isaac Newton came to realize that manipulating symbols was a very powerful technique. A good example is how the law of gravity, which controls planetary systems, solar physics, and vast galaxies, can be expressed by exploiting a very simple formula: F=m1*m2/d2. Language operates on symbols in a very similar manner. It is not surprising that evolution adopted the use of symbols to advance the functions of the human mind.

Algebraic Expressions have a Tree Structure

Niklaus Wirth, in his book "Algorithms+Data Structures=Programs," in his chapter on tree variables, has some highly relevant things to say about algebraic expressions. Wirth points out to us that algebraic expressions have a tree structure. Also, Wirth explains how "an arithmetic expression with dyadic operators" functions "with each operator denoting a branch node with its operands as subtrees."

Wirth uses the algebraic expression (a+b)/c*(d−c*f) as an example to show how an expression can be represented as a tree in the form of a tree variable. Wirth also shows that this tree can be fully specified by a two-dimensional array. His array lists the six leaf nodes and the five operations mentioned in the expression. One can see that each row of his array defines an identified node element, and that his array as a whole defines the primary tree structure precisely. Higher-level programming languages have elegant methods to implement trees. One way to represent trees is an array. Each row of the array specifies an element of the binary tree consisting of a root and two branch nodes. Even the final node has each of its two elements representing complex sub-expressions. Wirth's array can be losslessly represented by a flow-of-meaning tree, and this tree represented by a Mensa table.

Notice that new symbols, which were not present in the original expression, have been created to stand for surviving higher-level concepts, which are formed as the original symbols of the expression are enriched. Just as the mind may assign a specific higher-level cortical neuron to each more complex concept, disclosed embodiments assign a row in a database, i.e., a physical address in computer memory analogous to a neuron's location in the cortex. Together, the database rows represent a directed binary tree. Each element in the directed binary tree is assigned an index to identify it, which can be an integer or other unique symbol. And each element can carry information or "cargo" to organize items of information. Tree variables are widely used for sorting, modeling, and indexing, among other uses. They are dynamic, i.e., they can grow larger or smaller during execution of the programs that process them. Our interest is in using trees for modeling declarative knowledge.

Language Expressions have a Tree Structure

Language concepts at all levels of complexity are structured as binary trees. The history of a tennis tournament, which is usually represented as a binary tree, is a very good analogy for a language expression. In a tennis tournament, any one of the players can become the winner. In an expression, any one of the symbols can become the "it" concept. A language expression and an algebraic expression both have the same underlying structure. Both are ordered lists of symbols that code for a binary tree structure, and both can be parsed for their meaning by a parser using equivalent rules of syntax. The disclosed flow-of-meaning tree and Mensa table can represent a language expression just as well as it can represent an algebraic expression.

Another way to see an expression system like this is as a mathematical or software function with arguments. Pick the first symbol of the function expression, the function name, as the "it" symbol. It operates on arguments in order, each time to map on to an enriched function, until the final result is returned into the function name variable. Such a function expression defines an ordered binary tree with much simpler rules of syntax than apply in a regular function with many lines of code. In function theory, this is called currying.

Once it becomes clear that language expressions, like algebraic expressions, force their terms into pairs that match up and produce a survivor—thus defining a binary tree—it is possible to see many aspects of linguistics and cognition in a different light. Language is a precise notation for the symbolic system the unconscious mind uses. Very compact language symbols, in the form of a string of words and punctuation marks, can evoke very rich non-graphic conceptual structures in the mind. The only sensory patterns used then are the very compact auditory or pictographic sensory patterns of the words themselves. Processing texts while reading or listening is largely automatic with little conscious appreciation of the sights or sounds of the actual symbols. It looks as if both natural language and algebra have succeeded to an ultimate degree in reducing complexity to a form that can produce a detailed, accurate model of the natural world.

Because algebraic expressions are an ordered series of symbols, which specify connections between adjacent symbols in order, they are an economic one-dimensional way to specify the list of connections able to define a directed binary tree. Because the symbols are ordered, adjacent symbols fall into natural pairs that can be viewed as relations. Such a series of relations can organize the whole set of symbols into a congruent complex structure. And this structure may be modeled as a graph (e.g., as a directed binary tree). The lexicals of the expression are the leaves of the tree and the grammaticals are the articles, i.e., nodes that match up in later rounds of the tournament. Faithful to the theorems of Graph Theory, both algebraic expressions and language expressions powerfully direct the construction of complex mathematical constructs.

Following the rules of English syntax, which operate just like the rules of a tennis tournament, expressions mention the "it" symbol first. The flow of meaning is generally from right to left through the ordered symbols (i.e., words and punctuation marks) of an expression into the first symbol. There are important exceptions to this left-to-right syntax rule. A language expression, with its strict order of symbols, specifies precedence of "relay of meaning operations," and thus specifies precisely just how meaning flows to the end "it" symbol. The end symbol, the "it" symbol, the it of "that's it," becomes a unitary symbol that can, once having received meaning from all the other symbols in the expression, serve to represent the meaning of the whole expression. An end "it" symbol thus represents an "ent-it-y" concept. Thus, symbol order in the expression is critical for directing meaning into the "it" symbol, linearly, from right to left, from each and every other word or punctuation symbol of the expression.

Parsing Algebraic and Language Expressions

It will now be demonstrated that algebraic and language expressions can be parsed in the same manner, by showing that the exact same parser (e.g., askme.exe) that can evaluate an arithmetic expression can also parse a language expression. The same parser module or program, by doing lookup of a single Mensa database table, can evaluate an algebraic expression and also parse a language expression that has the same tree structure. This demonstration will show how the parser module works and the principles behind the Mensa tables and flow-of-meaning trees.

The flow-of-meaning tree for the language expression "Paris the city of light in Europe" has an identical tree structure and Mensa table structure to an algebraic expression, with algebraic symbols being replaced by language element symbols. In embodiments of the disclosed system, all three of the elements of language expression (lexical words, grammaticals, and punctuation marks) are treated as symbols that stand for mental concepts.

The parser module has access to a Mensa table which may be stored or embedded in a large Mensa database. The Mensa table controls precedence of operations essential to evaluating an expression correctly. When this expression is input into the parser program, it will evaluate the expression by performing the operations in the correct order of precedence. In an embodiment, this is the same simple loop algorithm, involving about five lines of code, employed in Reverse Polish hand calculators. The results of operations are pre-calculated in a Mensa table in the same way that operations are in a 1-12 multiplication table, so there is no need for the parser program to perform the calculations. The expression can be input into the parser without parentheses, since the precedence of operations is controlled by the Mensa table.

With access to a Mensa table, the parser module can sort concept symbols into pairs. Each pair of concepts is a relation. The parser module can parse an expression to one surviving unitary concept that is enriched with meaning from all the other concepts mentioned in the expression, and control the precedence of mental operations, thereby preventing premature relations. The Mensa table ensures that each operation will occur at the right level, i.e., in the right round of the tennis tournament, once the sub-concepts are sufficiently assembled to be joined together. If there are N terms in an expression, there are a minimum of N−1 matches, and more, if there is a need to accommodate synonyms and paraphrases that people might use while preserving the same meaning. The Mensa table enables the exact same parser module that can evaluate an arithmetic expression to parse a language expression and identify precisely which unified concept it means. Mensa tables raise the hope that an uncomprehending computer can be programmed to mimic human thought by manipulating symbols according to the methods of algebra.

In a Mensa table, algebraic operations are executed in two steps. Operators and operands are treated as equal terms in the expression. This is done to make these operations binary, and thus, much easier for software to manage. First, the relation (i.e., the algebraic operator) is enriched with the first relative (an operand), and then further enriched with the second relative (the other operand). As the surviving term or product of the junction, it recursively becomes a relative/operand in a higher order relation.

Wirth's equation ($x=a+b\div c*d-e*f$) can be represented perfectly by a flow-of-meaning tree and orthographed as a Mensa table. If it is entered into the disclosed parsing module, which accesses this Mensa table, it will be parsed correctly to x.

An illustrative narrative for the full series of operations for parsing the expression "$304*(637+214)\div 19$" will now be described. In the first round (of the tournament), as specified by the first two rows of the Mensa table, the + symbol, the generic addition operator, is enriched by 214 to form special addition operator +214 (i.e., add 214) that will add 214 to what it operates on. The ÷ symbol, the generic divide operator, is enriched by 19 to make it a special divide operator, ÷19 (i.e., divide by 19) that will divide what it operates on by 19. In the second round, +214 operates on 637 to put 831 into the third round, where it enriches * to send special operator *831 into the fourth round. In the fourth round, *831 operates on 304 to place 258704 in the final round. In the final round, ÷19 operates on 258704 to give 13616, the value of the whole expression. This narrative of operations shows how each pair of adjacent symbols in the expression interact to produce a single, surviving symbol that replaces the pair. Then, pairs of higher-level surviving symbols interact in later rounds of the tournament to give surviving symbols, until there is only one symbol left which represents the value or meaning of the whole expression. This table format of six mathematical operations, i.e., the Mensa table, is equivalent to the expression itself.

An illustrative narrative for an execution of the parser module as it parses the corresponding language expression "Paris the city of light in Europe" will now be described. Symbol light enriches symbol of and retires. Symbol of in turn enriches symbol city, which in turn enriches symbol the, which in turn enriches symbol Paris to symbol Paris1. Separately, symbol Europe enriches symbol in, which further enriches symbol Paris1. It shows Paris being serially enriched from Paris to Paris2, a meaning enriched version of Paris, by inflows of meaning from two sub-trees. Note that lexicals function as operands, and grammaticals function as algebraic operators.

I.4. How Language Expressions Work to Build Complex Relationships

A well-constructed language expression that makes sense addresses a very particular complex concept. Expressions mention enough of the key concepts taking part in the complex to allow construction of a full mental picture in our minds. Their symbols (words and punctuation marks) are in an order that allows adjacent symbols to fall naturally into pairs. Meaning flows from a symbol to an adjacent symbol of each pair in both directions and then is relayed on to other symbols so that each symbol in an expression receives meaning from every other symbol directly or indirectly. All concepts adjust their sense to fit in. This many-to-many meaning flow is captured by picking one concept to be the "it" concept and designing the expression that directs all meaning flow to that one "it" concept, which then represents the whole relationship of concepts. It binds all the concepts together so that meaning from every mentioned concept is entailed. If desired, the addressee can calculate not only the sense of it but also the importance and meaning of each mentioned concept, and also of other concepts implied but not mentioned. With Mensa tables, a parser module can readily bio-mimic this technique in the computer to obtain the same power in building and managing relationships between symbols representing mental concepts.

The purpose of an expression is to gather and organize a roster of concepts. A well-constructed language expression that makes sense puts all of its mentioned concepts in their correct place in relation to each other, thereby defining the structure that makes them a single coherent system, a cohesive unit of thought into which all of the concepts mentioned have contributed meaning. We call this unitary mental concept the "it" concept, the it of "that's it" and "he doesn't get it." The "it" grammatical symbol is the survivor symbol that, when an expression is parsed, will have received meaning from all the other concepts mentioned. How concept it is arrived at (i.e., the path to it defined by an expression) can be illustrated with a flow-of-meaning tree and defined precisely with a Mensa table.

Each symbol receives meaning directly from a flanking symbol but indirectly from each and every one of the other symbols by relay. Every symbol contributes meaning to every other symbol. Meaning flow is many-to-many. If one symbol in the system is changed (e.g., added or removed), all the other symbols change reciprocally. First, each party concept is put in correct relation with all the others. Then, each concept, once in the group, adapts in a special way to fit in with the others in the group. Change trembles back and forth through the system until it settles down in equilibrium. This is analogous to a spreadsheet where values in cells related by algebraic formulae settle down to a new equilibrium after the value in any one is changed.

It would seem like a very difficult task to model the omnidirectional meaning flow that occurs in a system like this, and the extremely complex set of relations between all the concepts. However, both language and algebraic expressions have found a binary way to greatly simplify the orthography. In a coherent system of symbols denoted by an expression that makes sense, one master final receiver symbol, the "it" symbol, is chosen to receive meaning from all the other symbols. Since every symbol in a related system of symbols receives meaning directly and indirectly from each of the other symbols, the choice of the "it" symbol is arbitrary. Because any expression comprises a string of symbols, an author can reorder an expression to make any one of them enrich to the intended surviving "it" concept. Which concept is intended by the author to become the it must be settled on by the second person or addressee. The literary context often determines which meaning an author intends.

Language Expressions are Trees

Concepts at all levels of complexity can be precisely named by a language expression which defines the structure of a particular binary tree. The history of a tennis tournament, which is usually represented on the scoreboard as a binary tree, is a very good analogy for a language expression at work. Before a tennis tournament, any one of the players can theoretically become the winner. Analogously, any one of the symbols in an expression can end up as the "it" concept. One can view an expression as picking the winning symbol and tilting the playing field to such an extreme as to force that symbol's path to it through several rounds of a tournament. However, the chosen symbol when it reaches the final is very different from what it was in the first round, greatly modified by its interactions with other symbols on its way to the top. It has assumed a particular one of billions of possible configurations governed by the order of the symbols in the expression.

A word is an expression. A word, an ordered string of phonemes, is a language expression. How many concepts can be addressed by a single word expression? With 42 phonemes available in English to be paired up, each word of two phonemes can specify any one of 422 or 1,744 pathways for its survivor to go. If a word comprises N phonemes, and they are randomly matched into pairs of adjacent phonemes, with survivors being matched again in subsequent rounds of the tournament, the number of possible tournament structures can be calculated to be about $1,744^{(2N-1)}$. This number is limited by the rules of phonology which forbid many matches. However, for all practical purposes, the number of words that an ordered string of phonemes can define is infinite. Less than a million of these possibilities are words in actual use. How many concepts can be addressed by a language expression? An expression of just several words can address a space of an infinite number of concepts.

Some expressions do not make sense. The meaning of an expression is contributed to critically by the order of its words. Changes in the order of even one word may result in an expression no longer making sense. If it does, by coincidence it may mean something else in a different context. It is important for a parser to be able to determine when an expression does not make sense. The test is whether all of the party concepts represented by bye-ordered symbols in the expression list can be incorporated in the flow-of-meaning tree with no loose ends.

For example, the expression "the truth about American manufacturing" makes sense. It precisely describes a clear concept. FIG. 6A shows the flow-of-meaning tree diagramming the parsing for this expression. The Mensa table for the expression is illustrated in FIG. 6B. With access to this Mensa table, the software parser can determine that the expression means a very specific concept, i.e., concept the34538. All of the party concepts are joined in appropriately. With access to the Mensa table, the parser can determine that any one of the other one-hundred nineteen order variant expressions (factorial five minus one), using the very same words in different order, do not parse to make sense.

FIG. 6C illustrates flow-of-meaning trees for two order variants of the expression "the truth about American manufacturing" that have just one word moved: "truth the about American manufacturing" and "the manufacturing about American truth". The flow-of-meaning trees for the expression, with a word moved, no longer connect all the concepts, do not make an it, and do not make sense. Although, with a stretch, in another context, a flow-of-meaning tree for the variant "the manufacturing about American truth" could be contrived that would allow this expression to make some sense.

In an embodiment, the parser module determines that an expression does not make sense or is bad grammar when it cannot parse the expression down to one single "it" concept, taking into account all of the words and punctuation marks. There are connections missing in the flow-of-meaning tree, which in this case literally shows that the expression "does not make a point." Using "pointless" flow-of-meaning trees in conjunction with N-400 experiments could provide extra insights.

Figure 7:
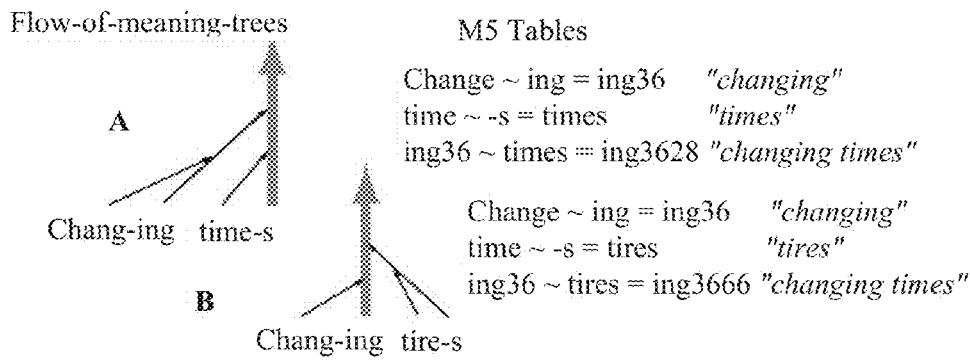

Now, two exemplar expressions will be described, showing exactly how an author can intend two very similar phrases to parse into two different types of it symbols. The phrases "changing times" and "changing tires" differ in only one letter and appear to have the same grammatical structure. FIG. 7 shows their flow-of-meaning trees and Mensa tables. Flow-of-meaning trees and Mensa tools show precisely how the human mind parses one to a noun concept and the other to a verb action concept. The Mensa table provides a computer with the means to do the same. It is up to the addressee to figure out the author's intention, i.e., to identify the "it" concept at the start and enrich it serially by meaning flow from peer concepts.

As illustrated in FIG. 7, both expressions parse to an it. However, parse A parses its expression to what we call an end-it or entity noun concept, and parse B parses its expression to a mean-it, which is in essence an enriched relation concept. Parsers of expressions should be able to determine, for any expression, which of these two ways a parse will go.

Figure 8:
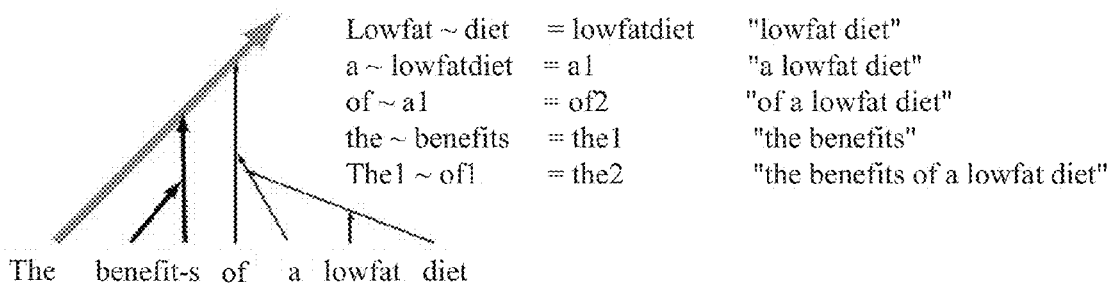

"The benefits of a lowfat diet" is an end-it expression, in which relational grammatical concept of relays a determiner a concept into a determiner the concept. The flow-of-meaning tree and Mensa table for this expression are illustrated in FIG. 8. lowfat enriches diet, which then relays meaning to article a, which in turn adds meaning to of. Determiner concept the is enriched to the2, first by benefits and then from meaning relayed via of, to produce a highly differentiated the concept. One can see from the flow-of-meaning tree and the Mensa table in FIG. 8 how meaning from all the terms flows into a single surviving grammatical the, making an end-it concept.

Figure 9:
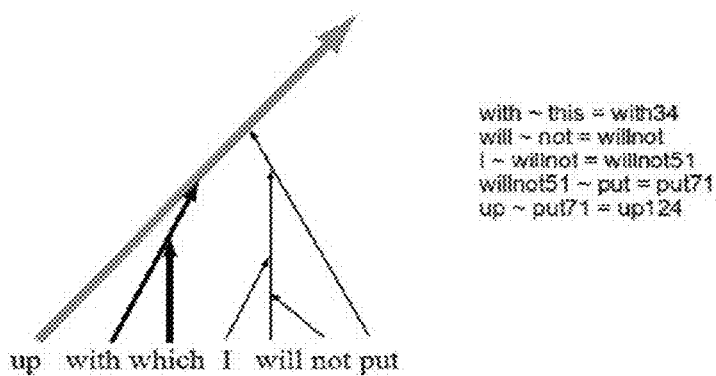

FIG. 9 illustrates a flow-of-meaning tree and Mensa table for the phrase "up with which I will not put", famously attributed to Winston Churchill. They demonstrate how the expression can be parsed correctly to an enriched up grammatical. With access to a Mensa table, it is trivial for the disclosed parser to parse this intricate up concept expression, which would otherwise demand the parsing dexterity of a human mind. Flow-of-meaning trees and Mensa tables can show graphically the order of precedence of serial relay of meaning from each and all of the symbols of a long sentence into a surviving grammatical to make a complex enriched it concept.

Group Expressions

Figure 10:
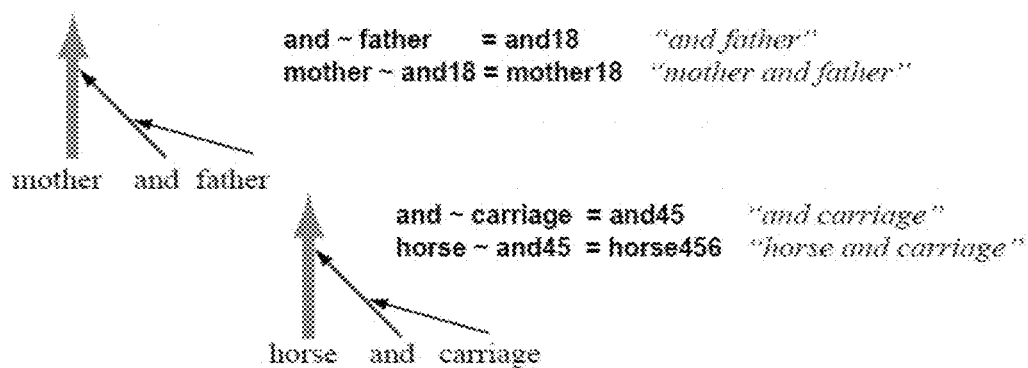

The mind models group concepts, groups of things, groups of concepts, and pluralities, using grammaticals "and" and "or." Expressions defining "and" and "or" groups are ubiquitous in language texts and, like all expressions, parse to a single unitary concept that represents the whole group. Consider the group concepts s expressed by "mother and father"

and "horse and carriage." The flow-of-meaning trees and Mensa tables for these expressions are illustrated in FIG. 10. Here, mother, father, horse, and carriage, are relative entity concepts, and concept and is a relation concept. Meaning flows from the second entity into concept and, which then becomes an "and" concept in the sense of "no ifs ands or buts". Then, and relays its meaning back into the first entity to morph the single concept into a plurality concept, from a mother into parents, and from a horse into a transport vehicle.

Figure 11:
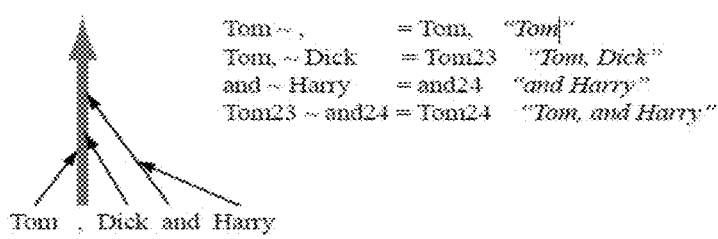

As another example, FIG. 11 illustrates the flow-of-meaning tree and Mensa table for the expression "Tom, Dick and Harry", which expresses a group of three concept. Here concept Tom at first represents a single person, a group of one, and is bundled into a comma to make a Tom, comma concept. Dick is added in to make a Tom23, concept, a group of two. Harry is bundled into an and concept to make and Harry. Then, concept and Harry is added to Tom23 to make Tom24, a group of three. An "or" in the expression would make the whole group a singleton or group.

The way that groups are modeled in language in the mind is informative about meaning flow in expressions, allowing some remarkable effects to be achieved. One curious function of an and group is that it shifts its relatives into a certain class set by the first mentioned member. When a concept is put into an and group expression, such as "knaves, thieves and Republicans," Republicans are forced into a class in a way that may not be flattering. In another example, "A bar frequented by whores, smugglers, policemen and lawyers", the order of terms matters. The author's intent here is to set the tone by starting with a lowlife kind of person, whores, reinforce criminality with smugglers, endow these characteristics on policemen, establishing the idea that mainstays of the law can be corrupt, and then add lawyers, who are supposed to be the height of probity, to this camp, calling to mind the old hate-lawyers saw, deriving intended humor from the contrast between the two views of lawyers. To use "as well as" after "smugglers" instead of "and" would redeem policemen and lawyers by allowing them to be a respectable subgroup of frequenters of the bar. Group concepts do illustrate the truly awe-inspiring power of expressions to manipulate the sense of party concepts. This is another example of expressions being as economical as possible in expressing subtle meaning and subtext.

I.5. How Finite Sentences Work to Apply Reality to Concepts

The main function of a finite sentence is for an observer to describe an act of observation, by mentioning all the concepts observed and by defining the structure of the relationship that exists between them. This observed relationship of concepts models the way it is in the world. Finite sentences, as opposed to non-finite expressions, parse to enrich a very special type of relational grammatical, a seam concept, to become an observation concept. Finite sentences are bimodal, including subject-seam sentences with the seam in the subject, and predicate sentences where the seam is on the verb. The seam is the main central grammatical of a sentence accruing conceptual content from all the other concepts mentioned. It stamps its accrued content as comprising what is being seen in the mind of the author of the sentence, which content minors what exists in the present real world or in an imaginary world. Thus, the seam grammatical of a sentence is key to how language confers existence, non-existence, or modality upon concepts mentioned in the sentence and upon the relations observed between them. A second person, hearing or reading the sentence, can rerun the observation in his mind and make a copy of the observation concept in his long term memory.

Thus, a finite sentence can communicate a statement, a state of affairs, an event, an action, a custom, a habit, a rule, a process, or a project.

A finite sentence is a language expression that expresses in symbols what is seen when its narrator makes an observation on the real world or on a world in his mind. All finite sentences involve both consciousness and attention and contain a seam symbol. At the core of every sentence there is an explicit or implicit seam grammatical, a special kind of grammatical that turns an expression into a finite sentence. Finite sentences fall into two types: subject-seam sentences where the seam is found in the subject phrase, attached to an auxiliary verb or modal, and predicate sentences, where the seam is the -s or -d verb inflection of the lexical verb. This leads to the idea of a subject-seam as a linguistic entity on the same rank in grammar as a predicate.

A well-constructed finite sentence mentions all the concepts in a local world system that are sensed and defines how they are related to each other. Therefore, the common purpose of all finite sentences is for an observer to use an ordered string of symbols to define a relationship of concepts, and then to indicate whether he does or does not see this relationship f concepts, which means that that relationship of concepts does or does not exist in the world he is observing. The seam grammatical endows the relationship of concepts with reality, or not, or by using a seam modal, it can state the likelihood that it does or does not exist.

Observers record their observations with finite sentences, an order of words and punctuation marks that expresses what is observed. The symbols reflect concepts aroused in the observer's consciousness, their arrangement minoring what he sees or saw in the physical world or retrieves from a memory world. The thought, the way it is in the world, and the ordered symbols of a sentence are all equivalent. Importantly, the observer notices and records what is missing there as well. He compares what he sees with his idea of what he should see. For instance, he might say, "This is not my idea of a good steak."

A finite sentence can communicate its contained knowledge to a second person. As an observer utters, and a second person hears, a sentence, they monitor the mental operations evoked in consciousness to see if they make sense. Sentences can tell the second person stuff he does not know, or remind him of something he does. A finite sentence can communicate a state of affairs, an event, an action, a custom, a habit, a rule, a process, a project, etc.

All finite sentences and mental observations involve both consciousness and attention. Both understanding and uttering a sentence is a mental operation integral with an active conscious thought, mustering concepts into a structured whole. The neurons corresponding to observed features of the world fire for hundreds of milliseconds. If what is observed is important enough, a trace of the firing will be stored immediately by Long Term Potentiation (LTP), and much more permanently in long term memory in both cortices as an observation concept that can be reenacted in consciousness at will. The mind's eye can make an equivalent observation in an imaginary world that exists only in the mind. An observation concept, although inert in stored memory, can, like a software program, be rerun to cause a mental thought and or an utterance. Of course, such a recall may closely parallel what went on out in a world that the observer is not presently observing. An observer can have a silent thought where there is no utterance, or the thought can be voiced via Broca's area in the lower left prefrontal cortex.

Whenever an observer senses the world, he experiences a conscious experience of what he senses in his mind. The limbic system of the brain is activated: thalamus, hippocampus, amygdala, et al. If the observation involves graphic sensory patterns, it may be a very rich conscious experience. If it involves emotions, he may experience strong conscious feelings. Individual observations activate conscious concepts for around seven-hundred-fifty milliseconds, but their information is held in short term memory and/or working memory for up to thirty seconds so they can interact with the next and previous observations.

The Seam Grammatical

Finite sentences contain a seam grammatical, whereas non-finite expressions do not. The presence of a seam in an expression makes an expression into a sentence. The seam is the one grammatical that indicates that the concepts mentioned in the language of the sentence are being sensed live by the speaker, and therefore, have existence in the world observed.

One can look at it this way: as a sentence is parsed, the seam concept receives meaning from all the other concepts mentioned in the sentence. Seam symbols are serially enriched to become, just like other grammaticals, a container of conceptual content relayed from all the other symbols of a finite sentence. Thereby, the seam concept of a sentence becomes the final survivor of the parser tournament, a mean-it concept.

Just like every other grammatical, a seam grammatical puts its own special stamp or mold on the conceptual content that it obtains. By virtue of its idiosyncratic stamp (i.e., the seam), the sentence declares that its concepts exist or do not exist in the real world or in an imaginary world, thereby recording reality as the observer is seeing it. A seam containing this congruent complex of observed and implied concepts comprises a unitary "it" concept, an observation concept. Because the "it" of an observation stands for what is seen and what is not seen, finite sentences are the way an observer bestows existence and reality, or not, on the whole assembly of related concepts that are mentioned in or implied by the sentence.

When a sentence is parsed so that the surviving concept is the seam enriched with meaning from all the other concepts, we call it a mean-it concept. Parsing the string of symbols mentioned in a sentence for understanding is a mental process. Lexical words enriching a -ment suffix grammatical, like state-ment, instru-ment, resent-ment, argu-ment, and docu-ment, all stand for mean-it concepts, the root node of a sentence parse tree.

The most used seam is the grammatical "is," which basically means "I see." The meaning of the statement "the folder is on the desk," which expresses a particular reality, is the same as "I see the folder . . . on the desk". The seam's contents comprise what the observer first sees or saw. The order during parsing, in which concepts are enclosed into the seam or the point where the seam confers reality on already parsed concepts, is important. In this subject-seam sentence, concept thefolder is realized first. I see the folder first, establishing its presence in my view and thereby its reality. Then concept onthedesk is folded into the seam, further enriching the seam, and thus, establishing this on relation and making the desk real.

One can look at it another way: when the seam grammatical is reached in parsing, it confers reality on the concepts parsed up to that point. Under this idea, the parsed concept, not the seam, will be the surviving it concept, but now denoted as real. The reality rule is: once something has been "is" (i.e. seen), it is "ex-is" (i.e., exists), and concepts related to a concept that exists also exist. These alternatives result in two different flow-of-meaning tree structures. However both work equally well to serve the disclosed parser module, which may use the more convenient one in any one instance.

Finite sentences are constructed in the same way as any other complex expression except that they declare that the concepts mentioned and their organization exist. Whereas non-finite language expressions may describe a complex concept minutely and refer to real things that can exist in the world, they do not confer existence on what is described. On the other hand, by virtue of their seam concept, finite sentences do describe what does exist in the real world or in imaginary worlds. They also can indicate what does not exist or what might or might not exist under certain conditions. Nonexistence or conditional existence usually has just as strong implications for the world as existence does. Finite sentences say something about whether things exist and how things are and confer reality on the concepts mentioned.

The parallel of language to algebra is relevant. A language expression can be thought of as an algebraic expression, and a finite sentence can be thought of as an algebraic equation. An algebraic expression is in essence an ordered listing of terms and the mathematical operations required to be performed on them in order of precedence to calculate a value for that expression. It defines an algebraic entity with structure. Algebraic expressions, although essential components of equations, do not by themselves say anything. On the other hand, an algebraic equation says something. It states that expressions on two sides of an equals sign are equivalent, i.e., that both have equal values on some scale, normally on a numeric scale. It rules that a change in a value on one side of an equation forces a change in a value on the other side, thus tightly controlling how "it" has to be. It takes an equation to say something about how things are.

If a finite sentence is an equation, where is its equals sign? Think of it like this: the seam concept of a finite sentence is its equals sign. It equates the conceptual structure built from the language symbols of the finite sentence and the conceptual structure in the mind of the observer. If the observer believes what he is saying, a seam concept also equates the concepts in an observer's mind with the reality out in the world that the sentence describes. There is a one-to-one relation between the conceptual structure expressed by the language of the sentence, between the conceptual structure of what is in the mind of the observer, and the reality of what the observer sees in his present world.

World

Every finite sentence has a bimodal property which we will call "world," which divides the set of all finite sentences into two non-intersecting sets, telling us which world the described relationship-of-concepts is in. World may be the present real world of the speaker, or the world where, in Martin Joos' words, "the referent is absent from that part of the real world where the verb is being spoken." Joos, in his discussion of English tense uses the terms actual tense and remote tense. There is an absolute dichotomy between sentences that talk about how it is both in the mind of the observer and in the present real world of the observer, and sentences that talk about how it is just in the mind or memory of the observer and no longer or not yet in the real world. This dichotomy is exactly the dichotomy between present and past tense, or between indicative and subjunctive moods. World is determined by strictly bimodal seam concepts.

It is the seam grammatical that determines which world a sentence describes. The two non-intersecting sets of seam concept grammaticals that declare world are:

(1) In subject-seam sentences, the seam carriers—"is," "does," and "has"—and the "present tense" seam carrying modals—"will," "shall," "may," and "can"—and in predicate sentences, the seam symbol -s inflection of lexical verbs, all indicate that the sentence is describing the present real world of the observer (2) In subject-seam sentences, the seam carriers—"was," "were," "did," and "had"—and the "past tense" seam carrying modals—"would," "should," "might," and "could"—and in predicate sentences, the seam symbol -d inflection of lexical verbs, which do double duty, all indicate that the sentence is describing an imaginary or remembered past world.

Thus, every sentence deals with and settles which world the observer is observing: the present world of the observer or a world that no longer corresponds to the present real world, which may be the real past world or it may be an imaginary world existing only in the mind. However, lessons learned from doing "thought experiments" which involve real things, but in an imaginary world, can be very valuable and apply to real strategies.

Seams in First-, Second-, and Third-Person Sentences

We will first look for the seam in sentences where singular first person pronoun "I" is the subject. Here, the seam is covert inside subject pronoun "I," which becomes a subject-seam. How does first-person subject pronoun "I" by itself have an internalized seam function that confers reality on the relation of the sentence between "I" and its following object concept? First person observer "I" does not have to "see" himself to know he exists. "I" "knows" whether what's in his own mind exists. Then, if "I" exists, concepts related to "I" in the sentence exist without the need for another seam grammatical to realize them, following the rule that concepts related to a concept that exists also exist. Grammatical "I" is a natural place to hold a covert seam function. The "I" or "eye" is clearly the equals sign between concepts in the brain and their correlates in the outside world. For this reason, no overt seam-like -s inflection on the verb, is required in first-person present tense sentences when "I" is followed by a "have" or "do" auxiliary or any other lexical verb.

Seam Placement Manages Sentence Nuance

Sentence nuance can be fine tuned by where the seam concept is placed in a sentence. When the sentence is parsed to make the seam the main survivor concept of the observation, it makes a statement. Other mentioned concepts serially enrich the seam in strict order of precedence as determined by word order and rules of syntax. On the other hand, when the sentence is parsed mentally to make the subject the it concept of the sentence, the seam's role is to confer reality on the subject concept and its relations to other concepts mentioned.

Figure 12:

In the sentence "I bake a good pie", the seam concept is covert in subject concept I, and concept bakeagoodpie is the "seamless" verb phrase object of the subject relative. Because it is "seamless," it does not contribute to the statement's reality. This renders its object relative as a verb phrase with a bare uninflected verb. Such a verb phrase is not a predicate. On the other hand, "I" past tense sentences, depicting a relation in a memory world, require an overt -ed seam to indicate world—e.g., "I walk-ed down the street", "You ask-ed for it", "I bak-ed a good pie". Here, the seam is covert in the "I," the first-person pronoun establishes reality, and the only function of -ed is world. The flow-of-meaning tree for the expressions "I bake a good pie" and "I baked a good pie" are illustrated in FIG. 12.

Singular first-person present tense verb "be" sentences with subject "I" always use seam-like symbol "am" and start with "I am . . . ," as in "I am a dilettante". Why this exception? A sentence, such as "I be confused", should be grammatical if the seem is covert in subject "I." Although it is clearly a finite assertion, it does not feel grammatical. Seam "am" may be residual from olden times when English strictly demanded agreement of person between subject and relation in a sentence. One can debate whether the seam of the sentence is carried in seam-like symbol "am," rather than in "I," or whether "am" just reinforces the first person. It does not matter. Either way there is finitude.

Figure 13:
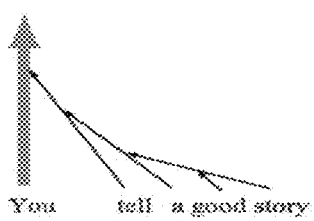

The same lack of an overt seam applies with second-person-addressee pronoun "you." Present tense sentences with subject "you" do not require an overt seam either, e.g., as in "You tell a good story." The flow-of-meaning tree for this expression is illustrated in FIG. 13. How can second-person subject pronoun "you" carry a seam and confer reality? The first person knows the second person exists and therefore does not have to "see" "you" to "realize" "you." Just as I know I exist, I know you, as my addressee, exist. Following the rule that, once concepts are related to an existing concept, they too exist, any concepts related to second-person "you" in a sentence exist without the need for another seam grammatical. Thus, concept tellagoodstory and the relation between it and you are realized. As with first person sentences, second-person sentences require an inflected verb to indicate unreal or past world. Third-person pronoun subject singular sentences require an overt seam symbol, because the observer looks out to see a relation to which a third person is a party.

Seams in Plural Subject Sentences

The next example of seam concepts being associated with the subject concept occurs in present-tense sentences with plural subjects, e.g., as in "Australian-s travel". Now, the pluralizing -s suffix of the subject noun has become the seam symbol of the sentence, jumping off the main lexical verb onto the subject. In plural subject clauses, grammatical suffix -s does double duty, indicating plurality and being the seam. Again, the verb phrase is seamless, is not a predicate, and does not participate in contributing reality to the expression. The seam reality function also moves from the main verb to be covert inside a plural subject noun, such as "people" or "children," as in "people elect their leaders" or "children play games". There is a mental leap required to appreciate that a seam function can be covert within plural personal subject pronouns "we," "you," and "they" as in "They make news."

Figure 14:
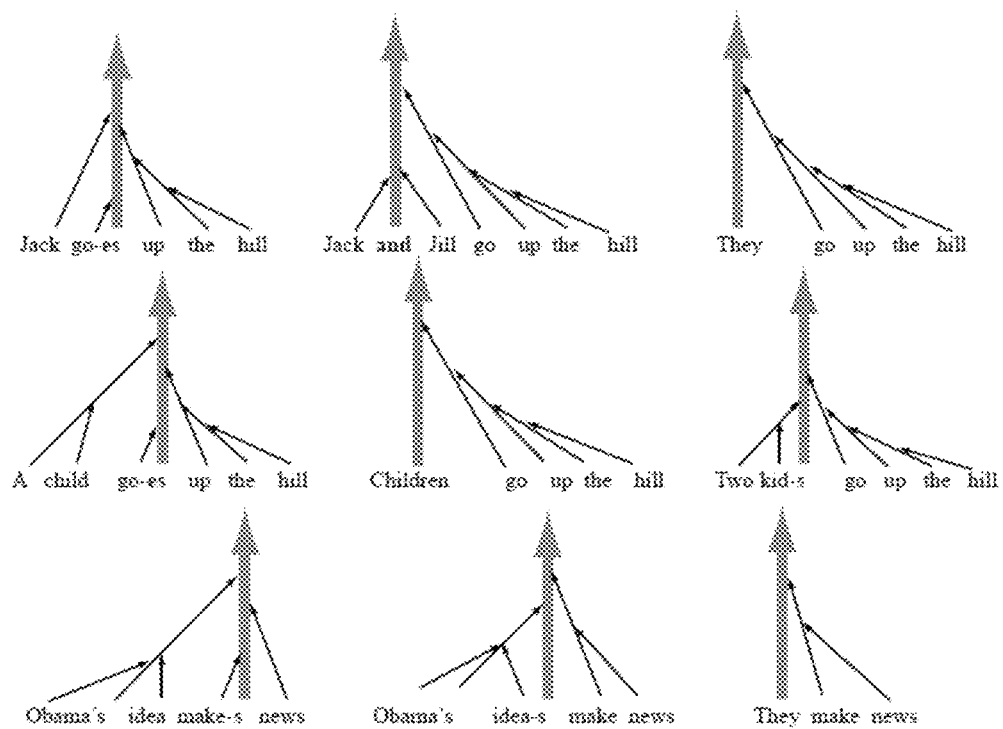

The flow-of-meaning trees in FIG. 14 illustrate the similar figure of plurality concept flow-of-meaning trees and finite sentence flow-of-meaning trees. The fact that both look like a mean-it tree could suggest why plural subjects can carry a seam. The flow-of-meaning tree for subject possessive phrase "Obama's idea", is the same as that of a plural subject. However, we automatically recognize that this possessive subject does not carry a seam, because there is already another seam. There can be only one seam in a clause. The apostrophe "'s" simply functions as an enriched subject determiner.

Subject-Seam Sentences

Figure 15:

The first kind of "be" sentence occurs when a seam is intimately attached to a personal pronoun subject concept as a singular apostrophe "'s", as in "It's a party" or "He's foolish", illustrated in FIG. 15. Parsing this "be" sentence type, the seam will be enriched first by the subject concept to form a subject-seam, which is then enriched by the object concept, which in this case is a BE-type property. The order of enrichment of the seam particle here is first by the subject concept, then second by the second relative concept.

Although these sentences make a statement, it is obvious that an enriched subject is the product and perhaps their main purpose. This subject-seam union is the mirror image of a predicate, where a seam is intimately embedded in the verb-object phrase to confer reality on the verb action before the subject concept is annexed. The purpose of subject-seam sentences is primarily to enrich the reality status of the subject. There is no English word equivalent to predicate for this subject-seam unit. Perhaps because of its very useful role in realizing subject entities first, it has not been previously recognized by linguists. A predicate is like glue being spread on the wallpaper before it is applied to the wall. A subject-seam is like glue being spread on the wall before wallpaper is applied.

Figure 16A:
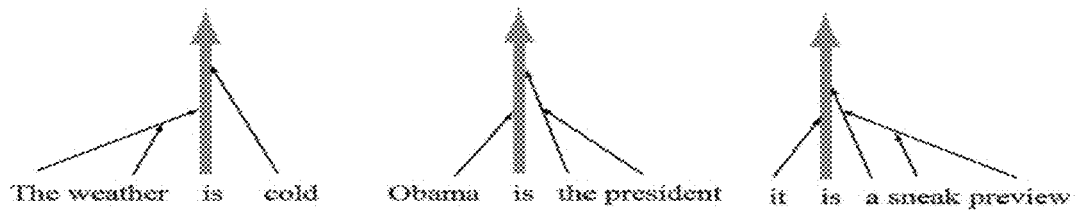
Figure 16B:
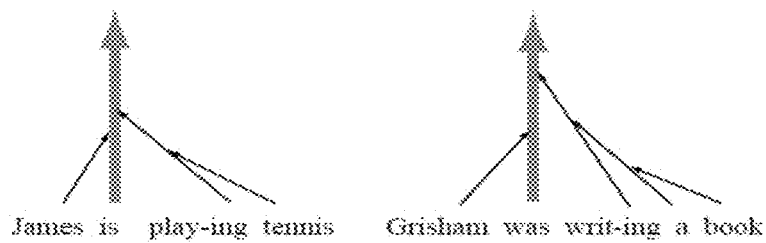
Figure 16C:
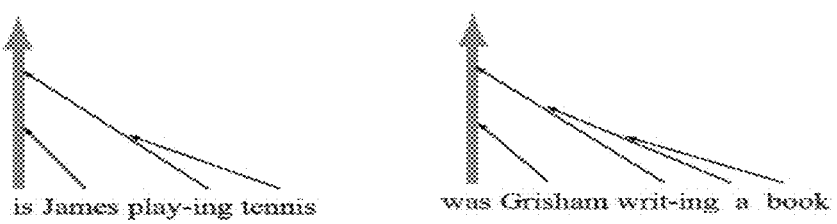

The next kind of "be" sentences are those in which the seam is on free grammatical particles "am," "art," "is," "are," "was," and "were." "Be" sentences express a relation between the subject and a complementary second relative that may be an adjunct property, characteristic, activity, or role. A closed set of verbs—"become-s" and "seem-s"—and the five sense verbs—"look-s," "sound-s," "feel-s," "taste-s," and "smell-s"—are enriched -s seams that, like "is," can blend many adjunct concepts into a subject in "be" fashion (e.g., "It looks/tastes/smells good"). In a special subset of "be" sentences, where the complement is a present participle, the object of the be-seam relation is a property that blends into the subject when the subject is performing a verb action. In sentences like this, the be-seam relation and its first relative subject are joined first. This is shown by the fact that they stay together in questions which are formed by the subject "coming about," i.e., swinging to the other side of the seam. FIGS. 16A, 16B, and 16C illustrate flow-of-meaning trees for some "be" sentences. FIG. 16B illustrates a "be" sentence in which the complement is a present participle. FIG. 16C illustrates a "be" sentence in which the seam is associated with the subject, rather than the verb or modal in plural observations.

Although such sentences make a statement, at the same time, they can be construed to be about the first-mentioned concept, i.e., the subject concept. In some sentences, it is clear that the author's main intention is to inform us about changes to the subject entity. Sentences are constructed so that the first concept mentioned, the subject concept, gets favored enrichment. Sentences are designed to ferry meaning into their subject more so than into any of the other party concepts. This has the effect of keeping the rules of syntax more transparent, e.g., the first concept mentioned is the surviving concept. The subject concept is expressed by that part of the sentence coming before an enriched seam grammatical. It is appropriate for a parser to parse the subject expression to a single concept before dealing with its enrichment by the seam concept's transfer of its collected meaning onto the subject.

Let's parse another finite sentence to show how Mensa tables direct the parser to see seam concepts serially enriched by the other concepts expressed in that sentence, to become an observation concept. Take the sentence "Henry is going to give the money to John". The flow-of-meaning tree for this expression is illustrated in FIG. 17A, and the corresponding Mensa table is illustrated in FIG. 17B.

The meaning flow narrative is as follows: In the first round, seam is enriched by Henry from its left to make is1; first concept to is enriched by going to to1; concept the is enriched by concept money to the1; and second concept to is enriched by concept John to concept to2. In the second round, concept give is enriched by the1 to give1. In the third round, concept give1 is enriched by concept to 2 to make give2. In the fourth round concept, to1 is enriched by give2 to to2. In the final round, is1 is enriched by to 2 on its right to become is2, the observation concept expressed by the finite sentence "Henry is going to give the money to John". This explains how a Mensa table enables a parser module to parse a sentence, detect the seam, and enrich it in the correct precedence. Alternate Mensa tables can be composed to allow invariance, so that a different symbol string that means the same will parse to that same concept. Here, concept is, which is basically an -s inflection enriched by covert verb "be," carries the seam symbol that receives meaning from all the other symbols in the sentence to make it a statement. Enriched inflection -s ends up containing meaning from all the concepts that the observer sees, which mirror what is going on in the world.

If the observer had said, "Henry was going to give the money to John", the concept was is basically a covert verb "be" with an included covert -d inflection. Once enriched by all the other concepts mentioned, this covert inflection -d seam can be mentally parsed to contain all the concepts that the observer saw, which mirror what was going on in a not-present world that exists only in his memory or in his imagination. Phonetic reversal cueing is at work again: "It is" means "I see it" and "it was" means "I saw it." Once seen "it is ex-is", i.e., "it exists."

Passive Voice Sentences

Passive voice sentences are the other case where the focus lies heavily on what change occurs in the object of a verb. The concept that would normally be considered the object concept of the verb is made the subject concept of a passive voice sentence. Passive voice is only properly employed to focus attention on a concept that is significantly changed by taking part in a relationship. Dwight Bolinger brings out this point especially elegantly with his examples:

"The army was deserted by a private."
"The army was deserted by all its generals."
"The lake was camped beside by my sister."
"The old bridge has been walked under by generations of lovers."

There is a requirement than only verb objects that are changed by the verb action of a transitive verb can be the subject of passive voice sentences. For the last example, Bolinger notes that the bridge may be deemed to become romantic as a result of the verb action of being walked under by generations of lovers.

Passive voice is used in sentences where the observer wants to make absolutely certain that the object concept of a transitive verb is the first concept to enrich the seam grammatical, the first concept to be realized. With the passive voice, a speaker moves the home point of view of the sentence from agent concept to patient concept. The focus of passive voice sentences on the patient concept allows the roles of actor or agent to be downgraded, e.g., famously by Ronald Reagan with his statement that "Mistakes were made."

The verb "is" of the passive voice has the same meaning as "I see," "was" the same meaning as "I saw," as in "Federer was beat-en at Wimbledon" and "I saw Federer beat-en at Wimbledon". In passive voice sentences, the -ed inflection that the lexical verb enriches is not the seam of the sentence. This distinction was more explicit in olden days when the lexical verb inflection used to be -en.

Auxiliary Verb Sentences

Auxiliary verbs "am," "art," "is," "was," "were," "has," "had," "does," and "did" are formed when "be," "have," or "do" enrich a seam. In a sentence, such as "she did do it," "did" is the auxiliary and "do" the lexical verb. That these auxiliary verbs are linked to the subject and not to the object is shown in that subject and auxiliary reverse order to form questions. No lexical verbs can reverse order with the subject to form a question. FIG. 18 illustrates flow-of-meaning trees which demonstrate that auxiliary verb seams are associated with the subject, rather than the verb or modal.

Modality—Seams in Modal Sentences

All sentences tell which relationship of concepts is being observed, or not observed. They answer one or more of the following context questions: does the relationship of concepts exist in reality? Or not? Ever? Never? And when we do not observe it directly, is the relationship possible? Is it inevitable? Is it likely? Does it have the observer's permission to exist? Will he make sure it will exist? Answering these questions is what finite sentences do. By answering one or more of these questions, a finite sentence confers modality, an appropriate degree of reality on the concepts that have been observed.

The next sentence subtype comprises the modal group of sentences with the following free-standing already enriched seam grammaticals as their seams: "do," "can," "could," "will," "would," "may," "might," "shall," "should," "must," "ought," and "dare." Their second or object relative is always a "seamless" verb phrase concept. They enable language to assign truth, existence, reality, certainty, probability, possibility, necessity, or legality of existence of a relationship of concepts defined by a finite sentence being held in he observer's mind. There is no overlap of this group of grammatical words with the lexical elements of language, except for "will" and "can," which are also lexicals. For this reason they are excellent markers of the end of the subject phrase for parsers.

Figure 20:
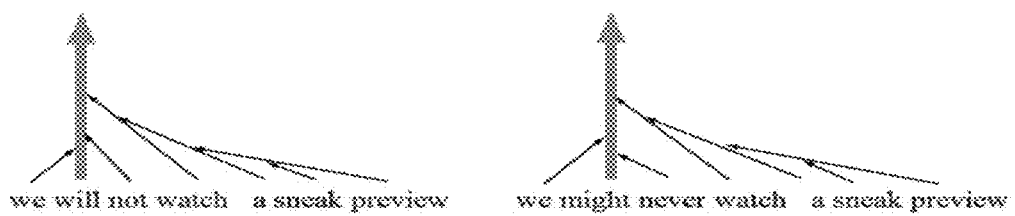

Modals incorporate seam and world as well as modality. FIG. 19 illustrates flow-of-meaning trees for modal sentences. Seam-subject sentences are the only type of sentence used for affirmation, negation, and modality, and for questions. They are negated by putting a negator grammatical not immediately after the seam or never before or after the seam, which indicate the observer does not see the relation. Flow-of-meaning trees for example expressions, showing negator symbols "not" and "never" associating with a subject-seam, are illustrated in FIG. 20.

There is only one default relation between subject and modals, such as "do," "will," or "may." It is never explicit and it can be enriched only by a limited number of grammaticals that modify seams, such as "always," "often," "sometimes," "rarely," "almost," "nearly," "hardly," etc. Only these words can appear in this position in a sentence as in "He often will (will often) visit New York." They contribute to the Cartesian Product of a sentence to specify an infinite number of meanings. A good rule of thumb test for a grammatical particle to qualify as a member of this modal group is whether it can be the first word of a yes or no question, appearing before the subject. When word order is reversed in this manner it has the special and crucial function of turning a finite sentence into a question. This is evidence that they are associated with the subject concept first rather than the verb phrase concept.

Verb-Seam Predicate Sentences

The next group of sentences is that in which the seam is found as the inflection grammatical of the main lexical verb, and thus, located between the verb and its object. This is classical subject-verb-object (SVO) word order, which occurs in only a minority of English sentences. Here, seam concepts are the bound -s or -d inflection grammaticals seen inflecting tens of thousands of lexical verbs in finite sentences and finite clauses. Examples of such verb enriched seams are verbs like "promise-s" and "walk-ed."

Figure 21:
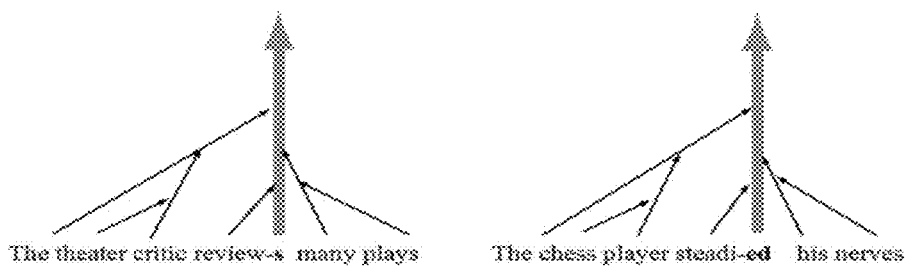

FIG. 21 shows flow-of-meaning trees for two typical sentences: "The theater critic review-s many plays" and "The chess player steadied his nerves." Here, the observer first sees the relations, symbolized by grammatical seam -es between verb concept review and object concept manyplays and by grammatical seam -ed between concept steady and object concept hisnerves.

Figure 22:
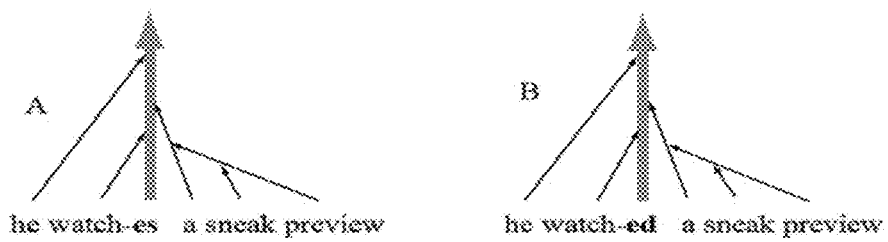

As another example, consider flow-of-meaning trees for two finite sentences "he watch-es a sneak preview" and "he watch-ed a sneak preview". FIG. 22 illustrates two flow-of-meaning trees that show the order of precedence of enrichment of the surviving seam concepts that determine world. The seam concepts of these sentences that indicate world are the -es and -ed inflections of verb "watch." They distinguish present world from not-present world.

Seam grammaticals -es and -ed are serially enriched by concepts watch, asneakpreview, and then he in order of precedence. Sentence A, in which the verb has an -es inflection is a record of an observation in the present world of the observer equivalent to "I see him watch a sneak preview." The verb inflection is the surviving concept and the lexical verb merely enriches it. Sentence B, in which the verb has an -ed inflection, is a record of an observation in a memory world equivalent to "I saw him watch a sneak preview." Incidentally, this is why verbs in headlines and stage instructions are in the present tense. They are describing the present text content or stage instruction, not the actual event being reported. These sentences have the same meaning as "I see him watch a sneak preview" and "I saw him watch a sneak preview". It is no coincidence that "see" and "is", and "saw" and "was", are phonetic reverses.

The effect of predicate sentences is to focus attention first on the verb action concept and second on a change in the object concept. Often some meaning will rub off on the subject. Because grammatical "do" is the only possible relation between subject and verb phrase concepts, it can be omitted. Any change caused in the subject is secondary and comes from being party to an observation, which may range from almost nothing to very significant. The verb action, not the subject, is made real first in a predicate sentence. The bound inflection grammaticals of a verb, -es or -ed, not its lexical verb stems, are the surviving concept of that matching. In some sentences, the seam concept is not explicit, but is covert in strong past tense verbs like "came" or "broke," but is still the surviving grammatical. This kind of sentence, in which the seam is in the predicate, is a descriptive sentence or narrative sentence that moves a story along. They are always affirmative and cannot be used for negation or for questions.

A subtle point here: there is an invisible default relation, "to," between a transitive lexical verb and its object. Because this relation between a verb and its object is a default relation, "to" can be omitted. This covert "to" relation is enriched by the verb's object, and then it enriches the seam concept already enriched by the verb to form a predicate concept.

Although, like all sentences, predicate sentences are statements, they have the effect of enriching the syntactical object of the verb concept much more than they enrich the subject concept. This verb phrase concept is thus realized and set as a predicate before the subject further enriches it. Arguably, a seam enriched first by the subject is not a predicate. In such sentences the verb phrase is just that, a verb phrase.

Phrasal Verb Sentences

The next predicate sentence subtype comprises sentences with a phrasal verb, such as "look up" and "take out." Phrasal verbs are a compound of a lexical verb and a grammatical particle. They have lexical meaning flowing from a following free grammatical particle into a lexical verb. Phrasal verbs are needed when the relation between verb action and syntactical object is not the default obvious one and so has to be made explicit.

In the phrase "turn off the cell phone", the nature of the action, i.e., "offing" the cell phone, is determined by grammatical concept off. The phone is "offed," not turned. Enrichment of lexical verb concept turn by off indicates how the "offing" was done. The sense of the "offing" is further enriched by its object, in that it is being done to a cell phone. Phrasal lexical verbs can adopt a very different meaning, often metaphorical, like "ripped off." Consideration of phrasal verb sentences gives further insight into the function of lexical verbs as enrichers of their inflections rather than the other way around.

Figure 23:
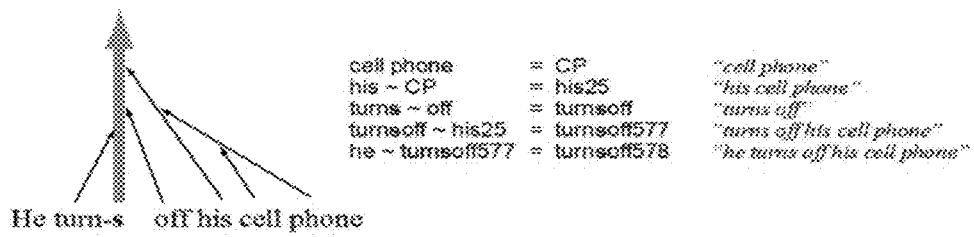

As an example, the flow-of-meaning tree and Mensa table for the sentence "He turn-s off his cell phone" are illustrated in FIG. 23. In this sentence, grammatical seam -s is the surviving concept, enriched first by turn and then by off. The purpose of phrasal verb sentences is to realize the completion of the verb action, first, by placing the seam between the verb and its completing phrasal particle. Phrasal verbs often denote verb processes that go to conclusion. The particles are said to be completitive.

Seam Outside Sentence

There is a small closed subset of only eleven English verbs that move the reality function out of the clause itself. These are the very special verbs: "see," "watch," "look at," "hear," "feel," "let," "make," "help," "require that," and "have." For example, "I heard him make the speech" means "he made the speech." "I saw John get the firewood" means "John got the firewood." They are mostly sense verbs that indicate that the relation in the sentence between subject and second relative object has been observed, and thus, is real. The relation and all the concepts mentioned in the sentence are realized. These verbs perform the same reality function that a seam does within a sentence.

Parsing Sentences Mentally

One can take the sentence "Tom assigned the job to Jim" and mentally parse it in various ways other than the default parsing. FIG. 24 shows how working with the same reality, the sentence may be alternately parsed. These flow-of-meaning trees are meant to show how a sentence describing an action might be parsed in the mind of an addressee to focus meaning on which of the party concepts is the appropriate answer to each question. To force a parser module to direct all meaning to a particular symbol would require replacing it with a relative pronoun grammatical and reordering the expression.

Parsing Sentences Actually

When we read or hear a language expression, how do we know immediately whether it is a finite sentence and not just a non-finite expression that may well describe an equally complex thing? To develop a parser, do we have to be clear about what makes a sentence finite? What confers finitivity on a sentence? What is special about a finite sentence as compared to a non-finite language expression? What differentiates its syntax from that of a non-finite expression? How do we figure out which is which? Humans do this easily and automatically. But how does a human parser detect that a seam is present in an expression to make it a finite sentence, and thereby recognize that a given language expression is a sentence? It is easy for us, but how will a software parser identify which is the seam symbol in a sentence and where it is?

Practically, parsing any utterance, the first task is to look for a seam symbol carried on or in one of the words to see whether it is a finite sentence or just an expression. By the time we first perceive a seam, it is always already incorporated in a lexical word or a grammatical particle. Finding the seam concept in a sentence is automatic for a literate human but not that easy for a computer parser.

The anatomy of every observation comprises a first relative (i.e., the subject concept), a second relative (i.e., the object concept), and a BE, HAVE, or DO relation concept between them. A finite sentence thus gathers its string of symbols in order into three discrete complexes of symbols: a subject complex, an object complex, with a relation complex in between. Every observation expressed by a finite sentence is thus a relationship observed between two often complex mental concepts.

The first steps in parsing a finite sentence are to pre-build the subject concept and the BE, HAVE, or DO relation concept, and the object concept. Then, other meta-concepts, such as time, place, reason, and manner, which will serially flow meaning directly and indirectly into the enriched seam, are added to complete the observation. Each step of this process is the same as the construction of an expression concept around its "it" concept. However, an observation is a mean-it concept built around a central seam concept that indicates its equivalence with what is in the observer's mind.

There is no verb in finite sentences, such as: "Yes." "No." "Never." "Alright." "OK." "Indeed." "Bummer." "The more the merrier." Nor is there a verb in a headline, such as: "Obama in Hawaii for Xmas" All of these are affirmations of the existence of a relationship of interest. Verbs are often left out completely from headlines without loss of reality, in the interests of conserving type space. Note that, here, the object is the object relative of the subject relative, not the syntactic object of a lexical verb as is usual in grammar.

In the predicate sentence "FedEx delivered the package to Harry's office", the seam symbol is the -ed inflection enriched by verb "deliver" and is incorporated in the predicate. The flow-of-meaning tree diagram in FIG. 25A illustrates the observer "overseeing" the relay of meaning into the seam symbol, which in this flow-of-meaning tree is the remote world -D inflection on verb "deliver". Verb inflections are seam grammaticals, and the embedded -D symbol in this past-tense verb is the seam symbol standing for the seam concept that turns this expression into a finite sentence. The -D inflection on the verb indicates that the verb action is not in the present world. This seam grammatical will be enriched directly and indirectly with meaning from all of the other concepts in the finite sentence to become the observation concept. The concept block diagram shows the meaning gathered in -D4 from four component concepts. They become real as they are included in order into the -D seam grammatical. The Mensa table in FIG. 25B lists the eight operations on symbols that document this meaning flow.

The meaning relay narrative of this sentence is as follows: In the first round, possessive symbol -s is enriched by Harry to give his. Symbol the is enriched by package to give the1, and the -D seam symbol is enriched by deliver to give intermediary concept D1. In the second round, his is enriched by office to give his1, and D1 is enriched by the1 to give D2. In the third round, to is enriched by his1 to give to1, and D2 is enriched by to1 to give D3. Finally, D3, having gathered meaning from all the symbols following it, receives meaning from subject FedEx to become mean-it D4. Here, the sentence is being parsed to a statement rather than to an enriched subject concept.

When a relation is a well-known default relation, the explicit grammatical symbol for it is omitted. This is one of the reasons language has been so hard to computerize. Relation grammatical do is the default relation between subject and verb concepts in a sentence. So do can be left out, as in predicate sentences like the above. Relation grammatical to is the default relation between a transitive verb and its object concept in a sentence. So to can be left out, as in predicate sentences like the above. There is only one default relation between verb concepts and their syntactical object concepts: to. However, both do and to are needed in the question "What did she do to her hair?", where the verb is not yet explicit. Do is required when affirmation or negation is being stated or questioned. Just because default relations are not represented by a grammatical in language, it does not mean they are not there. They still are. For example, when an omitted BE relation symbol is enriched with seam -s, all we see is verb "is." It is convenient to refer to the seam-enriched relation as the seam concept itself because it makes flow-of-meaning trees and Mensa tables more accessible. We adopt this convention.

Deixis

The word "deixis" means that context is required to know to what words are referring. Every sentence has a deictic center or "origo" which is its home. The origo is mostly where the subject is, but a sentence may have a point of view which is the home of another concept. The origo can be transferred from the mind of the narrator here and now to another person, time, place, or social position. Language sentences can also indicate what is going on in the mind of a person other than the narrator (e.g., "I am coming to New York to see you"), and be sensitive to the other person's home status, as if it were our own, resulting in feelings of empathy and sympathy. Deixis is well understood by linguists.

Communication by Sentence

The mental process of performing an observation creates in the observer's mind a structured relationship of concepts that reflects in depth what is going on in the world observed. It involves consciousness and attention. When the observer actively reruns an observation in his mind, it is a thought. Thus a thought is mentally observing a relation between observed concepts. Sentence texts are like program code that, when run, can result in reactivation of the memory of the observation as a conscious thought and support an utterance. This illustrates another distinction between finite sentences and non-finite expressions: sentences are programs that operate on data to form new data, i.e., expressions are data. This whole process of observation and recall is completely analogous to making a live video recording and playing it back later.

The famous triangle of Richards and Ogden is applicable to the processes of employing a finite sentence to communicate a message. Knowledge goes from real world to first person directly, from mind to mind indirectly via text, which is the medium. With language, the first person generates text. Text is fixed, and like letters carved in a tablet cannot be changed. The second person reads the text and gets the message.

A redrawn triangle of Ogden and Richards is illustrated in FIG. 26. The letter S is used as the symbol for the conceptual content of the message, and the letter T stands for the fixed text. The phonemes, "say" (words), "see" (world), and "sci" (knowledge, from Latin verb scio, to know, understand) cue the three corners of the O&R triangle. The word "sense" is a phonetic palindrome, S-N-S. These symbols can be taken to mean knowledge going directly from world to mind. S-N-S is a phonetic palindrome that suggests the origin of the word "sentence." A sentence makes sense indirectly via text S-N-T-N-S. When a judge pronounces a sentence, the text is set in stone. That phonemes are mnemonic cues to meaning is a constant theme of this monograph.

A sentence is a medium of communication. Sentences are instructions to a second person to build more complex concepts from already known concepts. The symbols used can communicate the relationship of concepts to another mind. A sentence is the choreography of a thought, a program that allows a second mind to think the same thought and make its own memory trace, which again can be reactivated at will. A first person generates and utters a sentence to communicate with a second person so as to enable the second person to build the same conceptual structure in his mind, and thereby learn something about the real or imaginary world that is known to the first person. By uttering a sentence with a seam concept, an author speaking his mind, assigning symbols to all the concepts in his mind and relating them to each other, declares that the concepts and their organization, that his words describe, do exist or do not exist in his mind, and by inference exist or do not exist out in the real world or only in a memory world. Fortunately, all of this can be managed deftly with the embodiments of flow-of-meaning trees and Mensa tables disclosed herein. Flow-of-meaning trees and Mensa tables can model all the functions of a sentence perfectly.

I.6. How Subordinate Clauses and Questions Work

Subordinate clauses take advantage of the fact that, when an expression musters a series of concepts into a congruent relationship, each party concept adapts its sense and status to fit into context. Each concept embedded in an expression takes on a very subtle and nuanced sense. Authors use this exquisite molding of sense to formulate very special versions of a concept by placing it in a particular expression. Then, they extract this meaning by packaging it in a relative pronoun grammatical. By the time we see it, the party concept has been transformed, embedded in a grammatical, and the grammatical has been moved to the front of the subordinate clause leaving its original position empty in the subordinate clause, i.e., its "trace." We can record this process precisely by rearranging a flow-of-meaning tree and Mensa table so as to flow all meaning into the initial relative pronoun grammatical.

The relative pronoun then contributes its special meaning into a target concept in the main clause. Questions are framed by a similar process. We show that flow-of-meaning trees and corresponding Mensa tables are an orthography that can precisely document such steps of mental play so that a computer program can mimic them. We also show that conceptual content induced in a party concept of a subordinate clause is relayed to a party concept of the main clause to enrich that party concept. In those cases, inter-clause transfer of meaning between party concepts was the reason for putting main and subordinate clauses in juxtaposition. Questions are framed by a similar process whereby relative pronouns become interrogative pronouns.

As mentioned above, subordinate clauses take advantage of the fact that when an expression musters a series of concepts into a congruent relationship, all the concepts mentioned in an expression receive meaning directly and indirectly from their peer concepts and adapt in very subtle ways by way of being party to that expression. Concepts in the middle of an expression with many relatives contributing meaning to them can adopt very nuanced shades of meaning. They are squeezed into shape and come out with exquisite molding. The interflow of meaning between the concepts mentioned in an expression is omni-directional. Each party of an expression or sentence concept adapts its sense and status to fit into context, taking on a special meaning suitable to the context it finds itself in, and receiving meaning flowing from each and every one of the other concepts.

A good reader is free to parse an expression mentally in many ways, in ways that direct this flow of meaning into any one of the party concepts, making it the "it" concept of the expression. A reader or listener, the second person, who has performed such alternate parsings of an expression in his mind, can go on to calculate mentally how each and every one of the mentioned concepts is affected by being involved. This mental play often requires the second person to come up with ideas, concepts not mentioned, and reach for allusions, to enable parsing that lets us determine exactly what the author intended. Flow-of-meaning trees and corresponding Mensa tables are an orthography that can precisely document such steps of mental play so that a computer program can mimic them. First, consider how a subordinate clause is constructed.

Authors use this exquisite molding of sense to formulate very special versions of a concept when they place it in a particular expression. Then, they extract this meaning by packaging it in a relative pronoun grammatical. By the time we see it, the party concept has been transformed, embedded in a grammatical, and the grammatical has been moved to the front of the subordinate clause leaving its original position empty in the subordinate clause, i.e., its "trace." We can record this process precisely by constructing a flow-of-meaning tree and Mensa table that flows all meaning into the relative pronoun grammatical at the front of the expression. The relative pronoun then contributes its special meaning into a target concept in the main clause. This is the basis of the method for the construction and function of subordinate clauses.

Like any player in a tennis tournament can be the winner, any one party concept in an expression or finite sentence can be the surviving "it" concept. An author, by changing the order of the symbols in the expression, and, if necessary, inserting grammaticals appositely, can force parsing that makes any one of the concepts mentioned in the new expression the "it" concept. The strong method for doing this in English is to mention the "it" symbol at the beginning of the expression where a flow-of-meaning tree would show meaning being directed into it.

Writers make use of grammaticals to harvest the meaning that a concept may acquire in one expression, and use it to enrich the same or another concept in another expression. They use one of the relative pronoun entity grammaticals "what," "which," "who," "when," "where," "how," and "why," and anaphoric grammatical "that," as well as using conjunction grammaticals, such as "as," "so," "since," and "because" to harvest the meaning that a concept may acquire as a party concept in a subordinate clause. This acquired meaning is then transferred to just one of the concepts in the main or higher-level clause that the author wants to enrich. In that way, the author can shape the sense of the receiving concept exactly the way he wants.

There is a vast linguistic literature dealing with subordinate clauses and questions, under the rubric of transformational grammar, context-free grammar, and parse trees, such with nodes labeled NP for noun phrase and VP for verb phrase. Rules to process such parse trees using so called context-free grammar have been developed that rely largely on parts of speech (POS) of words and rules for moving them into different positions in the sentence. Although these trees may have similar figures as the disclosed flow-of-meaning trees, the disclosed scheme emphasizes concepts, not words, and the disclosed trees may be context-specific. The disclosed scheme parses the expression for a survivor "it" concept along the lines of a single elimination tournament. The ability to precisely define the structure of context-specific concept trees with an array makes computer processing straightforward.

Constructing Relative Pronoun Subordinate Clauses

Let's start with the finite sentence expression "margin lending can be highly profitable", and make a relative clause from it. This sentence mentions two concepts. A Mensa table can force a parser to make one of the concepts be the surviving concept. The flow-of-meaning tree for the expression "margin lending can be highly profitable" is illustrated in FIG. 27A. The corresponding Mensa table is illustrated in FIG. 27B.

The expression can be made into a relative clause by replacing "margin lending" with "what" to get "what can be highly profitable", as illustrated in FIGS. 28A and 28B. Using this relative clause, a whole new sentence can be constructed, saying something else—i.e., "margin lending is what can be highly profitable"—without changing the underlying world situation. The new sentence picks subject-seam concept "margin lending is" as the "it" concept and enriches it with the what concept that has absorbed meaning from all the other terms of the reordered what subordinate clause expression. The flow-of-meaning tree and Mensa table for the new sentence are illustrated in FIGS. 29A and 29B, respectively.

If you study the flow-of-meaning tree and Mensa table you will see that, in a what subject relative clause, meaning from the relative clause flows into the first-mentioned subject concept what rather than into the seam can. A rule of syntax may be: relative pronouns trump seams. The meaning contained in this relative pronoun grammatical is relayed on into subject-seam concept "margin lending is", enriching that concept.

In other cases, the relative pronoun may not be the subject of the relative clause. Nevertheless, it still receives meaning from the other concepts mentioned, and is brought to the front of the relative clause. From there, it relays meaning on into a concept in the main clause with which it is now in juxtaposition. By reordering the words in a sentence, one can, without changing the reality, rewrite the expression above to make any concept the surviving concept by bringing it to the front. So, "highly profitable" will be made the concept of interest with the sentence "highly profitable is what margin lending can be". The flow-of-meaning tree and Mensa table for this new sentence are illustrated in FIGS. 30A and 30B, respectively.

Figure 30C:
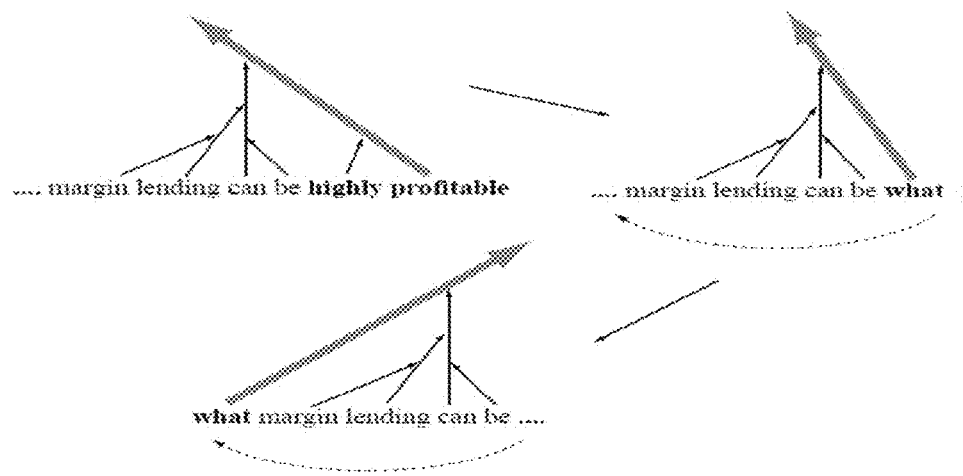
Figure 30D:
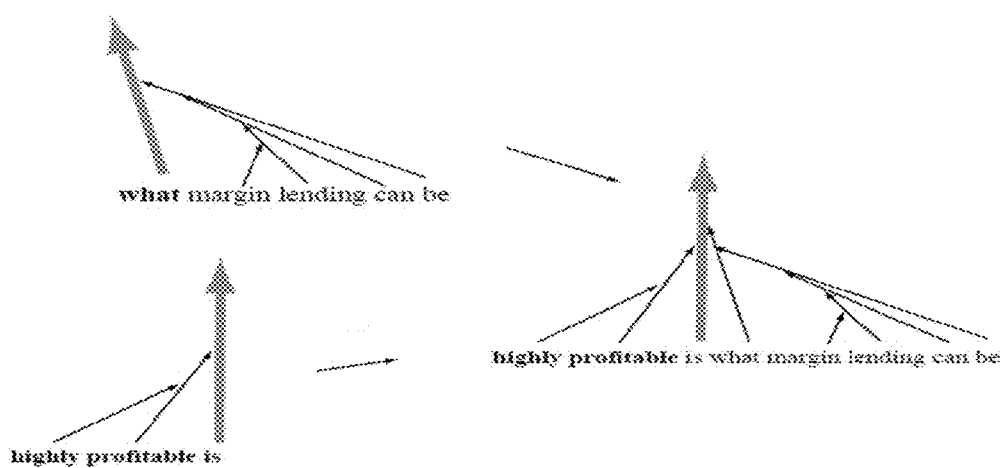

FIGS. 30C and 30D show relative pronoun what receiving meaning from being the object relative concept of the subordinate clause. Now, let it "come about" to subject position in the sentence, thereby becoming simultaneously the object relative concept of the main clause. From there, what relays its received meaning to concept HPis ("highly profitable is"), the subject-seam of the main clause.

Notice that, to write an expression that explicitly makes concept HP the concept of interest, one had to reorder the symbols and insert grammaticals "is" and "what" appositely. Seam concept is combines with concept HP to make subject-seam concept "highly profitable is", which is then enriched by the what concept. The parse process may be described as follows: bundle the concept in the subordinate clause into a relative pronoun grammatical, which receives the meaning normally delivered to that slot in the clause. Move this enriched relative pronoun grammatical to the front of the subordinate clause leaving an empty trace where it was. Then make it a party to the main clause to contribute its received meaning to a concept there. Subordinate clauses work by substituting a relative pronoun grammatical for the concept of interest, bringing it to the front of the expression, thus having it relay its meaning on to another concept to enrich that concept in a highly nuanced manner.

Constructing an "if" Subordinate Clause

Conjunction grammatical "if" provides another good exercise in the theory of subordinate clauses. Grammatical "if" can receive and relay only a Boolean value. That's what "if" does. This is a nice example of how grammaticals have idiosyncratic functions. For example, consider the sentence "If a bird had your brain, it would fly backwards". The flow-of-meaning tree and Mensa table for this expression are illustrated in FIGS. 31A and 31B. The parse process may be described as follows: Parsing the subordinate clause "If a bird had your brain," concepts a and bird, and your and brain, match up in the first round to form concepts a452 and your238, respectively. In the next round a452 and had match to form concept had453. In the next round, a453 and your238 match up to form had453. In the next round, if is enriched by had453 to get if453, which in the next round is enclosed in a comma to form ,if453. Parsing the main clause "It would fly backwards", concepts it and would, and fly and backwards match up in the first round to form concepts itwould and fly26, respectively. Concepts itwould and fly26 match in the second round to form itwouldfly26. Next, itwouldfly26 and . match in the third round to enclause this main clause in a period. Finally the two enriched punctuation mark concepts interact to determine the truth value of the main clause. First, the subordinate clause packages its truth value first in grammatical if and then it is enclosed in the following grammatical comma. The enriched comma feeds its affirmation or negation value into the Boolean value of the main clause enclaused in its period grammatical. This determines the truth value of the main clause. In this case, one might say "it's a big if" or "it's very iffy". This a perfect example of punctuation marks doing logic.

Constructing Questions

This is a good point to show how a statement can be turned into a question by reordering the symbols of an expression in the same manner used to form subordinate clauses. This next example, illustrated in FIG. 32, also shows how changing subject-seam order in a statement to seam-subject order can convert a statement into a question. Questions are formed by swinging the subject symbol expression to the left side of the seam symbol. This indicates that information will flow in the opposite direction, from second person to first person, from you to me.

In the example of FIG. 33A, if one asks "Did the Duke of York arrive late?" or "Did he arrive late?", a parser with access to the Mensa table illustrated in FIG. 33B would arrive at the same row, did1, in either case, and give the answer "Yes, the Duke of York did arrive late." The Mensa table demonstrates how correct pronoun reference by a personal pronoun is achieved. In this case, the seam is included within the did grammatical, which is enriched with subject "The Duke of York" or "He". The order of did and he in the expression indicates whether it is a question or a statement. A statement is turned into a question by having the subject symbol come about the seam leaving the seam at the front of the expression. FIG. 33A shows the subject literally coming about the did seam.

The sentence "Henry is going to give the money to John." is another example of turning a statement into a question by having the subject "come about" the seam. FIG. 34A shows the flow-of-meaning trees that illustrate this transformation. This sentence can be turned into a question by reversing the order of the subject and seam, and replacing the period with a question mark. Three more rows, illustrated in FIG. 34B, may be added to the sentence's Mensa table to enable the parser to parse the question. Reversing the order of subject and seam creates an interrogative subject-seam. It stamps the meaning contained in it as a question. Kipling's six honest serving men are relative pronouns if the speaker knows their content, and interrogative pronouns if the speaker does not know their content. Syntax indicates in whose mind the speaker believes the knowledge to be, his or the second person's. If I can indicate that I do not know what the contents are, any courteous interlocutor will tell it to me, i.e., fill the seam grammatical with affirmation, negation, or modality.

When someone makes a statement about something, one might ask, "How did this come about?" These flow-of-meaning trees appear to show that the process of having the subject symbol "come about" the seam to turn a statement into a question, and vice versa, is very like the sail movement as a sailboat changes tack from starboard to port. The flow-of-meaning tree diagrams literally depict the crossing over of the sail when a sailboat changes tack described by the nautical term "come about."

Now let's see how to formulate "when," "where," "how," "why," "who," and "what" questions. Once a yes or no question has been framed in an expression and in a Mensa table, its concept can be used to enrich an interrogative pronoun, say why, to indicate which "why" question is being asked. Just put "why" up front in the expression. FIG. 35A shows a flow-of-meaning tree that diagrams this question. FIG. 35B illustrates two rows that are added to the corresponding Mensa table to enable the parser to turn the expression into a "why" question.

Interrogative grammatical concepts, such as why above, convey that the meaning they contain is in question. If I can indicate that I do not know what the contents of an interrogative grammatical are, my interlocutor will tell me out of courtesy, i.e., fill the grammatical with the desired information. This is one of many occasions when an addressee has to cast about to determine what meaning a particular grammatical is to be filled with.

I.7. Punctuation

Punctuation marks are symbols for concepts just like lexicals and grammaticals, and can be treated as grammaticals. They typically contain more complex concepts like those meant by expressions, clauses, sentences, and paragraphs, and take part in relations at higher levels of the flow-of-meaning tree. Relations between punctuation mark concepts are in the realm of logic. Punctuation marks are valid symbols for concepts and herein will be included under the term grammatical just like the other grammaticals. Punctuation marks are expressed in spoken language as a silent interval or a dropped beat, marking an empty space separating expressions of complex concepts. A longer interval to mark the end of a sentence is a full stop. Recently, CA1 neurons, dubbed "time cells," have been found in the hippocampus that fire to record empty intervals between episodes of activity. Thus, it looks like punctuation marks may have their own assigned neurons, just like lexical words and grammaticals.

Lynn Truss's book "Eat Shoot and Leaves" immerses readers most entertainingly in the history, theory, and practice of punctuation. Its main thrust is to show that punctuation marks are very useful in making clear what is being said, and that punctuation marks can radically change meaning. Inappropriate placement of commas, for example, can introduce an unintended double meaning. On testing the disclosed flow-of-meaning trees and Mensa tables against many ambiguous examples in "Eat Shoot and Leaves," they resolved the double meaning in every case.

Punctuation mark symbols function to tell the reader not to go on parsing until the previous text has been parsed to a single concept. However, once a preceding text is parsed to a single concept, where are we to put its meaning? Punctuation marks are attached to the whole preceding phrase or sentence, not the last word. As Lynn Truss reminds us, the comma used to refer to the whole phrase, not just the punctuation mark, and the Greek word "comma" means a "cut off piece". Hold this higher-level punctuation concept in short-term memory so as to be able to pair it later with another higher-level concept, again contained in a punctuation mark, in a later round of the tournament.

The idea of treating punctuation marks as grammaticals, able to hold such parsed concepts, turns out to be very practical in terms of parser issues. Under this scheme, each punctuation mark or point becomes a container of the meaning that flows from a preceding contiguous phrase, expression, or finite sentence. Just like the other grammaticals, punctuation marks put their stamp on what kind of concept it is. Two good examples are: when an expression concept is followed by a question mark, it becomes a question, and when an expression is followed by an exclamation mark, it becomes emphatic or loud.

Punctuation marks contain complex concepts. The irony is that the more compact the symbol the more complex the concept it contains. How punctuation marks function is best understood by perusing some flow-of-meaning trees and Mensa tables for expressions that include punctuation marks.

The Comma

Consider the sentence "In a surprise move, Spirit Airlines will charge $45 for carry-ons." The prepositional phrase "In a surprise move, . . . " expresses a mental in concept whose meaning ends up embedded in a comma symbol. The meaning flow diagram for this comma phrase (enriched by the "in" prepositional phase) is illustrated in FIG. 36A, and the corresponding Mensa table is illustrated in FIG. 36B. The meaning flow may be described as follows: Concept move is enriched by adjective concept surprise to yield concept surprisemove. Indefinite article concept a is enriched by surprisemove to yield enriched determiner concept a1, which enriches concept in to yield in1. Concept in1 relays its meaning in turn into the comma to yield enriched comma concept ,1472, which now contains the whole in concept. This comma symbol packaging a single in concept stands ready to relay meaning to the period concept of the main clause.

This prepositional phrase comma concept can be mated with a finite sentence period concept. It is a rule of syntax that, once a punctuation mark concept is filled with meaning, there has to be a matching punctuation mark for it to mate with later in the expression, just like parentheses in algebraic expressions. This explains why the comma phrase "In a surprise move," by itself feels incomplete. The comma of this prepositional phrase can be matched up with the period of the main clause to form a complete sentence, where the period grammatical is the survivor concept. In an embodiment, periods trump commas.

The main clause, "Spirit Airlines will charge $45 for carry-ons" parses to a unitary will mean-it concept. FIG. 36C illustrates the flow-of-meaning tree for this main clause, and FIG. 36D illustrates the corresponding Mensa table. This Mensa table shows the modal grammatical will being enriched twice, first by preceding subject concept SpiritAirlines to form a seam-subject concept, and then by following verb phrase concept charge2, resulting in parse seam grammatical will becoming enriched to an it that is a mean-it concept.

FIG. 36E shows this will observation mean-it concept being enclosed in a period, which converts the whole sentence to an end-it concept. The flow-of-meaning tree in FIG. 36F shows the enriched will observation concept and the enriched in comma concept both enriching the period concept. The Mensa table row in FIG. 36F shows the main clause .1917 concept being further enriched by prepositional phrase comma concept ,1472 to give .1918, which represents the meaning of the whole sentence. This complete observation concept is now packaged in a period grammatical, and its sense will be modified by meaning flowing in from the content containing period grammaticals of the other sentences to create a unitary paragraph concept.

Figure 37A:
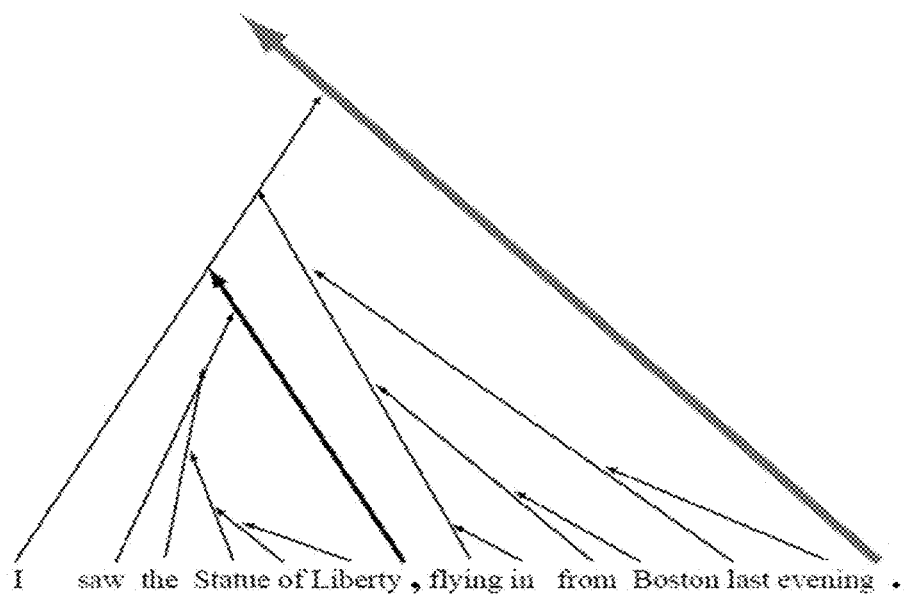
Figure 37B:
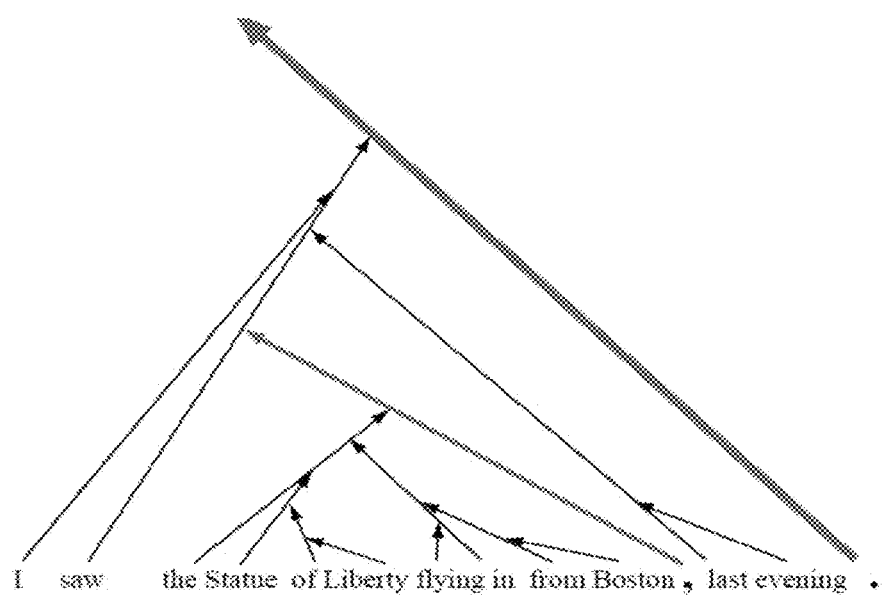

Now, consider the location of the comma in an old artificial intelligence chestnut comprising the two sentences: "I saw the Statue of Liberty, flying in from Boston last evening." and "I saw the Statue of Liberty flying in from Boston, last evening." FIG. 37A illustrates the flow-of-meaning tree for the first sentence, with meaning from "flying in" flowing into "I", rather than into "the Statue of Liberty". FIG. 37B illustrates the flow-of-meaning tree for the second sentence, with the meaning of "flying in" flowing into "the Statue of Liberty". Placement of the comma in the second sentence forces a completely different meaning, one that is highly unlikely. An appropriate Mensa table would allow the parser to obtain the intended meaning.

The Paragraph Mark

Consider the following paragraph:

"There was an announcement from Spirit Airlines last week. In a surprise move, Spirit Airlines will charge $45 for carry-ons. No doubt travelers will resent this. But Spirit Airlines CEO said the charge will improve on-time departures."

It is easy to see that these sentences relate to each other logically. The period, obligatory after each finite sentence in a paragraph, is a container symbol that accepts and packages all the meaning from its own sentence. The meaning of each finite sentence of a paragraph is enclosed in its period grammatical. Each paragraph sentence period literally "makes a point." Usually one of the sentences, often the first, will be the main point of the paragraph, in which case it is common to say "the point is . . . " or "the thing (of it) is . . . ". In this case, the second sentence, "In a surprise move, Spirit Airlines will charge $45 for carry-ons.", appears to be the main point of the paragraph. The point made by each sentence can be matched with points made by other sentences in a paragraph. Meaning flows between them, so that the nuance of each sentence adapts. It is possible to choreograph subtle logic operations.

FIG. 38 shows a string of four periods of the paragraph above forming an expression of just four concepts. These concepts parse to a much more complex unified paragraph concept, holding the meaning of the whole paragraph and organizing all the concepts of each sentence into an overall relationship. With access to an appropriate Mensa table, the disclosed parser program can parse this entire paragraph correctly to a single paragraph concept symbol, not explicit in ordinary text, score the meaning of each sentence, and total a score for the whole paragraph.

Notice that when a finite sentence is employed as a newspaper headline, it does not take a period. This is because the headline is just describing what is in that text and is not being related to other paragraph points.

The Question Mark

The sentence "Spirit Airlines will charge $45 for carry-ons." converts to the question "will Spirit Airlines charge $45 for carry-ons?" by having the subject concept "come about" the seam. Changing the subject seam order indicates that the speaker expects information to flow in the opposite direction, now from second person to first person, i.e., information known to the second person, and not known to the first person. FIG. 39A illustrates the flow-of-meaning tree for this question. FIG. 39B illustrates the operation rows that may be added to the corresponding Mensa table to enable the parser to parse this question and identify which question it is.

The parsing process may be described as follows: Concept symbol .1917 is a statement will concept. ?1917 is a question will concept. It will be seen that the difference between a statement will concept and a question will concept is whether the will is enriched by the subject concept from the left or from the right. This flow-of-meaning tree literally shows the will concept "turning into" a question concept.

The expression "will Spirit Airlines charge $45 for carry-ons" is already a question. However, a question mark is added (i.e., "will Spirit Airlines charge $45 for carry-ons?") to seal the meaning. The meaning of the whole question then becomes packaged in that question mark grammatical. The ? symbol replaces the . symbol, the period punctuation mark, that made it a statement. One can imagine the shape of the question mark symbol showing a period taking a U-turn pointing backwards to indicate information flowing in the opposite direction.

The Colon and Semicolon

Both the colon and semicolon can be thought of as concept packages that contain two concepts: one received from the left, and one received from the right. The concepts can be simple phrase concepts or fairly complex full observation concepts. The two different pictographic elements of the ";" exemplify that the two contributors are not equivalent. Its period represents the main expression, and its comma represents the expression that underscores it. The colon functions in the same pictographic way, collecting meaning from left and right concepts. Its ":" pictograph with both elements identical indicates that the contributing concepts are equivalent. The colon resembles and functions like an equals sign.

Conclusions

An important step we have taken with regard to punctuation marks is to see them as grammaticals, and to treat them just like the other traditional grammaticals, i.e., as containers and shapers of meaning. This has made possible the encoding and parsing of extremely long sentences with multiple subordinate clauses quite straightforward. Mensa table are perfectly able to absorb and manage punctuation marks, and they fit perfectly into flow-of-meaning tree diagrams.

A rule of syntax becomes: lexicals enrich grammaticals, which in turn pass meaning to punctuation marks. That is, punctuation marks trump grammaticals, which in turn trump lexicals in becoming the surviving concept of an operation. This means that punctuation mark contain the more complex concepts. Once the flow-of-meaning tree reaches the punctuation level, the series of symbols of an expression has become an ordered string of punctuation symbols. Each packages a complex concept. With punctuation we are in the realm of logic.

I.8. Pronouns, Paragraphs, and Poems

Meaning can flow between related concepts that are not adjacent in the same line of text. Meaning can jump from a concept in one clause or sentence to a concept in a nearby clause or sentence. In paragraphs, each sentence parses to its period grammatical, making a paragraph a series of points made. Meaning flows back and forth between the points of the paragraph. The points can be combined in a flow-of-meaning tree, embodied in a Mensa table, so as to parse to a unitary paragraph concept. As a paragraph is read, each point is given a score. One point can underscore another, and one point can undercut another. The scores are summed. A total score is kept, which is a measure of how persuasive the paragraph is. With poetry, a different process ensues. Concepts in adjacent lines of a poem can be placed in vertical juxtaposition by meter and rhyme and relay meaning to each other. Meaning flows back and forth between concepts in the same line and between concepts on different lines. This allows for two-dimensional relations and a great richness of concept enhancement.

The idea of a concept being serially enriched by being party to a series of relations has been expressed well by Saul Bellow explaining the difficulty of creating a full character in a novel: "the man (writers) bring forth has no richness compared with the man who really exists, thickened, fed and fattened by all the facts about him, all of his history." A concept can be enriched by relations with concepts that are outside the confines of the current expression or sentence, accruing meaning not just from flanking symbols in the same expression but also from concepts in other nearby and remote expressions. Once party to more than one expression or sentence, an it concept receives more and more meaning from its neighbor concepts in each sentence in which it is mentioned. This meaning enrichment process can continue indefinitely, resulting in a very complex and unique it concept, its wealth of meaning gathered from the totality of statements about it, gained from its entire past and its potential future.

In our discussion of relations so far, we have mostly considered a surviving concept being serially enriched only by relations with concepts mentioned within the one-dimensional line of an expression or a sentence. For example, in a noun phrase a series of adjectives can serially add meaning to a noun concept which is then subsumed by the determiner. We have described how, when two relative concepts within an expression pair up, they adapt their senses to fit with each other and one becomes the surviving concept that now incorporates meaning received from the other, which can then be retired. We have explained that, in parsing an expression, only some of the concepts enter into a relation with an adjacent concept in the first round. Others get a bye to be matched up with another survivor concept in the next round, like players in a tennis tournament. Then, in successive rounds one concept from each pair of matched concepts survives into the next round but modified by its experience. This happens naturally in parsing an expression or finite sentence until the final it concept has received meaning in successive rounds from all of the other concepts mentioned via its participation in several sentences. Meaning can flow not just from concepts in the same sentence but also from a concept or concepts in an adjacent sentence, a form of crosstalk. This leads to a brief analysis of how poetry and song work to reinforce the enrichment of concepts that are connected to many and varied memories and emotions.

In the discussion of the period punctuation mark, it was noted that the meaning of each sentence in a paragraph is enclosed in the period grammatical. Each sentence "makes a point". Then the points form a terse, higher-level expression that parses to a final it concept, the paragraph concept. This is not the intent of every paragraph. Sometimes the clear intent of a paragraph is to fill out the richness of one particular concept.

Serial Concept Enrichment in a Paragraph

In this kind of paragraph, the main purpose may be to serially enrich one particular concept that is a party concept of several of the sentences. Then, we see the same concept being mentioned in many expressions and sentences, accruing more and more meaning in the process. The following paragraph is taken from the review by David Oshninsky of Wilbert Rideau's book on Angola prison in the New York Times Book Review, on Jun. 3, 2010:

"An hour's drive northwest from Baton Rouge sits the Louisiana State Penitentiary, known as Angola, the largest maximum security prison in the United States. On the site of a former slave plantation, it currently houses close to 5,000 inmates and covers more ground, at 18,000 acres, than the island of Manhattan. Surrounded on three sides by the Mississippi River, its stunning physical isolation and distinctive antebellum feel have provided the backdrop for numerous feature films and documentaries, including "Dead Man Walking," "Monster's Ball" and "The Farm." For Southerners, especially African-Americans, Angola is both a prison and a state of mind, a relic from before the civil rights era, when white supremacy was the custom and racial segregation was the law."

As well as painting a picture, the author's intent in this paragraph is to add a wealth of meaning into concept Angola by making it party to a series of phrases, expressions, clauses, and observations throughout the paragraph where Angola is the surviving "it," so that Angola will accrete meaning from neighboring concepts at its every mention. If there were a heading on this paragraph it would be "Angola Prison." This example of skilled descriptive writing makes Angola a very rich concept.

Figure 40:
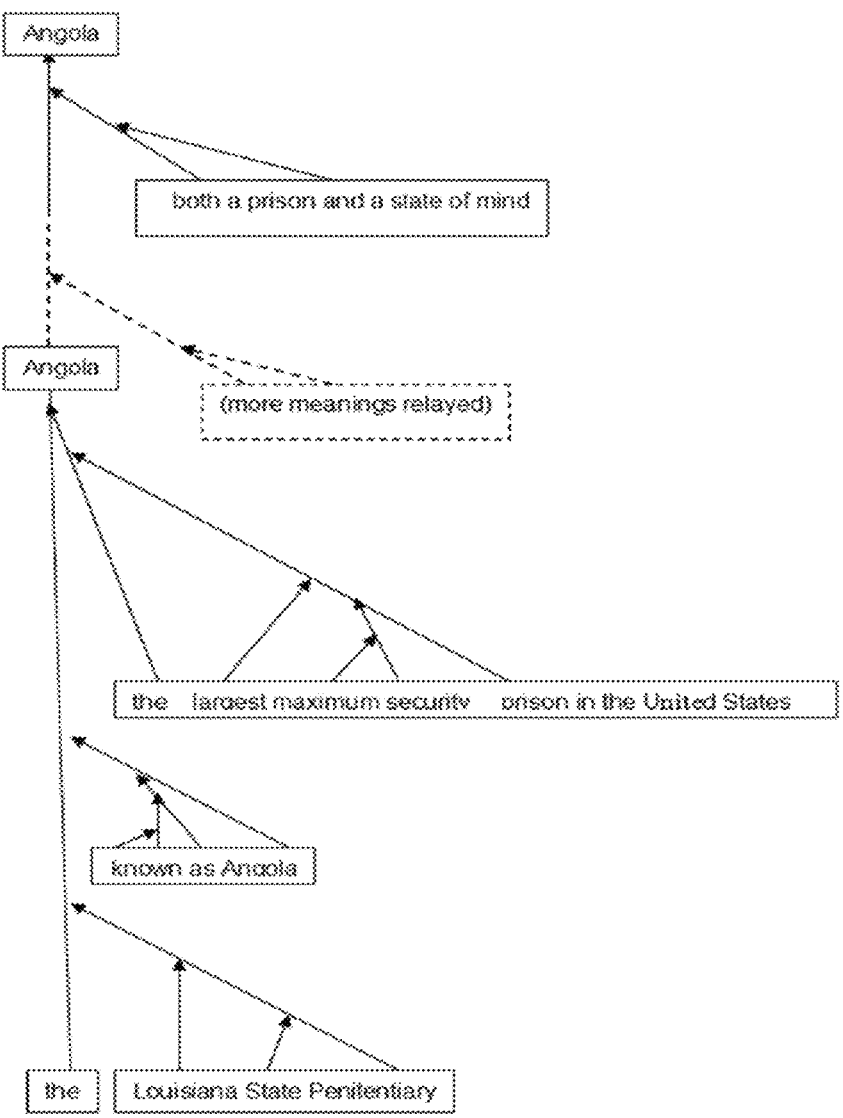

The extended flow-of-meaning tree in FIG. 40 is intended to show the Angola concept starting as an undifferentiated the determiner symbol. Then, it contributes and receives meaning as a party concept of each next sentence (each flow-of-meaning tree) that contains it. We have stated that, within each flow-of-meaning tree, lines cannot cross. However, when a concept escapes from one flow-of-meaning tree to join another, an X does form at the exit point, illustrating the mnemonic effect of the grammatical affix ex-.

Identity

At some point concepts that accrete meaning in this fashion achieve an absolute identity that already incorporates meaning that may be revealed in later expressions. The flow-of-meaning tree in FIG. 40 suggests that the prison's final identity is fully established by meaning inflow in the early part of the paragraph, at which point it is assigned symbol Angola. By the end of the paragraph, it has become an exceedingly rich complex concept, but its symbol remains Angola. The idea is that once a concept symbol attains established identity, anything more added to it does not change it, because all meaning is already contained in what is meant by the symbol.

Incidentally, consideration of the Angola paragraph allows some insight into the function of the grammatical "that." When an author wants to identify a concept among alternatives, he can employ "that" as an anaphor to point back to a previous involvement that a concept has had from being party to a relationship previously expressed or well known. To do this, Rideau would have to say "Angola is the prison that is surrounded (sic) on three sides by the Mississippi river." Now, that picks up meaning from known knowledge, which in this case is re-expressed locally, just so one understands which prison it is. Grammatical that fills with this meaning and relays it back onto "the prison", which then relays it via a "be" relation into Angola.

The Point-Making Paragraph

In most cases, a paragraph serves a different purpose than enriching a single concept when it combines several whole observations. A paragraph is composed of several finite sentences, each one of which may consist of a main clause and several subordinate clauses. Each sentence is ended with a period grammatical. With each sentence the author is "making a point." Note that making the surviving concept of an observation into a point breaks the simplest syntax rule that the first mentioned concept of a match is the surviving concept. However, it can be used as another rule of syntax: punctuation marks trump both end-its and mean-its.

Once the meaning of the ordered string of concepts mentioned in the sentence is packaged into this period, the period acts as a unitary container for the meaning of the sentence. Meaning is relayed between different sentences via the period grammatical of each sentence packed with its meaning. In this view of a paragraph, meaning is not transmitted in a granular way, as will be seen in poetry, from a concept on one line to a concept further on the same line or to a concept on another line. Rather, meaning is transmitted from sentence period to sentence period, i.e., point to point. The brain in turn would have to wire up neurons assigned to each sentence point appropriately into a neural tree to manage such a complex relationship of concepts. Here, both the mind and Mensa tables are operating in the realm of logic.

A paragraph, as a whole, outlines a logical argument, discloses the steps of a process, tells a story, paints a picture, etc. A paragraph can be considered as an expression made up of a series of points (i.e., periods) that parse to a unitary paragraph concept. When each sentence of a paragraph is parsed to a compact period symbol, these points are "atomic." They become the leaves of a higher-order tree. Thus, a complex paragraph concept can be modeled with a flow-of-meaning tree, as embodied in a Mensa table, by combining its component concepts into a unified structure.

Figure 41:
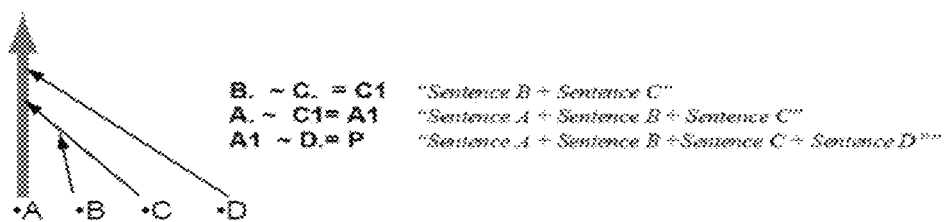

Let's say a paragraph composed of four sentences defines a paragraph concept composed of four observation concepts. At the point level, this paragraph can be represented as a simple expression of four terms by letting the period at the end of each sentence be a unitary symbol for each observation concept. Let each of four sentences parse to its enriched period concept. Then, compact expression, A. B. C. D. can now represent the paragraph. FIG. 41 illustrates a meaning flow diagram and Mensa table for this paragraph template. Note that point .B underscores point .C, not point .A directly. Point .B and point .C have to be matched up to give a survivor that will be matched with point .A before .D is folded in. Once the parser program has parsed each sentence to its period, three more Mensa rows in the database will allow the parser program to parse the text of the entire paragraph, to obtain the unique concept P, the paragraph concept.

Figure 42:
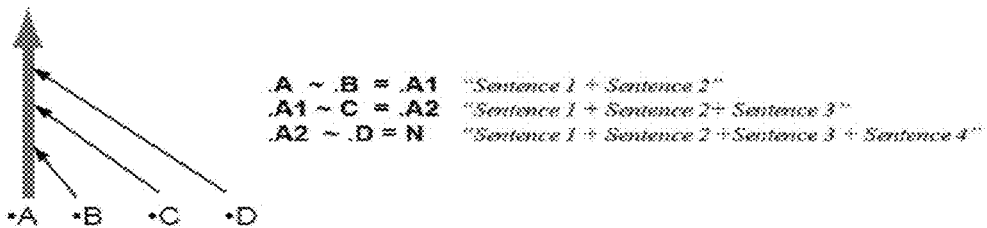

Another common paragraph structure is the narrative. FIG. 42 illustrates a flow-of-meaning tree and Mensa table for a narrative template. In a narrative paragraph, each sentence describes an action or event that occurs in a strict order. A narrative paragraph starts with the first observation, and the following observations steadily contribute meaning to it, along a storyline or a timeline, to create paragraph concept N, a complex narrative concept.

The Mensa rows illustrated in FIGS. 41 and 42 suggest the idea of templates for paragraph Mensa tables. If actual concept identifiers of observation concepts are edited over generic .A, .B, .C, and .D, it instantly creates a working paragraph Mensa table that enables the parser to parse an entire particular paragraph.

Figure 43:
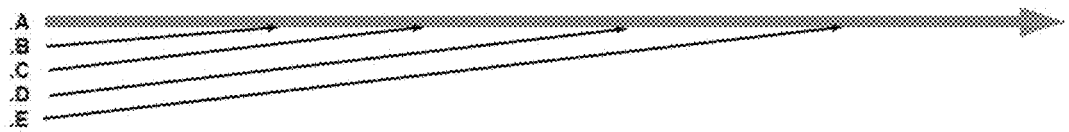
Figure 44:
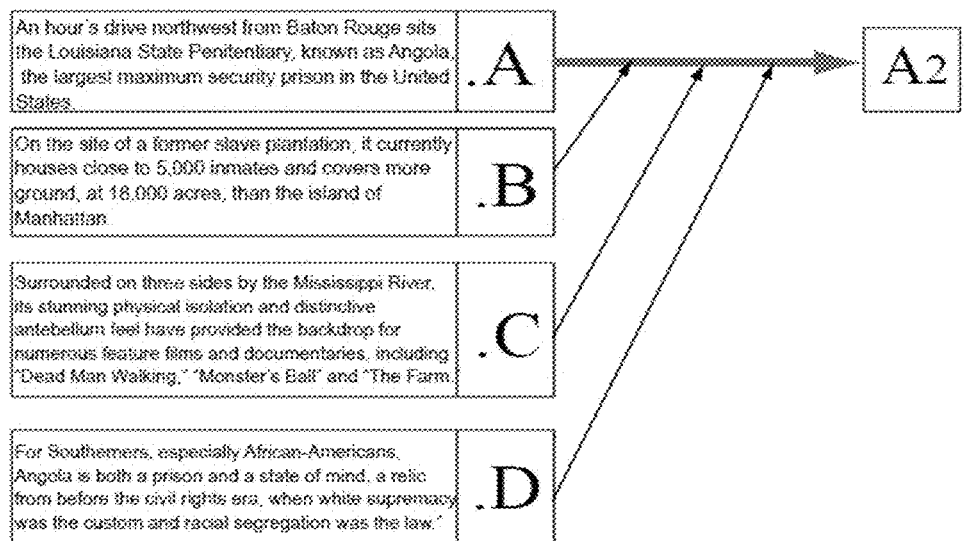

FIG. 43 shows a flow-of-meaning tree drawn like a long "n-arrow" to suggest the origin of words narrative and narrator. On this basis, the Angola paragraph can be seen in a completely different light, parsed as a regular point-making paragraph of narrative type as shown in FIG. 44, with meaning flowing between whole sentences rather than flowing inter-sentence between individual party concepts. It is unlikely that this parsing was the intent of the author, who clearly wanted to maximize the richness of the Angola concept.

Now consider another typical paragraph to see how these ideas play out in practice. Take the following paragraph from Franz de Vaal's review of The Price of Altruism by Oren Harmon in the New York Times Book Review, p. 18, Jul. 1, 2010:

"It grows out of empathy with those in need or distress, a capacity that probably evolved when female mammals began to nurture their young. This would explain why women are more empathetic than men, and why empathy is affected by oxytocin, a hormone involved in birth and breast-feeding. Both men and women display strikingly more empathetic responses in lab experiments after oxytocin has been sprayed into their nostrils. Since oxytocin makes us feel good, there is no sharp line between care for others and self-love."

FIG. 45 shows the flow-of-meaning tree for this paragraph. These four sentences parse to observation concepts .A .B .C .D, with the seam concept being the surviving concept in each observation. Notice that in observation concept .B, the seam is hidden in plural grammatical "both". Each sentence is packaged in a period grammatical, becoming a point concept. The paragraph now becomes a short expression of points: .A, .B, .C, and .D.

Meaning flow diagrams can illustrate meaning flow between the component sentences of a paragraph. Here, one could say that the .B point underscores the .C point. They show how point concepts are combined into a unified paragraph concept. Once a flow-of-meaning tree reaches the punctuation level, it is in the realm of logic. This illustrates an important theme: once complex expressions have been parsed down to single concept symbols, these symbols can be related to each other very simply to perform quite high-level logic.

An entire paragraph can readily be translated into a Mensa table, thereby holding perhaps a hundred concepts. A flow-of-meaning tree can be drawn and a Mensa table composed to structure the entire series of concepts into a single unitary paragraph concept with its own unique compact concept symbol, a paragraph mark signified by a blank line. This Mensa table enables the parser program to identify all of the concepts mentioned in the paragraph and manage their relationships to each other.

In the following paragraph, slightly adapted from a Wall Street Journal editorial, meaning (spin) flows from the last two sentences into the first sentence:

"Oregon raised its income tax on the richest 2% of its residents last year to fix its budget hole, but now the state treasury admits it collected nearly one-third less revenue than the bean counters projected. The sun also rose in the east. The Cubs didn't win the World Series."

Each observation concept expressed by a sentence is a singular entity concept. It is reasonable for the reader to judge whether all of the component observations fit together and whether the ensemble of points makes an integrated paragraph. A paragraph concept is one kind of group concept. We have seen that one function of the seam symbol of each sentence is to gather together all of the concepts, which are party to an observation, that are mentioned in a sentence into a gestalt, putting each one in its place. A Mensa table that focuses meaning into the seam concept can record this process exactly. Then, if all the seams in a paragraph, packaged in periods, are hooked together, all of the party concepts of the whole paragraph will be gathered together into a congruent unified structure and related to each other precisely. The meaning of a highly nuanced paragraph concept can change depending on how it is parsed. It is up to us to determine how the author meant us to parse it.

It is remarkable that a paragraph, such a grander-than-single concept, can organize hundreds of elemental concepts into a complex unified structure with every concept in its place and related correctly to every other one. The effortless power of a list of binary relations, using the method of the single-elimination tournament, to precisely specify the structure of an enormously complex paragraph concept, putting every party concept in its correct place, is impressive. Again, a Mensa table can record this larger process exactly.

Poetry and Song

If an expression can be considered a one-dimensional horizontal string of symbols, where meaning exchanges only between adjacent symbols in order of precedence and in later rounds of the tournament, then a poem can be considered as a two-dimensional array of symbols. Poems with regular meter place concept symbols into vertical juxtaposition in adjacent lines. A good example is in the Ed Bruce song "Girls, Women and Ladies."

Meaning flows vertically from a concept symbol in one line to an adjacent concept symbol in a line above or below, a kind of crosstalk. It is left to the imagination as to what meaning the "yes'es" and the "no's" and the "maybe's" of the Ed Bruce song contain and as to what meaning reflects back onto the three kinds of females:

"And he said there's girls and there's women and there's ladies There's yes'es and there's no's and there's maybe's There's teasin' and pleasin' they start learnin' when they're babies There's girls and there's women and there's ladies"

It is the role of meter to place symbols on different lines in precise registration so there can also be crosstalk between individual symbols in registration on different lines that can be considered adjacent. The function of rhyme is to relate the last word on one line with the rhyming word on an adjacent line. Ensuring that those two words will exchange meaning will adapt their senses. Rhyming of line end words or just their suffixes ensures which symbols will be in relation. Rhyme can also be intra-line: "There's many a slip between the cup and the lip", "There's many a slip between the lip and the cup", "Don't do the crime If you can't do the time", "A Costco in Moscow", "My way or the Highway", "Click it or ticket", and "A man with a plan".

Rhyming words share the same or a phonetically similar suffix. In his book review, Leon Aron explains why Russian poet Joseph Brodsky was unable to translate his poems, originally written in Russian, into English verse, with the same beauty and power of the original Russian, although he tried hard to do so:

"Without a fixed word order, auxiliary verbs such as 'is' or 'are' or articles, Russian offers little to impede the lyrical poet, and Brodsky rejoiced in this paradigmatically inflected language. Rich shades of emotions and meanings are conveyed by prefixes and suffixes. Myriad rhymes are generated almost spontaneously as the mostly polysyllabic nouns, verbs, adjectives and participles conjugate (that is, change their endings) in accordance with six cases and three genders. English, with its rigid order, shorter words and precious little change in word endings, is hardly a happy counterpart."

We can imagine a poet stuffing two different lexical roots into the same suffix. Maybe they are compatible and affect each other's sense in novel and delightful ways. Maybe they conflict in a way that the poet uses to get an effect that gets our attention. The magic of poetry may come from a poet's ability, with clever juxtapositions, to load symbols with subtle meanings.

Tying these ideas to ideas advanced in the neural correlate, the neural network activated by an expression "makes sense" when it addresses and actually gets through to left temporal lobe neurons with projections to both cortices able to evoke memories, images, and feelings in consciousness. Each time a rhyming word is repeated, it is a reinforcing stimulus—another jolt to the primed active network—which awakens more memories, feelings, and images. This effect can be felt by hearing the refrain of the Beatles' first big hit song in America: "I Want to Hold Your Hand." Consider the highly calculated interaction of lyric and tune. The repeats of the refrain likely re-stimulate a neural network already primed, and perhaps raise the level of activation to new heights to evoke other memories and feelings not raised earlier:

"Oh yeah, I'll tell you something I think you'll understand When I say that something I wanna hold your hand I wanna hold your hand I wanna hold your hand"

This song, upon its release in America in 1964, clearly activated the limbic system of millions, selling ten thousand copies every hour in New York, topping the charts for seven weeks, and rocketing the Beatles to the top of the pop music world. The propensity of the human mind to allow well-ordered symbols to give pleasure makes writing one of the forms of art along with music, painting, sculpture, etc.

II. Invariance for Expressions that Mean the Same Thing

One important attribute of a computer language understanding system is an ability to precisely understand what is said to it, no matter what words are used, and even for input text phrased in many thousands of different ways. In neuroscience terms this is called invariance, the ability to recognize that something is a tree or a chair no matter how or where on the retina its image is presented, or what is its size, orientation, surface color, reflectance, or lighting conditions. Stanislas Dehaene says that for that mind to do this, all possible representations of an entity have to be "tied together" in the mind. We picked a complex concept that cannot be specified precisely in less than twenty-five words, and calculated that it could be stated correctly by more than nine billion different sentences. Then, as an exercise, we developed a Mensa table that enables our parser to identify all nine billion sentences that precisely mean that concept, yet reject any sentence that did not express the concept correctly, even if it used the same words. Incidentally, this exercise showed that Mensa tables can seamlessly incorporate truth tables which enable a computer to mindlessly perform highly abstract logic better and faster than humans.

Language is a vast combinatorial system which can say trillions of different things, all making sense. Linguists usually express this idea by saying an infinite number of sensible language expressions and sentences are possible. But what does not appear to be widely recognized by linguists is that it is also possible to say the same thing, to express the very same concept, precisely, in billions of different ways. Pronouns, epithets, synonyms, paraphrases, synecdoche, metaphors, multiple subordinate clauses, etc. are all commonly used in expressions and sentences that can refer to the same precise concept. One can freely use active or passive voice and change the order of words and phrases, again in a virtually infinite number of ways, while preserving the same meaning. The term "invariance" describes the mind's ability to realize that a concept is the same even if expressed in many different ways.

The sizes of the Cartesian Products of word strings that say exactly the same thing create a huge combinatorial problem for natural language. A parser has to be able to field them all and pick out the multibillions of well-formed expressions and sentences that do have the same precise meaning, and distinguish from the multibillions of sentences using much the same words that say something else, or do not make sense, or use bad grammar. This could be done by creating and storing a table of billions of text strings that express the concept accurately. However, this is not practical. It would take thousands of clever, literate people many lifetimes to generate a complete list of correct strings. However, the disclosed parser, accessing a relatively small Mensa table of operations, is able to distinguish correct variants of a statement from minimally changed statements that, e.g., did not state a statute correctly.

Invariance for an Expression

We conducted an exercise to see whether, by composing an appropriate Mensa database, a parser could precisely understand a specific concept no matter how it was expressed. We used, as a test example, the statute in California Vehicle Code, Division 12, Chapter 5, Article 3.3, Section 27360.5:

"A driver may not transport on a highway a child in a motor vehicle, as defined in Section 27315, without properly securing the child in a rear seat in a child passenger restraint system meeting applicable federal motor vehicle safety standards, unless the child is one of the following: (A) Six years of age or older. (B) Sixty pounds or more."

This statute can be stated quite fully with the following twenty-six word sentence: "A child must be buckled in an approved safety seat if he or she is less than six years old and is less than sixty pounds." Billions of other English sentences can correctly restate this statute.

We first performed a calculation to estimate how many ways a sentence with a precise fixed meaning could be restated yet keep its original meaning. Our approach to estimating the number of language expressions that can precisely state the statute was to arbitrarily designate fifteen stages in that sentence where it is possible to employ an alternate synonym or paraphrase. One can thread a path through the alternate phrases choosing different paths without changing the meaning of the statement. Only correct paths through will preserve the meaning. The path through the various alternate phrases is a "tuple," in this case a fifteen-tuple, and the set of all possible word strings that have the same meaning is the Cartesian product of the tuple. The number of possible correct sentences is the Cartesian Product of this fifteen-tuple, obtained by serially multiplying up the numbers in the set of alternative words of phrases at each position of the tuple.

FIG. 46 shows fifteen arbitrary points in this twenty-six word sentence where we were able to substitute a number of alternate synonyms or paraphrases for the word or phrase that can be used at each position without changing the meaning. Then, for the exercise, we came up with small subsets of possible alternative synonyms and phrases, or blanks when words can be left out, for each of the fifteen points in the sentence.

Billions of alternate phrasings can be used without changing the meaning of a statement. With a fifteen-tuple, even with a small number sample of elements in each set, the total number of elements in the Cartesian product can be very large. Billions of different sentences can state the DMV statute precisely. Further, if we rephrase the concepts, change the order of the main clause and the if clause, insert or not insert a comma between them, use other myriad subordinate clauses in different orders, include double negatives and reciprocals to get the same meaning, repeat the statement in other words, one can state this one statute precisely in well over one-hundred billion word strings. Thus, there are an infinite number of variant expressions that mean that concept, and there are an infinite number of concepts that language can express. Therefore, language can say an infinite number of things, each in an infinite number of ways. The task becomes how to develop a parser that is able to understand which of the variants means the statute and which do not. The disclosed parser succeeds in this task in a very robust manner.

Here are some sentences from the many billions of possible word strings that state the DMV statute exactly: "A child must be strapped in a child safety seat if he or she is not 6 years old and is not 60 pounds.", "A child has to be buckled into a safety seat if he is not six and is not 60 pounds.", "A child does not have to ride in an approved child safety seat if the child is six or sixty pounds.", and "A child does not have to ride in an approved child safety seat unless he is under six years of age and less than sixty pounds."

Here are some sentences that use much the same set of words but do not express the statute correctly: "A child must be strapped under a child safety seat if he or she is not 6 years old and is not 60 pounds.", "A child must be buckled into a child safety seat if he or she is not 6 years old or is not 60 pounds.", and "A child who is not 6 years old or is under 60 pounds must ride in a safety seat."

As an example, in an actual implementation, the parser detected that the following sentence, deliberately made convoluted, states the statute correctly, thrice: "He must be strapped in a federally approved child safety seat if he is not 6 years old and is under 60 pounds and she must be secured in a child safety seat if she does not weigh 60 lbs and is not seventy two months old or more, and they must travel in a safety seat if he or she is not six and is not 27.2155422 kilograms or more in weight."

There are two small grammatical errors in the following sentence that render it an incorrect statement of the law, which the parser detected: "He must be strapped in a federally approved child safety seat if he is not 6 years old and is under 60 pounds and she must be secured in a child safety seat if she does not weigh 60 lbs and is not seventy two months old or more, and they must travel in a safety seat if he or she is not six or is not 27.2155422 kilograms or more in weight."

A key to the parser detecting even small grammatical errors in a sentence is to add to and edit the Mensa table to make sure that different synonyms and paraphrases refer to the equivalent concept by manually assigning the same concept identifier to the same concept. The method involves making six sub-tables within the Mensa database that allow parsing for each of the sub-concepts, making sure that paraphrases that have the same meaning parse to intermediary concepts that have the same concept identifier. Once the text expressions that describe each sub-concept are parsed to compact symbols, applying the truth table to them is simple. The result is: if it takes an average of seven Mensa rows to field each alternate phrase, then the number of rows required in a Mensa table with embodiments of the disclosed system is related to the sum of the sets of the tuple rather than the product of the sets.

This example of computer parsing, which takes into account the contribution of every word and punctuation mark, validates the theory and practice of the disclosed parsing system. Note particularly that changing a word early in the statement—say, "if" to "unless"—affects which word must be used later in the statement to maintain sentence meaning. A Mensa table can take care of such flow of indirect meaning between words widely separated in the expression. The parser can parse any variant sentence that precisely states the law and detect any variant that does not in less than one second. With a carefully constructed Mensa table we have been able to achieve text invariance, the ability to precisely determine that a particular concept is being referred to with an expression even if worded in any one of billions of different ways. Managing invariance is a key advantage of the disclosed parser approach.

Adding a few more database rows to the Mensa table enables the parser to understand and respond to all of the "who," "what," "what if," "when," "where," "how," "why," "how heavy," and "how old" questions that might be asked to probe the information in the statute, no matter how they are asked, such as: "Does a child need to be buckled in a safety seat if he is more than 6 years old?", "When does a child have to be restrained in an approved child safety seat?", "Why must a child be strapped into an approved child safety seat?", "When does a child not have to ride in a safety seat?", etc.

Logic by Computer

Delving into the logic required to discern whether a particular statement faithfully expresses the statute, we found that just six complex concepts are involved in the wording of the statute. Each of these concepts can be expressed by a number of paraphrases. Each can be represented by a concept symbol that can be used in a truth table that can be precisely modeled with a Mensa table. This allowed us to capture the logic of this California Motor Vehicle statute in a small truth table of six subconcepts: a, A, b, B, Yes, and No where:

a child less than 6 years old=a
a child 6 years old or more=A
a child less than 60 pounds=b
a child 60 pounds or more=B
a child secured in a child safety seat=Yes
a child not secured in a child safety seat=No The truth table, and the Mensa table, is illustrated in FIG. 47. Each row in this Mensa table of operations is an equation that models an operation that the mind would have to perform to test whether the truth table is satisfied. Now the task of parsing for the billions of variants becomes vastly easier. A reason that Mensa technology holds promise for computers doing abstract logic is that complex concepts parse down to a unitary symbol that represents the whole concept. Then, relating these compact symbols in a short truth table becomes elementary. This exercise suggested one interesting application: translate a set of laws into Mensa tables, and describe what an accused might have done to see if the computer can determine which law was broken.

Mensa and Meaning

The disclosed methods and systems of assigning unique symbols to concepts, and relating them to each other in Mensa tables, defining flow-of-meaning trees, along with a parser module, is an unconscious orthographic system of mindless symbols that can identify which concept it is, express it in language if required, and respond appropriately. With a Mensa table, the sense of a given expression can be controlled to force it to mean a particular concept. Once a human mind has measured the emotional values of concepts arising in a given situation described by language, it is possible to manually insert values of status and importance into new columns in the Mensa tables. Once numerical values for emotions, information, knowledge, and wisdom are assigned and stored away in Mensa, values can be added, subtracted, totaled, balanced, and otherwise managed by simple algebraic equations. Subtle questions about emotions could be understood and responded to in appropriate language.

III.1. Theory and Structure of the Mensa Database

Conventionally, there are four parallel media that can represent and manage declarative knowledge. Declarative knowledge in any one of these media can be readily mapped onto one of the other media. The world itself is the First Medium, or M1, for the storage of knowledge about itself. Operations of the human mind—i.e., thought and memory, incorporated in the human brain—are the Second Medium, or M2, of declarative knowledge storage. Declarative knowledge can also be represented in other diverse ways: physical models, artworks, pictures, diagrams, blueprints, graphs, spread-sheets, databases, mathematical models, formulae, etc. This varied lot of graphic or mathematical knowledge management systems can be lumped together as the Third Medium, or M3, of declarative knowledge storage. Language is the Fourth Medium, or M4, of declarative knowledge storage.

In an embodiment, the disclosed systems and methods comprise a database structure, called a "Mensa database" or "Mensa table," that can model human thought and language to the same degree of subtlety as natural language itself. The disclosed Mensa table database structures represent a new, Fifth Medium, or M5, of declarative knowledge storage. A Mensa database is an alternate orthography capable of storing large amounts of declarative knowledge with the same authority as natural language, but in a pre-parsed form that enables a computer to utilize it. A module (e.g., software and/or hardware module) that manages a domain of knowledge in this format may be referred to herein as a "Maven," an expert in a limited domain of knowledge. Knowledge stored in the Mensa table format is completely computer-accessible. Large corpora of language may be converted into Mensa tables stored in databases.

Natural language comprises a linear series of finite sentences arranged in order in paragraphs, chapters, and larger volumes of text. Each of these text forms is a notation for a tree structure, a flow-of-meaning tree, whose leaves and nodes are concepts and which can hold these concepts in a precisely defined unified relationship. In an embodiment, language trees may be represented as arrays. In addition, the language trees may be structured such that each tree node takes up one row, each expression requires only a small number of rows, and/or language symbols themselves represent element concepts.

Adopting the array method to implement language expression trees, a Mensa table structure may be developed, which we also call "M5," the fifth medium of knowledge, to model complex mental concepts and enable a parser module to identify the concepts unerringly. Mental concepts, specified by texts, are represented as a list or table of relations between pairs of symbols representing mental concepts. Each row of the table, a record in the database, is a relation between two concepts along with the surviving concept that results from their interaction. Each row represents the operation that constructs a surviving concept. Each row directs the parser to perform a computer operation that may reflect a mental operation. Each row represents the surviving concept. For example, in an embodiment, a row may comprise a first column or field comprising the concept symbol of the surviving concept and a second column or field comprising the concept symbols of the two concepts which were operated on to obtain the surviving concept. Each row may also comprise other columns or fields (e.g., a field that identifies one or more responses). In an embodiment, each such operation maybe pre-calculated by a human, who records the result of his mental operation in the row. Alternatively, the operation may be pre-calculated or processed automatically by a computing device, e.g., executing one or more algorithms. Thus, a small table of relation rows describes and defines a data tree structure able to represent a complex mental concept, idea, or thought, just as well as a word, phrase, expression, sentence, paragraph, or longer language text can.

Mensa tables specify, symbolically, both the set of operations that the mind uses to construct complex concepts that are expressed by text strings, and the steps required to parse the texts. Thus, the disclosed parser can parse each sentence input down to a single unique symbol, which can be programmatically exploded back into meaningful language expressing a complete list of constituent concepts. As simple concepts are enriched with meaning and survive, their symbols are marked up to reflect that they are now more complex concepts. Such markup can capture their enrichment.

Since each concept table takes up just a few rows in the database, a modern database can hold millions or billions of concepts, keep them organized in correct relationships, and provide fast precise conversational access to anyone. Thus, large domains of declarative knowledge presently stored in text, in unstructured form, can be losslessly structured in Mensa format.

We call such a database table and associated parser and response program that manages a domain of knowledge a "Maven." A Maven may understand exactly which one of thousands of questions or remarks is being addressed to it and makes the precisely appropriate response, no matter how the question is worded, as long as the text uses vocabulary and refers to concepts already installed in its Mensa database. The database tables may implemented in a proprietary "Tracker" database format, which allows easy entering, viewing, and editing of data in a database.

The Structure of a Mensa Database

A Mensa database comprises rows of operations, each one creating and representing a unique concept. Each row has a carefully designed record structure, a tuple that is able to capture all of the essential features of an individual mental concept. In an embodiment, seven essential columns are used to provide all the properties and functions:

(1) There is a vocabulary or lexicon column containing all of the language elements, lexical words, grammaticals, and punctuation marks that have been used or might be used to express concepts in each domain of knowledge stored in the database.

(2) Another column contains the unique identifier symbols of the two related operand concepts that are operated on to form a compound product concept.

(3) Another column contains the identifier of the unit product concept, which may also be a row identifier.

(4) There is a column containing the most apt text expression for the concept since every mental concept can be specified very precisely by a carefully composed language expression. This field controls the sense of the concept represented by that record in the current context, since, like a word, the same concept symbol can have very different senses in different contexts. This column allows the computer to explicate the precise meaning of any concept, if required, in context.

(5) There is a response column, which contains the identifiers of responses that the computer will make when text parsing to that concept is input. Preprogrammed responses can be written or spoken language, a computer action, a machine operation, execution of a hyperlink or change of program behavior. By linking an appropriate response to particular meaningful text inputs, one can control how the computer will respond to each text input. Surprisingly, the response also has an important effect on the intended sense of a concept, because the response's "take" on the concept indicates whether the intended meaning of the input string is different from the literal meaning, as in humor, irony, metaphor, synecdoche, allusions, sarcasm, litotes, allegory etc. by making an appropriate programmed response. Carefully tuned responses to precisely understood inputs enable a computer to mimic a human personality to a very high degree in a restricted domain of knowledge.

(6) Another column is an outline column filled with ordered numbers that define an outline tree structure. Following a numbered chapter and verse format, this concept-address column, by ordering rows, imposes a tree structure on the whole Mensa knowledge domain. This tree structure aggregates concepts, allowing concepts to take their place in context in a logical and convenient manner. As an outline, it locates each concept both in its local context and in the larger context of the knowledge domain. This column is useful for a parser, because, just like a word, the same concept can assume a very different sense in different contexts. The outline tree structure of the knowledge domain allows the parser to operate in restricted local sections of the database, in local contexts where words have special senses. This column enables what we call "local search," which is useful for pronoun reference and lexical word and phrase disambiguation in context, making sure that the correct sense of the text is taken in each context.

(7) Another column contains the set of symbols for all the higher level concepts to which each concept is party. This empowers programs to intersect these sets to come up with concepts that may not be explicitly referred to in the text, i.e., to figure out what the larger picture is with very few clues, and make likely diagnoses automatically. In an embodiment, the parser program may use the intersection of the concept sets in this column to determine the one concept to which each concept pair pointed. Alternatively, explicit naming of the surviving concept may work better. In an embodiment, this column may be used to enhance parser performance by enabling filling out of information not explicit in text.

While seven columns have been described, it should be understood that a particular implementation may include any subset and combination of these columns, including a subset of these columns with additional columns.

Properties of a Mensa Database

Mensa tables of operations bestow very special properties: the table matches each word and punctuation mark with a symbol that identifies the elementary concept it represents. In an embodiment, each intermediary concept product of operations is identified by a unique arbitrary symbol generated by the computer. Mensa table lookup enables the parser to determine which binary operations are specified by an expression by displaying which adjacent elemental and intermediate terms enter into binary operations. By looking for matches in the Mensa database, the parser can determine which adjacent symbols in an expression do pair and which do not pair. This enables the parser to avoid seeing pairings between concepts that make no sense and to determine precedence of operations for obtaining the right parse result. The table enables evaluation by lookup rather than "mental" calculation for all the operations that the parser requires to parse a text input to a single complex concept.

Thus, a Mensa parser with access to an adequate Mensa table can exploit the mindless power of algebraic manipulation of symbols to identify the precise complex mental concept encoded in a text input, whether it is a statement, question, or instruction, without "understanding" its meaning. Mensa tables can fully deal with pragmatics, truth, and the correspondence of our ideas and thoughts of the real world or of an imaginary world. Mensa tables enable performance of high-level propositional logic once complex concepts expressed in language are reduced to compact identifying symbols. The almost extreme "figuring out" process, that is required when a second person hears speech or reads text, is mitigated for the Mensa parser by being pre-parsed into a Mensa table.

Therefore, a Mensa database is an alternative orthography for language, able to store declarative knowledge to the same level as natural language, but in a pre-parsed form that enables a computer to utilize it. When symbols representing mental concepts are organized into this Mensa data structure, the resulting tables share the full power of language in representing the structure and function of highly complex concepts. There is no need for Mensa parsers to actually execute the individual mental operations because they use table lookup to obtain result values. The parser can identify precisely which concept among the infinitely scalable millions that can be stored in Mensa. This is "find" rather than "search" and "closed" rather than "open" interlocution. In an embodiment, at least a portion of the steps in the construction of Mensa tables from text can be automated. The properties of an inclusive Mensa table make it possible to bring the principles of algebraic evaluation and high-level propositional logic to the processing of language expressions and human thought in a very practical way.

III.2. Computer Programs and Mensa

Several modules (e.g., software modules) may be implemented that interact with Mensa databases. A parser-response software program with access to a Mensa database may parse a meaningful input text expression to identify the single unique concept that the text expresses, no matter what words are used or how it is phrased. Then, the program's response module can make an appropriate programmed response to that input. This parser-response program constitutes a sophisticated human-machine interface, which we call a Maven. Several other modules may be used to speed the creation of Mensa databases, some of which build Mensa databases automatically from marked up source text inputs. Another program may employ a short Mensa table as a probe to search large texts to find a particular concept no matter how it is worded in the text. It would be straightforward to scale up this program to search for thousands of concepts simultaneously in a large text corpus.

We have explained how Mensa databases can store human thought in all its subtlety. They constitute a computer-friendly notation holding the full meaning of language expressions, and thus, are an alternative medium to language for representing declarative knowledge. Mensa tables enable a simple parser program to precisely identify what is meant by a language phrase, expression, sentence, question, or paragraph. In an embodiment, a series of computer programs and tools interact with Mensa databases. These tools may comprise a parser-response program which accepts text input and parses it to a particular physical row in the Mensa database, the one that represents the complex concept meant by the text. From there, the response program initiates an appropriate response.

In an embodiment, software programs may also assist the translation of natural language text into Mensa tables, i.e., to create what we have called computer Mavens. A computer Maven is a system module comprising a Mensa database which stores a particular domain of knowledge along with a software program that can communicate with it and respond appropriately. One fun program set two Mavens talking to each other, each making a very appropriate response to what was said to it. It was impossible to predict which way the conversation would go.

In an embodiment, another program, a "trawler" program, enables searching of large bodies of text (e.g., complete electronic books) to find every instance of a particular, precisely-defined, sophisticated concept, no matter what words were used or how it was phrased.

Another programming exercise of particular interest was our demonstration that the very same program that could parse an arithmetic expression to obtain its value could parse a language expression to obtain its meaning. This was, for all intents and purposes, a demonstration that algebra and language can operate on the same principles, which require strict precedence of binary operations that match up pairs of concepts in a series of loops, to evaluate an expression. One astonishing observation we made was that, once large complex concepts are parsed to compact symbols, it is possible to perform very high-level abstract logic by relating them in a Mensa table.

The Parser Module

The task of the parser module is to identify which concept a given text input means, out of the billions it might be, no matter what words are used or how it is phrased. Having realized that language expressions were in fact algebraic expressions, we developed a natural language parser employing the standard calculator algorithm. This parser utilized a pre-constructed lookup table, which includes mental operations specified or implied in that language expression. We call such a table of pre-calculated operations a Mensa table.

To identify and execute the ordered series of binary mental operations encoded in a language expression, the parser consults a Mensa table composed of pre-calculated mental operations. The parser uses the principle of a single elimination tournament to evaluate a language expression, but with some of the symbols in each round getting a bye to the next or a later round instead of being involved in a matching in that round. Consulting a Mensa table of relations allows the parser to know which pairs of operands match up, and therefore, can be operated on in each round. The Mensa table dictates precedence of operations, and provides the product concept for each operation, eliminating the need for a mental calculation. By employing lookup of a Mensa table of operations, a very simple software program can parse language expressions and determine the precise concept that they mean. It can also determine whether an input expression makes sense, and recognize when the concept expressed by the text input is not in the Mensa knowledge store.

In an embodiment, the system sees all three language elements (i.e., lexical words, grammaticals, and punctuation marks) simply as symbols standing in for concepts, as operands in an algebraic expression. For example, consider the words of the language expression, "the contribution of a given non-002 greenhouse gas to radiative forcing". We will call it expression y. It can be thought of as an algebraic expression made up of eleven ordered word symbols, each standing for a concept. Each complex concept expressed is tagged with a unique symbol identifier. To underscore the idea that words are just algebraic symbols for concepts, let y equal the above expression in more compact symbols, i.e., the upper case initials of its words. In other words, y=T C O A G N G G T R F. Thus, when this language expression of eleven ordered concept symbols is submitted to the parser, the parser consults the Mensa table, illustrated in FIG. 48, to extract and execute the ten operations that are entailed in the expression. The eleven terms of the expression "the contribution of a given non-CO2 greenhouse gas to radiative forcing" specify ten mental operations, which can be represented by ten physical rows in a Mensa table.

In an embodiment, the ten operations encoded in this language expression are represented by ten rows, perhaps embedded in a large database table of mental operations that also may hold the operations for many other language expressions. These ten Mensa rows hold the necessary instructions for building the parse tree. Each higher-order unit concept derived at each stage of construction, at each round of the single elimination tournament, is explicitly identified with a concept identifier, including the final concept which is given an arbitrary but unique symbol identifier (e.g., in this case, y). Integer "3" is the unique symbol identifier standing for intermediary concept radiativeforcing and named by the words "radiative forcing" in the text field of its own Mensa database row.

Figure 48:
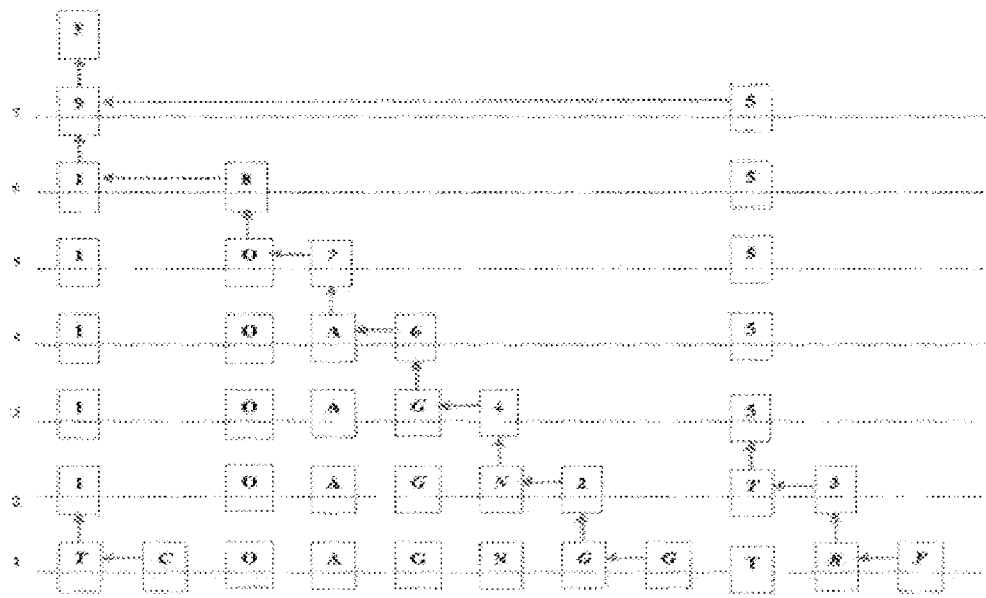
Figure 49:
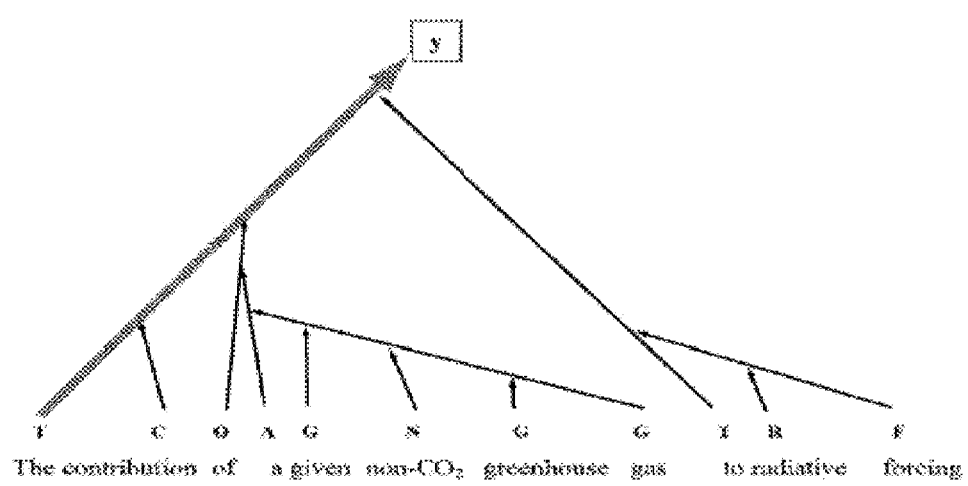

FIG. 49 shows a run of a table-driven parser, accessing the Mensa Table in FIG. 48, using the same exact algorithm that parses an arithmetic expression in a Reverse Polish Notation calculator to parse this language expression. FIG. 49 shows that a parse tree can be represented equally well as a flow-of-meaning tree which similarly shows surviving determiner concept the being enriched directly and indirectly by all of the other ten concepts to become concept y. The parsing process may be described as follows: Parsing along this string of concept symbols from left to right, consulting the table in FIG. 48, the parser finds three operations it can perform: T~C=1, G~G=2 and R~F=3, in the first tournament round. This results in a new row 1 O A G N 2 T 3. In the second round, the program performs two operations on this row: A~2=3 and T~3=5, resulting in new row 1 O A G 4 5, for the third round. This continues until the parser has re-enacted the ten operations in the table, substituting two concepts for one, until only one term is left, i.e., concept y, which represents the meaning of the whole expression.

Pseudocode for parsing an expression to the concept that it means, by consulting a Mensa table, may be expressed as follows:

Input text string into the first row of an x, y array;
before first symbol of current row;
   look in Mensa table for row matching next symbol pair;
     if row found put product symbol in next array row;
     if row not found put first symbol in next array row;
   loop until end of row reached;
next row;
loop until one symbol left.

Thus, in a series of rounds, the parser program makes passes through the expression, as shown in FIG. 48, looking for pairs of terms that the Mensa table indicates it can combine into one term for the next round. It "puts two and two together" by looking up pairs of concepts related in the Mensa table, by parsing the string of concepts. The Mensa database is consulted for each operation to obtain the result concept by lookup rather than calculation. The algorithm loops, continuing until there is only one term left, the "it" symbol that stands for that meaning of the whole expression (e.g., in this case, y).

Considering the metaphor of a tennis tournament helps us to understand what is going on here. The winner of each match survives, i.e., each survivor "lives on." Losers go home. Odd players get a bye to the next round. Evaluating an expression is, in Niklaus Wirth's words, like "the history of a tennis tournament . . . with each game being a node denoted by its winner and the two previous games of the combatants as its descendents." Just as higher ranked players are seeded into different sixteenths of the draw to ensure they do not meet until later rounds, enriched concepts do not match up until the correct round. Perhaps the format of a boxing championship is more apt in this case since the incumbent world champion, the T (the) concept in this diagram becoming y, gets byes all the way to the final (boxing) championship match, which is how punctuation mark and pronoun concepts work.

A software "expression" program running the same parser algorithm backwards, consulting the table in FIG. 48, starting with final concept y, iteratively substituting two concepts for one and keeping the order, will generate the original language expression. This is how entries in the text column of a Mensa databases may be generated automatically. Mapping a concept onto text in this manner is useful, since a Mensa database can communicate the meaning of a concept to a human by automatically translating concept symbols into language expressions that the human can understand. It is possible to manually compose more elegant paraphrases than the computer generates that express the mental concept, and output different versions at different times in the interests of variety. This allows Mavens to answer the same question aptly in more than one way.

The same Mensa database table can contain any number (e.g., thousands, millions, billions, trillions) of other rows representing myriad concepts, each row matching two concepts, with a pointer to the concept that both of them connect to in common. If a text expression that means a pre-installed concept is input into the parser, it will utilize lookup of the Mensa table to perform operations that arrive at the exact concept row that represents the meaning of that text. In an embodiment, each concept row in the database is replete with an appropriate "cargo" of metadata in other columns with special purposes. This is entirely analogous to a specific medial temporal lobe cortical neuron firing when a particular meaningful text is heard or read, i.e., the neuron that has a receptive field for that text, a neuron with projections to many other linked brain functions in both cortices, many of which project in turn to consciousness.

Just like characters and words that appear in many different local areas of a text, concepts take on different meanings in each local context. In an embodiment, once the parser focuses on one section of the database, it stays there to capture the local meaning of the words and phrases, particularly pronouns. This enables methods for absolute pronoun reference, for perfect resolution of polysemy, for sensitivity to allusions and metaphors, and for appropriate response to an input that would obtain a different response in another context. We call this "local search."

What is interesting is that a software algorithm implemented in compact code, comprising a single digit number of rows, can parse long complex sentences with punctuation and subordinate clauses easily. It illustrates the power of recursive algorithms operating on a recursive data type like a tree variable. Recursive programs are particularly suitable when a program is to manipulate information whose structure has been defined recursively. One wonders if the brain uses these same recursive methods to parse language expressions using neuron networks connected in the form of ordered binary trees.

The Response Module

Because the computer can identify the precise meaning of what is input, using the disclosed Mensa database, it is possible to program an appropriate response for each text input based upon its meaning. Every concept may be represented in a Mensa database by its own physical row, analogous to every concept being represented in the brain by its own cortical neuron. If the expression input makes sense and the Mensa table has the necessary rows to parse it, the parser program will find the exact row in the database assigned to represent the individual complex concept meant by the expression. In that row of the Mensa database, in an embodiment, there is a text field containing a carefully composed text expression that describes the concept most accurately. Upon reaching that row, the response program will perform whatever instructions have been placed in that row. In an embodiment, the default response is to output, in print, voice, or both. A specific response may be a text output, a computer action, or a change in behavior of the computer. A computer action is itself a concept (e.g., a motor concept), and may be identified with a symbol and its own row in a Mensa table. Not all computer actions are responses. The response module can initiate actions, ask questions, and understand the responses to them.

In embodiments, text strings in the text field of rows have been carefully composed to express the concept in the most succinct way. For example, should you ask, "What is the concept in row 17432?," the response might be "The effect of quantitative easing on the unemployment rate." Millions of questions and answers can be embedded in a database. The parser is able to determine which question it is, no matter how complicated it is, what vocabulary is used, or how it is phrased. Thus, the precise request in any anticipated yes or no, when, where, how, how much or why question can be recognized, and an appropriate pre-programmed answer returned.

Other actions are possible. In the same row of the Mensa database, there may be a response column field that holds symbols that identify actions that the computer can take. As a motor concept, as opposed to a sensory concept, each response action may have its own row in the Mensa table, which, when activated, will initiate performance of the action. If there are motor concept symbols in this response column, executing them may take precedence over text output. A random number generator can be used to pick and execute one of the actions, or to do them in order, or to do the next one next time (e.g., in a round robin fashion). A set of motor concepts could be arranged as the leaves of a tree implemented as a motor Mensa table, so that a tree traversal algorithm could be used to execute the steps of a complicated process in the right order.

Online Maven

In an embodiment, a web-based text entry toolbar is provided to receive input texts, which are passed to a parser-response module running on a server. Responses are passed back to the web page. This allows a user to run a Maven in a conventional web browser window.

Examination Module

In an embodiment, an examination module is provided that outputs preset free text questions that have clear correct answers, and waits for an answer. Even though a correct answer might be given in thousands of different wordings, the parser is able to detect whether the answer given matches a correct answer, and thereby automatically grade the examination (e.g., school or college examination, standardized test, such as the SAT, Advanced Placement examination, etc.).

Trawler Module

In an embodiment, a probe or "trawler" module is provided that can find a particular concept in a large body of text no matter how worded. It is not practical to find concepts in a large text corpus by searching with fixed text strings, since thousands of different text strings can be used to express any particular concept. Furthermore, keyword searches famously miss many pertinent concepts and find many non-pertinent concepts, because they do not take full account of the meaning contributed by word order and grammaticals. Keyword searches require a human to validate all results. The trawler module may be able to find every instance of the concept no matter how it is worded without human help.

The trawler module employs a Mensa table probe constructed with rows for appropriate vocabulary and sub-concepts able to detect concepts of interest. The entire text to be searched is fed in to the trawler module sentence by sentence. Every string in the text that expresses the concept of interest is identified if it is expressed in any way that makes sense. The method may be implemented as follows: every contiguous series of words and punctuation marks, all from the vocabulary of the probe, is parsed to see if it expresses the concept of interest. If it does, it will be detected. Use of synonyms, different phrasings, and/or changes of word order does not matter.

To prove feasibility, we salted a full-length book with instances of several different paraphrases that expressed concepts of interest. The program worked its way through the text and found all instances of expressions that meant concepts of interest, ignoring control expressions, using the same words even slightly changed in order that no longer expressed the concepts. The trawler module can easily be scaled up with a large Mensa table to search for thousands of concepts simultaneously in a large text corpus. For example, ICD.10 coding of patient records is one application.

Mensa Table-Builder Module

Although a Mensa database can be built by manual input and editing, the process is meticulous and slow. There is an advantage to bringing automation to the installation of knowledge in Mensa database format, the translation of language into Mensa. In an embodiment, modules are provided which use text markup to speed up the process of composing Mensa tables. For example, a table-builder module can be used translate texts, marked up in Reverse Polish Notation (RPN), into Mensa tables.

In one embodiment, text is marked up so that a computer can do the rest to build a Mensa table. Inserting "superfluous punctuation marks" into text expressions allows the table-builder module to construct Mensa tables automatically from them. Such markup provides the module with precedence of operations in a language expression in the same manner that RPN provides unambiguous precedence of binary operations to a calculator. The table-builder module constructs a Mensa operations table without any further human supervision from appropriately marked-up text. This can result in immediate improvements in speed and ease of building Mensa tables. An industrial scale effort in this area would work wonders, and render worthwhile insights into the rules of grammar and into human thought processes as a valuable by-product.

The Mensa installer should have a grasp of rules of syntax of English and also have experience of the world to know when concepts match up to make sense. The application of the rules allows a parser program to determine the order of precedence of the operations needed to parse an expression largely automatically. The more that rules of English syntax are truly understood and applied, the less the need for human common sense to be applied to get the parse right. With refinements that incorporate complete programmatic use of the rules of syntax to greatly ease the burden of markup, authors can provide marked-up versions of their texts as a routine practice, thereby allowing publishers to routinely create online Mensa tables that make all the concepts in the text fully accessible to a computer parser module.

Tracker Module

In an embodiment, a tracker module or database management module is provided. The tracker module may convert any standard database file, such as .dbf, to a proprietary file (e.g., .trk file). The tracker module greatly facilitates access to and editing of databases. Mensa databases can be stored as .trk files.

Additional Comments

The human mind is continuously jumping from one thought to another, the so-called stream of consciousness. These thoughts are often a spur to action. Planning for actions is done in the frontal lobes, organized in the pre-motor and motor cortices and carried out by the basal ganglia, cerebellum, medulla oblongata, and anterior spinal cord. There are opportunities for software modeling of the development of the will to act and the choice and performance of appropriate action in response to inputs and situations: desire, volition, initiative, striving, and responses to the environment.

Imagine a system continuously receiving input information in the form of text. The program reads and parses incoming word strings. Given that the disclosed parsing module understands precisely the meaning of the input expressions, it could detect syndromes by activating concepts and waiting for a subsequent concept that means something is going on. These could be related to see if a response is needed. Responses to syndromes could be programmed that are perfectly apposite. Such a program could interpret a complex situation, since each complex situation is reduced to a unitary identifying symbol, and see a syndrome. One can see that by making these basic tools available for improvement and experimentation one might model a human mind to a high degree.

III.3. Conversations with a Mensa Database

Since Hal starred in Stanley Kubrick and Arthur Clarke's "2001—A Space Odyssey," the Holy Grail of artificial intelligence has been to achieve the level of machine understanding depicted in the film. We have been able to conduct sophisticated conversations with our Mavens. A Maven should expect all of the concepts that will be presented to it and have very flexible pre-programmed responses installed. When scaled up to millions of concepts in a limited domain of knowledge, the computer appears formidably intelligent.

A computer Maven may comprise a software parser and response program addressing a Mensa table holding a certain domain of knowledge. There are no restrictions upon the complexity or abstractness of concepts represented. Each expression, statement, question, and response is a unique concept assigned its own identified row. The parser can understand any input text expression, no matter how it is worded, once its meaning is encoded in the Mensa table. For any given restricted domain of knowledge, there is no limit to the number of concepts encoded, no limit to the number of statements that can be understood, and no limit to the number of questions that can be asked. There is provision in a Mensa table to make one or more appropriate text responses or other actions in response to any input text that is understood.

One approach to creating a Maven is to start with a text that describes the domain of knowledge relatively fully, making sure that all the main points are covered. The next step is to translate all the sentences, one by one into a Mensa table, making sure that all synonyms and paraphrases that can be used to address concepts are encoded. Then, for each sentence, all of the questions associated with that sentence are addressed. Current Mavens can carry on very appropriate conversations in plain English between user and computer in their restricted domain of knowledge.

An Immunology Maven

Here is a passage from a paper in Nature Immunology describing complex immunologic concepts:

"The fundamental idea that T cells with autoimmune potential exist in the normal peripheral T cell repertoire is based on the finding that CD4+ T cell populations depleted of regulatory T cell subsets are capable of causing tissue-specific immunopathology after adoptive transfer into lymphopenic hosts. It is now recognized that these autoreactive T cells are normally kept in check by the presence of CD4+ regulatory T cells (Treg cells). A feature shared by Treg cells and T cells with autoimmune potential is the ability to recognize self antigens. Treg cell recognition of self antigens was initially suggested after observations indicated that the presence of a particular organ was important for the maintenance of Treg cell mediated tolerance to that organ."

We constructed a Mensa table that represented all the concepts in the passage, as well as the concepts in a series of questions that arise naturally in the mind of an expert. This immunological Maven comprises a Mensa table of several hundred rows. Here are sample questions and answers from the transcript from an actual run of the program:

QUESTION: What cell populations are capable of causing tissue specific immunopathology after adoptive transfer into lymphopenic hosts?

ANSWER: CD4+ T cell populations depleted of regulatory T cell subsets.

QUESTION: Why are CD4+ T cell populations depleted of regulatory T cell subsets capable of causing tissue-specific immunopathology after adoptive transfer into lymphopenic hosts?

ANSWER: Because they contain active autoimmune T cells.

QUESTION: Who first suggested the fundamental idea that T cells with autoimmune potential exist in the normal peripheral T cell repertoire?

ANSWER: It was first proposed by John Gorman in 1960.

A Literary Maven

In another exercise, we constructed a Maven that (who) understands all of the concepts in James Joyce's 1902 short story "Araby" from "The Dubliners." This required a database of eighteen-thousand rows. The parser program can read through the text of the whole story in five minutes, twice as fast as a human, taking into full account every lexical word, grammatical, and punctuation mark, identifying each simple, intermediate and complex concept, and seeing its precise relation to others. It can appropriately answer hundreds of questions about events and characters in the story, and plumb their motivations and feelings. Here is one paragraph from Araby:

"Every morning I lay on the floor in the front parlour watching her door. The blind was pulled down to within an inch of the sash so that I could not be seen. When she came out on the doorstep my heart leaped. I ran to the hall, seized my books and followed her. I kept her brown figure always in my eye and, when we came near the point at which our ways diverged, I quickened my pace and passed her. This happened morning after morning. I had never spoken to her, except for a few casual words, and yet her name was like a summons to all my foolish blood."

Here are some questions and answers relating to this paragraph from an actual run of the communications program:

QUESTION: Why did our protagonist lie on the floor at the window to watch for Mangan's sister to come out on her doorstep to leave her house to go to school?

ANSWER: So that he would see her leave her house, so he could follow her.

QUESTION: Why was the blind pulled down to within an inch of the sash?

ANSWER: So he could not be seen.

QUESTION: Did he keep her always in his eye and, when they came near the point at which their ways diverged, did he quicken his pace and pass her?

ANSWER: Yes he did.

Storing declarative knowledge in a Mensa database to the same level of complexity as language is relatively straightforward. The amount of knowledge that a Maven can be given is infinitely scalable. However, for a computer conversation system to be useful and practical, it is important to make it capable of fielding a high percentage of domain relevant questions that can be asked, and to respond appropriately to relevant inputs by the interlocutor. The disclosed systems and methods provide a clear path to this goal.

III.4. Applications for Mensa Technology

There is a great need for computer applications that can store human knowledge in computer-accessible form, understand language, and respond appropriately with words or actions to spoken text inputs, i.e., a human-machine interface. The most immediate place for Mensa technology may be an interface to the Internet. However, there are many other worthwhile areas to apply the disclosed system, in a variety of major industries and fields of study from medicine to education to advertising. Mensa technology enables many worthwhile knowledge facilities.

The ultimate goal, perhaps for some, is to model an intelligent human mind to a level displayed by the iconic Hal. Using Mensa technology, it is possible to have a computer completely understand what you are saying to it and program it to respond appropriately. Mensa technology has total command of the semantics and syntax of a message in a closed knowledge domain, which makes it unique in natural language understanding, where efforts are now focused on open domain questioning using statistical key word techniques, enormous computing power, and high-capacity indexes of vast open text sources. In embodiments, Mensa technology, in contrast, is closed domain and deals only with pre-registered vocabulary and concepts that humans install. With Mensa technology, a computer can be programmed to respond to double meaning and appreciate and react to subtle subtext. There is no limit to the level of intellectual sophistication that can be encoded, and it is infinitely scalable. What follows are brief discussions of potential applications for Mensa technology.

Mavens

In an embodiment, Mavens are software agents that respond to humans using regular text or voice conversation in a closed and specific domain of knowledge. This is an intriguing application: building a Maven that can pass the Turing test, but also endowed with personality and appropriate display of feelings and emotions as inspired by Hal. A Maven could provide completely sensible and on the point responses in contrast with Weisenbaum's Eliza programs, which, although they pass the Turing test with many people, attain very poor sensitivity and specificity.

Mass Storage of Knowledge

Another version of Hal would be comprehensive structured knowledge repositories in various fields, but without the personality. Content in any domain of knowledge can be installed, and access to it can be obtained by ordinary conversation at a fully human level. Mensa databases are eminently more searchable than free text because previously "unstructured" information is now formally pre-structured. Authors may post a Mensa version of their work on the Internet in parallel with language publication. In an embodiment, this may entail an interactive process with a human editor using a set of highly developed authoring tools. Much like the way the Internet offers links to other websites, authors can decide that "off-topic" questions are best answered by a link to another Mensa published book, and could route the question "through" that book before returning an answer to the person asking the question.

Publishing

There is an important future for publishing informational material, news stories, reviews, reports, scientific papers, and textbooks, etc. in Mensa database format. Such materials could be published both as printed text and in an online Mensa database in parallel. The online version will give readers much better and faster access to material in which they are particularly interested. Intelligent information services can make use of networking since a particular query could be broadcast to thousands of Mensa databases simultaneously. If any one database had the desired information, it would be forthcoming. In an embodiment, a software kit can be provided that can be used to encode knowledge in Mensa format to create Mavens of all kinds on a personal computer. If enough people develop the necessary skills, there is an opportunity for crowd-sourcing construction of Mensa databases on a massive scale, thereby allowing unprecedented intelligently filtered access to enormous amounts of knowledge.

FAQs and Smart CRM

The ability to field a question no matter what words are used or how it is phrased can make Frequently Asked Questions (FAQs) much more convenient. There would be no need to read through twenty questions to see if your question is there with an answer to your question. Furthermore, the practical number of questions is no longer limited to twenty. Good responses to questions that come in can be pre-prepared and customers can be given access online just by asking their question in their own words. Smart customer relationship management (CRM) is a related application. Human customer service representatives answering phones will have much better access to relevant information to serve customers better.

Intelligence and National Security

Intelligence and national security institutions could make good use of a network of Mensa databases, since a particular query could be broadcast simultaneously to thousands of Mensa databases containing intelligence information maintained by disparate groups. If any one database had the desired information, it would be forthcoming. Mensa access has an additional benefit. It can prevent fishing expeditions, because specific information can be made available without access to sensitive or classified information in which it may be embedded.

Human-Machine Interfaces

An immediate place for Mensa technology exists in Human-Machine Interfaces—particularly, an interface to the Internet. Current Mensa technology enables complex instructions to be given to a computer in ordinary language with any vocabulary and any phrasing, as long as the meaning is perfectly clear. With Mensa, any clear message in good English, phrased in any way whatsoever, will be understood perfectly. As long as it is within the bounds of the knowledge stored, the parser will recognize which instruction has been given, or which question has been asked, and make a programmed response to that instruction.

Plain English Name

One practical Human-Machine Interface application for Mensa is a natural language interface to the Internet. Major efforts are underway worldwide, to help create the "semantic Web," which constitutes an ambitious effort to make the Internet more intelligent, and to enable the ability to communicate with it in ordinary English and have it make very appropriate responses.

Language is a vast combinatorial system. The number of meanings that language can take on, even with a few words, is virtually infinite. It is possible to take advantage of this fact with a computer interface, wherein complex instructions can be given to the computer in natural language and understood perfectly by the computer to perform certain functions. The disclosed system may form the basis for a human-machine interface with a repertoire of registered functions.

Accordingly, in an embodiment, a novel kind of registry is presented in accordance with the systems and methods described herein. Such a registry can be realized in computer server databases, where each registered object is assigned a unique natural language expression as its identifier as well as the usual identifier and barcode number. Such a registry can be considered to be a general purpose human-machine interface. In order for all meaningful text input variants, no matter how worded, to be able to describe the object clearly, each object may be linked to a unique table of database rows. In this manner, each object can be considered to be tagged with a unique identifying "concept," whose meaning stays the same, but which can be precisely named by any one of the thousands of different text expression variants with the same meaning that name it clearly. The advantage that Maven technology may bring to a registry is to make it possible for users to access any registered object by inputting, in their own words, a meaningful text string that describes the object. This is a procedure that comes naturally to people. Thus, a much more convenient and user-friendly class of registry can be provided.

Such a registry can be administered by a host organization that allows individuals and institutions to register objects of various kinds, wherein each object is identified by a text expression and all same-meaning variants that describe the object clearly. Clients who desire to register objects can contract with this registry administrator for slots in the registry. The registering organization, which supervises the registration procedure, may also be responsible for creating Mensa tables that can identify registered objects, managing the database, and/or deploying the parsing program against deployed Mensa database(s) to interpret users' text inputs.

The parser program can translate, to a single end concept, any unbroken string with specific meaning formed solely from vocabulary words registered in the database. If the string has the same meaning, it will translate to the same concept. Words, phrases, and concepts that are not registered in the database may be ignored. One important distinction between a direct command to open a particular webpage and a key word search and navigation to the webpage is that, in an embodiment, the disclosed systems and methods take full account of the full meaning contributed by grammatical particles and punctuation marks in the text, as well as the full-meaning engendered by strict order of words.

As an example, in an embodiment, Mensa may be utilized for Plain English Name (PEN) technology. Many advertisers announce in a print, radio, television, or billboard advertisement the existence of supplementary information online that they want viewers of the print advertisement to see, or that there is a product or service they can provide. They usually include a Uniform Resource Locator (URL), such as a website address, in the advertisement. Recently, some advertisers include a barcode tag that is readable by smart-phone cameras and tablet computers. These are the intended "bridge" between the offline and the online worlds, between high-production value impressions and deep-product information and specifications.

As a more conducive alternative, in an embodiment, the system places a PEN icon in the print advertisement along with words describing the information, product, or service that is available online. Once an advertisement reader sees the PEN icon in a print advertisement, he knows that useful adjunct information or service is online and is accessible just by typing a clear request for it in his own words into an entry field on his device (e.g., desktop or mobile device). A browser window may open, enabling the exact item to be immediately obtained. A PEN request for a specified online item is a more natural way to access a particular Internet item that an advertiser wants the print advertisement viewer to see or get. The user just has to remember the idea (i.e., the concept), not the URL. Moreover, because it's so immediately available in a format that is natural to him, the user is more likely to use it.

The need for this bridge is already demonstrated by the market today. There are several alternatives ways currently being promoted for a reader to see such online material: enter a URL or shortened URL supplied in the print advertisement, read a barcode tag that has been placed in the print advertisement (e.g., using a smart phone application), photograph a picture with Google Goggles™, use Short Message Service (SMS) to text a keyword to a number, etc. Of course, one can search for the particular Web page using an online search engine, such as Google™. The fact that all of these ways are being encouraged and used more and more validates the need for convenient methods of access to specially prepared or pertinent Internet items announced in print.

Mensa Text Probes—Search Documents for Specific Concepts

It is possible to create a relatively small Mensa probe that encodes a particular idea or concept. A large corpus of text can then be passed against that short Mensa table probe to see if a particular concept is expressed somewhere in the text, and record its location. It does not matter how the concept is expressed in the text corpus as long as the meaning is clear. As an experiment, we spiked a long e-book with several expressions that meant a particular complex concept, each one worded differently, along with control expressions that used the very same words but scrambled so as to not make sense. This concept probe program found all the correctly worded expressions and ignored the jumbled ones using the same words. Sensitivity and specificity for detecting the planted ideas was one-hundred percent.

The Electronic Patient Record

In the electronic patient record, sixty percent of information is in the form of text and is considered "unstructured." However, with an understanding of the rules of syntax, a parser can reveal a high level of structure in this "unstructured" text. There is an urgent need for computerized access to textual information in patient records for purposes of chart review, quality assurance studies, automatic generation of CPT ICD-9 codes and CPT ICD-10 codes, clinical research, and providing physicians with access to clinical information. Major efforts are presently going on in this area. This is an ideal application for the disclosed trawler module, which is able to search large bodies of text to find concepts no matter how they are worded with one-hundred percent sensitivity and specificity. It is straightforward to scale up this module to search for thousands of concepts simultaneously on each pass through a large text corpus.

Education—Automated College Courses

Mensa databases have an important use in education. Automated courses are one application. Examinations, where answers are in essay form, can be graded by a computer using the disclosed systems and methods. Such examinations can become a practical alternative to multiple-choice examinations. We have shown feasibility for the examination program with our Araby database which contains all the knowledge in James Joyce's short story Araby. Here, our examination program outputs a programmed question related to the story and waits for an answer. The answer text is parsed and matched for its concept against a set of correct answer concepts and graded accordingly. For essay examinations, a grading program could examine each sentence in the student's essay to see if it matches one of the points that would be expected to be made by an "A" student. Essays would be scored for the number and relevance of points made. Wrong answers and regularly seen off-the-point answers would be detected to see if students were responding with common misconceptions. If a student's novel answer happened to be a remarkable new insight that teachers had never thought of, this could be added to the canon of good points to be made in a domain, and to be taught.

Writing Courses

Mensa technology can be important for teaching of writing and for developing more precise style manuals. Most writing courses are taught by English departments, but businesses are becoming much more concerned with the writing skills of their executives in writing proposals and in internal and external communications. Diagrammatic flow-of-meaning trees and Mensa tables with scoring of paragraphs for meaning and weight show what is the main point in each paragraph, and exactly how other sentences underscore or undercut that point, providing a clear-eyed view of what has been said.

Avatars and Computer Games

One other very interesting and potentially huge application for Mensa technology is in computer games. The disclosed systems and methods can endow avatars with human understanding, giving them personalities and the ability to reply sensibly to text messages, and to obey spoken orders with physical on-screen actions. With voice recognition, face recognition, and machines like Microsoft's Kinect™, recognizing movements, the opportunity to develop very sophisticated multimodal interactions with a computer or its avatar becomes ripe for development. Mensa can add a whole new dimension to computer avatars. This facility is expected to have enormous appeal to serious gamers.

Research in Linguistics and Cognitive Science

Mensa technology opens up important opportunities for research in Linguistics and Cognitive Science, doing hands on experiments modeling human thought. IBM's Watson project demonstrates the current high interest and investment in computer cognition research. The more precise and complex the query the greater edge Mensa has over current NLP approaches, because keywords without the exact relations between them do not carry specific meaning. In particular, the analogy between an expression, that a person hears or reads, firing a particular neuron out of millions in the left inferior temporal and frontal cortices, and the same expression causing a parser to find a particular physical address out of billions in computer memory is telling. It suggests that building and tuning Mensa databases enable experimental models that could provide worthwhile insights into how the brain and the mind work.

Process Overview

Figure 50:
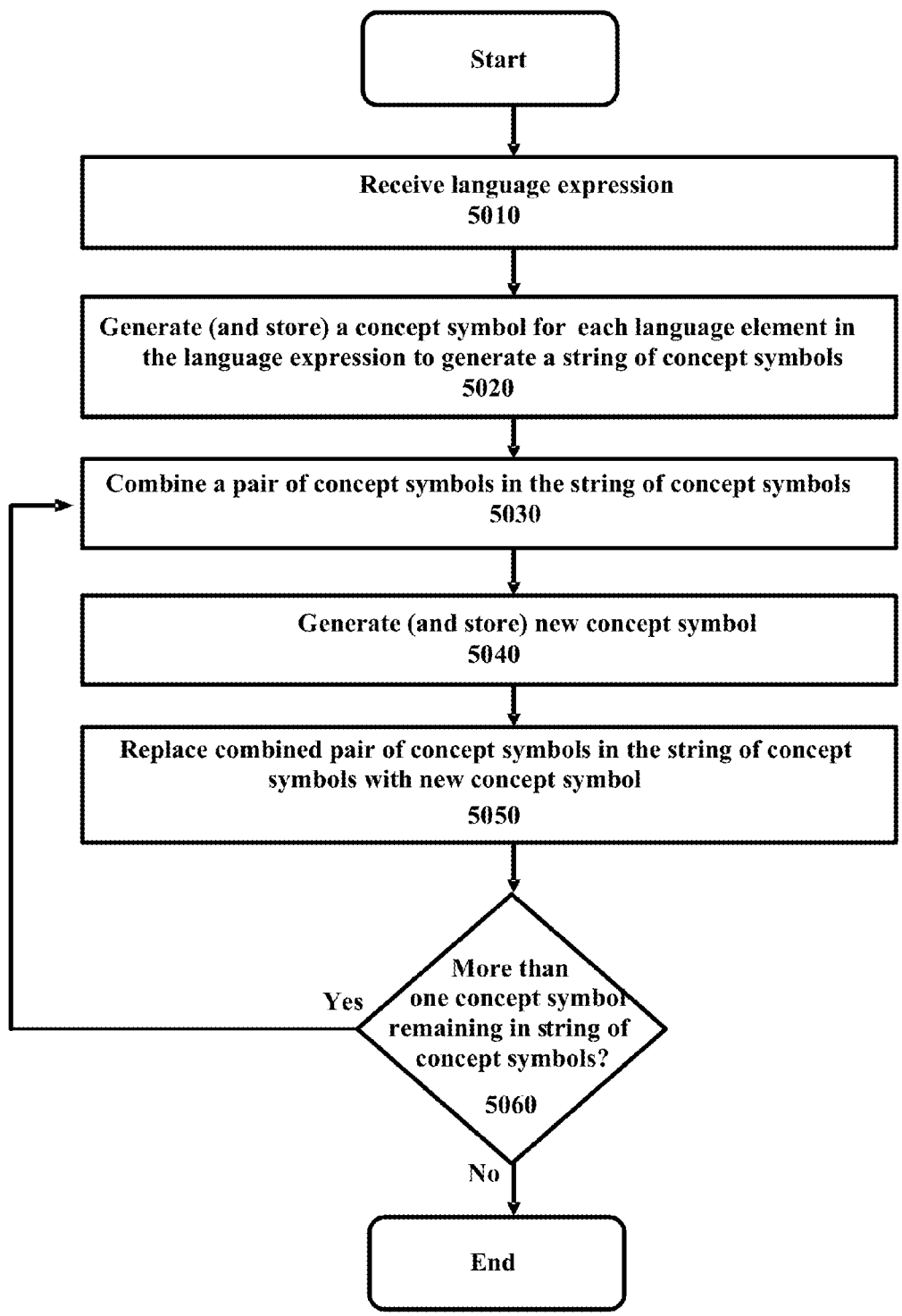
FIG. 50 illustrates a process for constructing a Mensa database, according to an embodiment.

FIG. 50 illustrates a process for building a Mensa database, according to an embodiment. In step, 5010, the process begins when a language expression, to be converted into a Mensa table, is received. In step 5020, the language expression is deconstructed into its constituent language elements. For each language element, a concept symbol is generated. Essentially, the language expression is converted into a string of concept symbols. Each generated concept symbol may be stored in its own row in a Mensa database.

In step 5030, pairs of concept symbols in the string of concept symbols are combined in order of precedence. For each pair of combined concept symbols, a new concept symbol is generated in step 5040, and may be stored in its own row in the Mensa database. The new concept symbol, representing the combined concept of a pair of concept symbols, replaces the pair of concept symbols in the string of concept symbols in step 5050. This results in a shortened string of concept symbols, since two concept symbols are replaced with one concept symbol. This process of steps 5030, 5040, and 5050 continues until only a single concept symbol remains in the string of concept symbols, as determined in step 5060. This single concept symbol represents the concept of the entire language expression received in step 5010.

Figure 51:
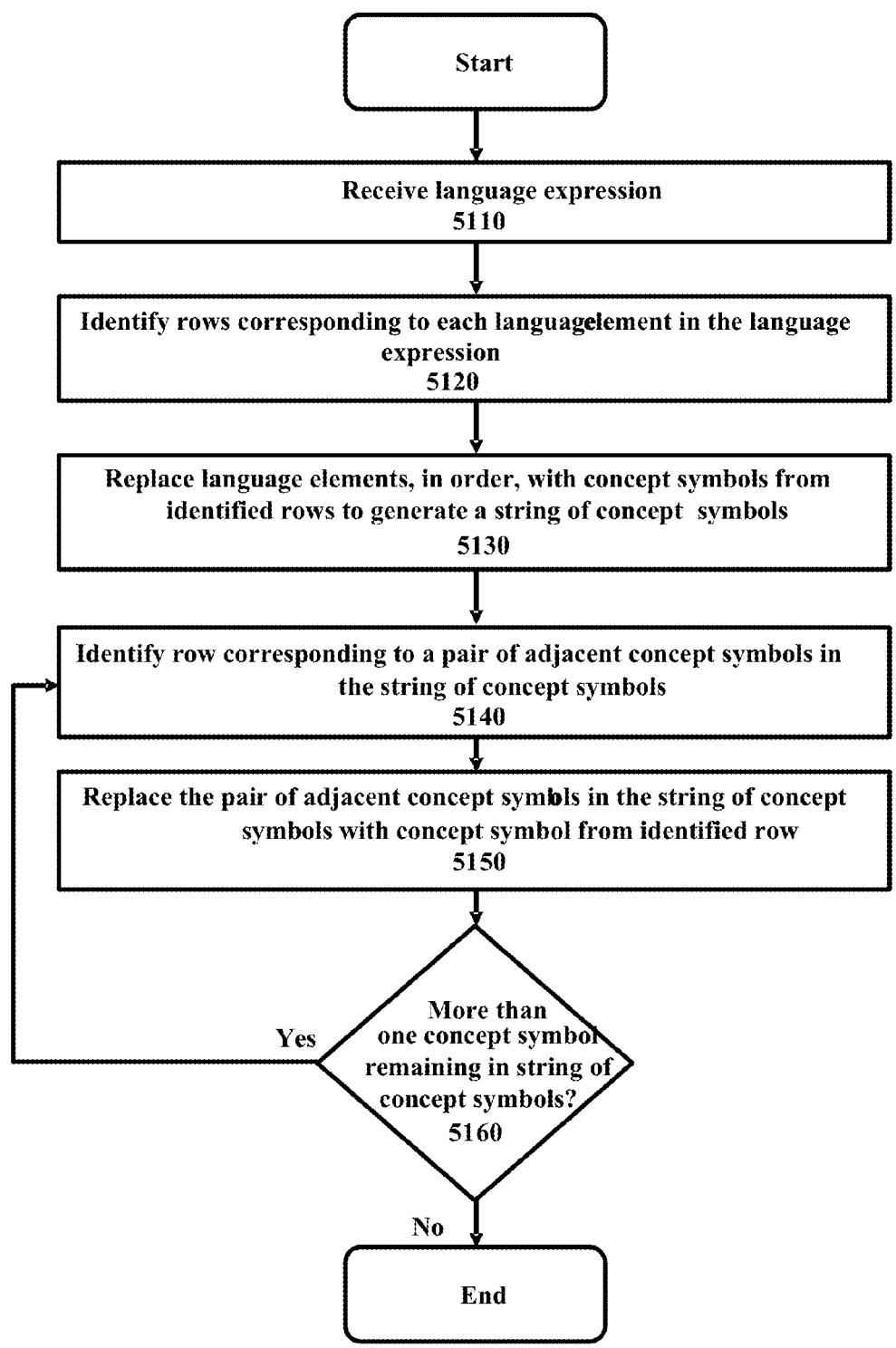
FIG. 51 illustrates a process for parsing a language expression using a Mensa database, according to an embodiment.

FIG. 51 illustrates a process for parsing a language expression using a Mensa database, according to an embodiment. The parsing process receives a language expression to be parsed in step 5110. In step 5120, the language expression is deconstructed into its constituent language elements. For each language element, a lookup is performed against the Mensa database to identify a row corresponding to the language element and comprising a concept symbol which represents the language element. In step 5130, a string of concept symbols is generated using the concept symbols from the identified rows. Essentially, the language expression is converted into a string of concept symbols identified using the Mensa database. The concept symbols in the string of concept symbols are in the same order as the order of their corresponding language elements in the language expression.

In step 5140, adjacent concept symbols in the string of concept symbols, generated in step 5130, are paired using the Mensa database. For example, a row comprising a concept symbol and the pair of concept symbols that were combined to form the concept symbol is identified by performing a lookup using the pair of concept symbols. In step 5150, the adjacent pair of concept symbols, for which a row was identified, is replaced with the concept symbol from the identified row. This results in a shortened string of concept symbols, since two concept symbols are replaced with one concept symbol. This process of steps 5140 and 5150 continues until only a single concept symbol remains in the string of concept symbols, as determined in step 5160. This single concept symbol represents the concept of the entire language expression received in step 5110. Furthermore, in an embodiment, the row corresponding to the single, remaining concept symbol may identify one or more responses to the language expression received in step 5110.

System Overview

Figure 52:
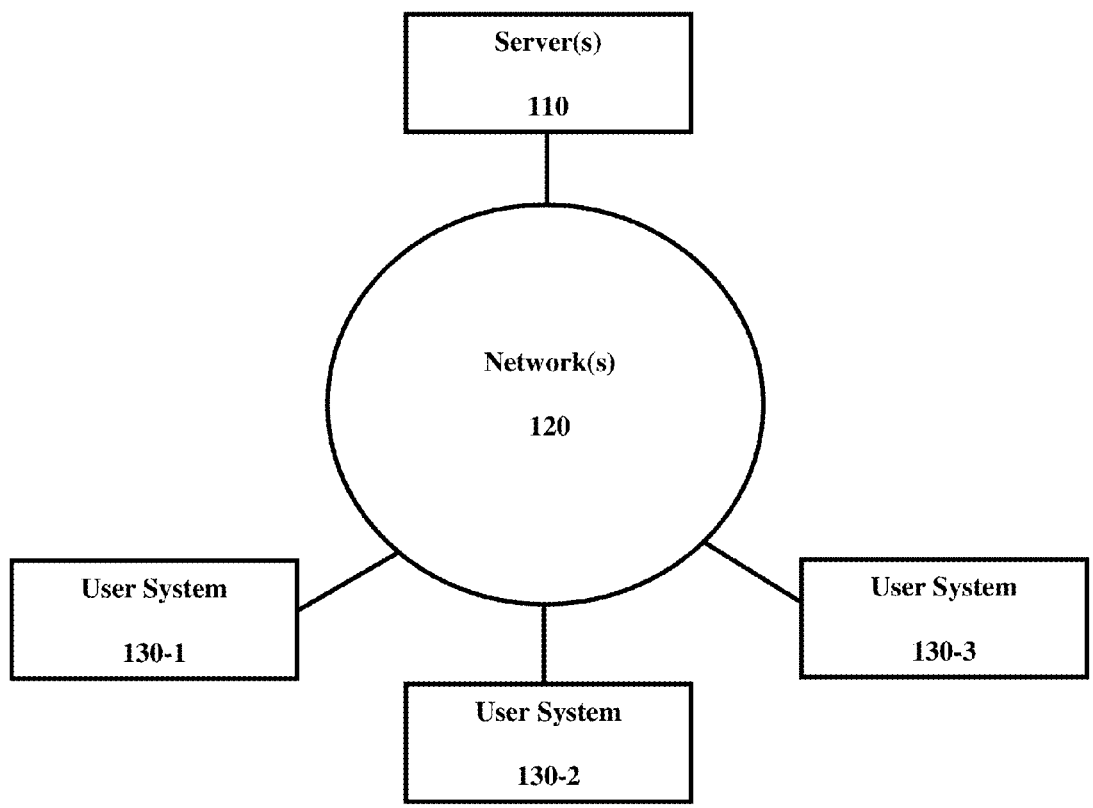
FIG. 52 illustrates an example system for natural-language communication with a computer, according to an embodiment.

FIG. 52 illustrates an example system for natural language communication with a computer, according to an embodiment. The system may comprise a set of one or more servers 110 which host and/or execute one or more of the various functions, processes, and/or software modules described herein. In addition, the server(s) 110 are communicatively connected to one or more user systems 130 via one or more network(s) 120. Network(s) 120 may comprise the Internet, and server(s) 110 may communicate with user system(s) 130 through the Internet using standard transmission protocols, such as HyperText Transfer Protocol (HTTP), Secure HTTP (HTTPS), File Transfer Protocol (FTP), and the like. In an embodiment, server(s) 110 may not be dedicated servers, and may instead be cloud instances, which utilize shared resources of one or more servers. Furthermore, while FIG. 52 illustrates the server(s) 110 being connected to various systems through a single set of network(s) 120, it should be understood that the server(s) 110 may be connected to the various systems via different sets of one or more networks. For example, the server(s) 110 may be connected to a subset of user systems 130 via the Internet, but may be connected to one or more other user systems 130 via an intranet. It should also be understood that user system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, Automated Teller Machines, and the like. In addition, while only a few user systems 130 and one set of server(s) 110 are illustrated, it should be understood that the network may comprise any number of user systems and sets of server(s).

Server(s) 110 may comprise web servers which host one or more websites or web services. In embodiments in which a website is provided, the website may comprise one or more user interfaces, including, for example, web pages generated in HyperText Markup Language (HTML) or other language. The server(s) 110 transmit or serve these user interfaces in response to requests from user system(s) 130. In some embodiments, these user interfaces may be served in the form of a wizard, in which case two or more user interfaces may be served in a sequential manner, and one or more of the sequential user interfaces may depend on an interaction of the user or user system with one or more preceding user interfaces. The requests to server(s) 110 and the responses from server(s) 110, including the user interfaces, may both be communicated through network(s) 120, which may include the Internet, using standard communication protocols (e.g., HTTP, HTTPS). These user interfaces or web pages may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like. The server(s) may also respond to other requests from the user system(s) 130. For example, a user system may submit data (e.g., user data, form data, etc.) to be stored in, or request access to data stored in, one or more databases (not shown), such as the disclosed Mensa database(s), locally and/or remotely accessible to the server(s) 110. Any suitable database may be utilized, including without limitation MySQL, Oracle, IBM, Microsoft SQL, Sybase, Access, and the like, including cloud-based database instances and proprietary databases. Data may be sent to the server(s) 110, for instance, using the well-known POST request supported by HTTP. This data, as well as other requests, may be handled, for example, by server-side web technology, such as a servlet, executed by the server(s) 110.

In embodiments in which a web service is provided, the server(s) 110 may receive requests from user system(s) 130, and provide responses in eXtensible Markup Language (XML) and/or any other suitable or desired format. In such embodiments, the server(s) 110 may provide an application programming interface (API) which defines the manner in which user system(s) 130 may interact with the web service. Thus, the user system(s) 130, which may themselves be servers, can define their own user interfaces, and rely on the web service to implement the backend processes, functionality, storage, etc., described herein. For example, in such an embodiment, a client application executing on one or more user system(s) 130 may interact with a server application executing on server(s) 110 to execute one or more or a portion of one or more of the various functions, processes, and/or software modules described herein. The client application may be "thin," in which case processing is primarily carried out server-side by server(s) 110. A simple example of a thin client application is a browser application, which simply requests, receives, and renders web pages at user system(s) 130, while server(s) 110 are responsible for generating the web pages and managing database functions. Alternatively, the client application may be "thick," in which case processing is primarily carried out client-side by user system(s) 130. It should be understood that the client application may perform an amount of processing, relative to server(s) 110, at any point along the spectrum between "thin" and "thick," depending on the design goals of the particular implementation.

Example Processing Device

Figure 53:
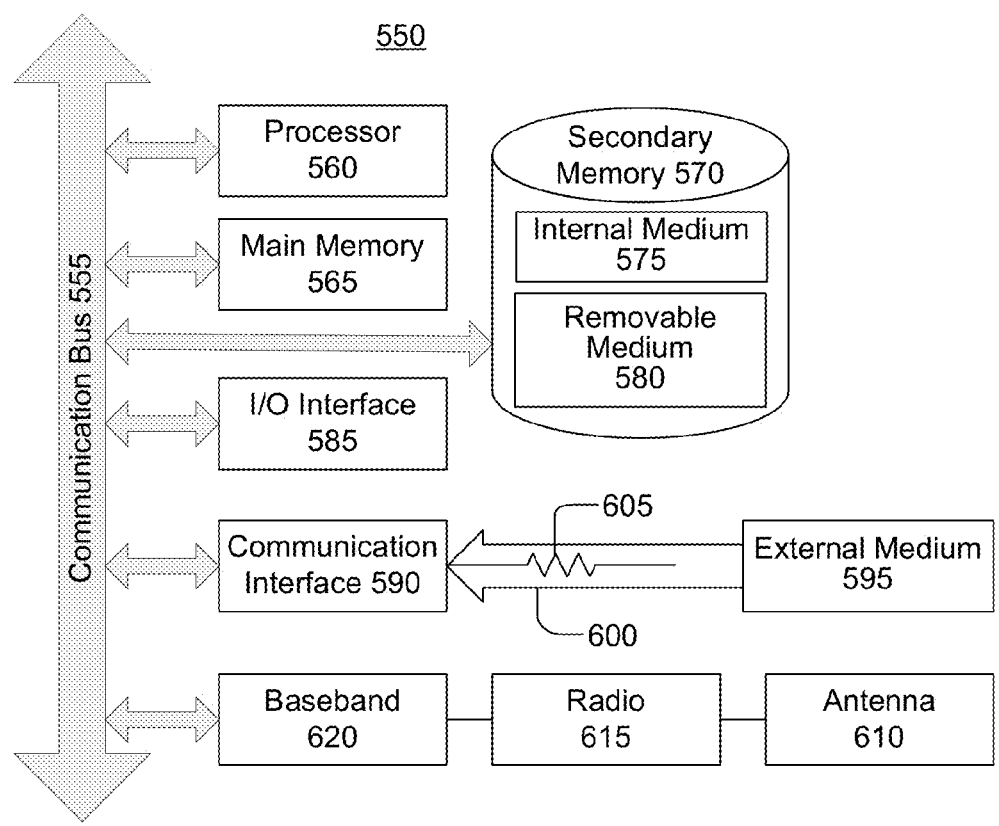
FIG. 53 illustrates a processing system on which one or more of the processes described herein may be executed, according to an embodiment.

FIG. 53 is a block diagram illustrating an example wired or wireless system 550 that may be used in connection with various embodiments described herein. For example, the system 550 may be used as, or in conjunction with, one or more of the mechanisms or processes described above, and may represent components of server(s) 110, user system(s) 130, and/or other devices described herein. The system 550 can be a server or any conventional personal computer, or any other processor-enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560. Examples of processors which may be used with system 550 include, without limitation, the Pentium® processor, Core i7® processor, and Xeon® processor, all of which are available from Intel Corporation of Santa Clara, Calif.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 550 preferably includes a main memory 565 and may also include a secondary memory 570. The main memory 565 provides storage of instructions and data for programs executing on the processor 560, such as one or more of the functions and/or modules discussed above. It should be understood that programs stored in the memory and executed by processor 560 may be written and/or compiled according to any suitable language, including without limitation C/C++, Java, JavaScript, Perl, Visual Basic, .NET, and the like. The main memory 565 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 570 may optionally include an internal memory 575 and/or a removable medium 580, for example a floppy disk drive, a magnetic tape drive, a compact disc (CD) drive, a digital versatile disc (DVD) drive, other optical drive, a flash memory drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer-readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 590. Examples of external storage medium 595 may include an external hard disk drive or an external optical drive, or and external magneto-optical drive.

Other examples of secondary memory 570 may include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage media 580 and communication interface 590, which allow software and data to be transferred from an external medium 595 to the system 550.

System 550 may include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 550 with a network or another computing device.

Communication interface 590 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

In an embodiment, I/O interface 585 provides an interface between one or more components of system 550 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The system 550 also includes optional wireless communication components that facilitate wireless communication over a voice and over a data network. The wireless communication components comprise an antenna system 610, a radio system 615 and a baseband system 620. In the system 550, radio frequency (RF) signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown).

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA, or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A system for parsing text in a natural language communication with a computer, the system comprising:
    at least one hardware processor;
    a database;
    a builder module, interfaced with the database, that, when executed by the at least one hardware processor, constructs at least one table that represents knowledge defined by one or more model expressions, wherein each of the one or more model expressions comprises a string of language elements, wherein each of the language elements comprises a word or punctuation mark, and wherein constructing the at least one tables comprises, for each of the one or more model expressions,
        for each language element in the string of language elements of the model expression, including at least one punctuation mark, generating a concept symbol that represents a meaning of the language element, to form a string of concept symbols in a same order as the string of language elements,
        in a series of one or more rounds, combining one or more pairs of concept symbols in the string of concept symbols into a newly generated concept symbol that represents a meaning of the combined pair of concept symbols, to form one or more shortened strings of concept symbols until a single concept symbol remains that represents a meaning of the entire model expression, and,
        for each generated concept symbol, storing the concept symbol in its own row in the database; and
    a parser module, interfaced with the database, that, when executed by the at least one hardware processor, parses one or more input expressions, wherein each of the one or more input expressions comprises a string of language elements, wherein each of the language elements comprises a word or punctuation mark, and wherein parsing each of the one or more input expressions comprises
        identifying rows in the database that corresponds to each language element in the string of language elements of the input expression, including at least one punctuation mark, wherein each row comprises a concept symbol that represents a meaning of the language element,
        generating a string of concept symbols from the identified rows,
        in a series of one or more rounds, identifying rows in the database that comprise pairs of concept symbols in the generated string of concept symbols, and replacing the pairs of concept symbols with the concept symbols in the identified rows, to form one or more shortened strings of concept symbols until a single concept symbol remains that represents a meaning of the entire input expression, and
        providing a response based on the identified row in the database that comprises the single concept symbol.

2. The system of claim 1, wherein the identified row in the database that comprises the single concept symbol identifies one or more responses, and wherein the system further comprises a response module that executes at least one of the one or more responses.

3. The system of claim 1, wherein punctuation marks are parsed in the same manner as words.

4. The system of claim 3, wherein concept symbols are generated for punctuation marks in the same manner that concept symbols are generated for words.

5. The system of claim 4, wherein the database comprises at least one first row comprising a first concept symbol that represents a meaning of a word and at least one second row comprising a second concept symbol that represents a meaning of a punctuation mark.

6. The system of claim 5, wherein the rows of the database represent a binary tree, and wherein the at least one second row represents a root of a subset of the binary tree that represents a meaning of an entire language expression preceding the punctuation mark.

7. The system of claim 1, wherein the construction of the at least one tables and the parsing of one or more input expressions is in accordance with a precedence of punctuation marks, wherein the precedence of punctuation marks comprises, in order of ascending seniority: a comma, a semicolon, a colon, and a period.

8. The system of claim 1, wherein, in the series of one or more rounds, once a punctuation-mark concept symbol representing a meaning of a punctuation mark has been combined with a concept symbol representing a meaning of an expression preceding the punctuation mark, the builder module does not combine the punctuation-mark concept symbol with another punctuation-mark concept symbol representing a meaning of a punctuation mark until the punctuation-mark concept symbols becomes directly adjacent in one of the one or more shortened strings of concept symbols.

9. The system of claim 1, wherein the series of one or more rounds comprises two or more rounds, and wherein the builder module does not combine a concept symbol representing a meaning of a punctuation mark with another concept symbol representing a meaning of a punctuation mark until after a first round in the series of two or more rounds.

10. A method for parsing text in a natural language communication with a computer, the method comprising, by at least one hardware processor:
    constructing at least one table that represents knowledge defined by one or more model expressions, wherein each of the one or more model expressions comprises a string of language elements, wherein each of the language elements comprises a word or punctuation mark, and wherein constructing the at least one tables comprises, for each of the one or more model expressions,
        for each language element in the string of language elements of the model expression, including at least one punctuation mark, generating a concept symbol that represents a meaning of the language element, to form a string of concept symbols in a same order as the string of language elements,
        in a series of one or more rounds, combining one or more pairs of concept symbols in the string of concept symbols into a newly generated concept symbol that represents a meaning of the combined pair of concept symbols, to form one or more shortened strings of concept symbols until a single concept symbol remains that represents a meaning of the entire model expression, and,
        for each generated concept symbol, storing the concept symbol in its own row in a database; and parsing one or more input expressions, wherein each of the one or more input expressions comprises a string of language elements, wherein each of the language elements comprises a word or punctuation mark, and wherein parsing each of the one or more input expressions comprises identifying rows in the database that corresponds to each language element in the string of language elements of the input expression, including at least one punctuation mark, wherein each row comprises a concept symbol that represents a meaning of the language element, generating a string of concept symbols from the identified rows, in a series of one or more rounds, identifying rows in the database that comprise pairs of concept symbols in the generated string of concept symbols, and replacing the pairs of concept symbols with the concept symbols in the identified rows, to form one or more shortened strings of concept symbols until a single concept symbol remains that represents a meaning of the entire input expression, and providing a response based on the identified row in the database that comprises the single concept symbol.

11. The method of claim 10, wherein the identified row in the database that comprises the single concept symbol identifies one or more responses, and wherein the method further comprises executing at least one of the one or more responses.

12. The method of claim 10, wherein punctuation marks are parsed in the same manner as words.

13. The method of claim 12, wherein concept symbols are generated for punctuation marks in the same manner that concept symbols are generated for words.

14. The method of claim 13, wherein the database comprises at least one first row comprising a first concept symbol that represents a meaning of a word and at least one second row comprising a second concept symbol that represents a meaning of a punctuation mark.

15. The method of claim 14, wherein the rows of the database represent a binary tree, and wherein the at least one second row represents a root of a subset of the binary tree that represents a meaning of an entire language expression preceding the punctuation mark.

16. The method of claim 10, wherein the construction of the at least one tables and the parsing of one or more input expressions is in accordance with a precedence of punctuation marks, wherein the precedence of punctuation marks comprises, in order of ascending seniority: a comma, a semicolon, a colon, and a period.

17. The method of claim 10, wherein, in the series of one or more rounds, once a punctuation-mark concept symbol representing a meaning of a punctuation mark has been combined with a concept symbol representing a meaning of an expression preceding the punctuation mark, the punctuation-mark concept symbol is not combined with another punctuation-mark concept symbol representing a meaning of a punctuation mark until the punctuation-mark concept symbols becomes directly adjacent in one of the one or more shortened strings of concept symbols.

18. The method of claim 10, wherein the series of one or more rounds comprises two or more rounds, and wherein a concept symbol representing a meaning of a punctuation mark is not combined with another concept symbol representing a meaning of a punctuation mark until after a first round in the series of two or more rounds.

\* \* \* \* \*